(12) United States Patent
Brookes et al.

(10) Patent No.: US 12,384,551 B2
(45) Date of Patent: Aug. 12, 2025

(54) SYSTEM FOR CONTROLLING A PROPULSOR ASSEMBLY OF AN ELECTRIC AIRCRAFT

(71) Applicant: BETA AIR LLC, South Burlington, VT (US)

(72) Inventors: Kyle Brookes, Richmond, VT (US); Collin Freiheit, Burlington, VT (US); Nicholas Moy, Burlington, VT (US); Daniel Spira, Beaconsfield (CA)

(73) Assignee: BETA AIR LLC, South Burlington, VT (US)

( * ) Notice: Subject to any disclaimer, the term of this patent is extended or adjusted under 35 U.S.C. 154(b) by 0 days.

(21) Appl. No.: 18/129,483

(22) Filed: Mar. 31, 2023

(65) Prior Publication Data

US 2024/0327013 A1 Oct. 3, 2024

(51) Int. Cl.
*B64D 31/06* (2024.01)
*B64C 11/34* (2006.01)
(Continued)

(52) U.S. Cl.
CPC .............. *B64D 31/06* (2013.01); *B64D 27/24* (2013.01); *B64C 11/34* (2013.01); *B64U 10/20* (2023.01); *B64U 50/19* (2023.01)

(58) Field of Classification Search
CPC ........ B64D 31/00; B64D 31/02; B64D 31/04; B64D 31/06; B64D 31/10; B64D 31/14;
(Continued)

(56) References Cited

U.S. PATENT DOCUMENTS 2,475,121 A * 7/1949 Avery ..................... B64C 27/37
416/114
2,495,523 A 1/1950 Hays
(Continued)

FOREIGN PATENT DOCUMENTS

DE 202007014395 U1 12/2007
DE 102009012903 A1 9/2010
(Continued)

OTHER PUBLICATIONS

Durkee et al., Conceptual Design of an Electric Helicopter Powertrain, 2010, IEEE (Year: 2010).*
(Continued)

*Primary Examiner* — Ramya P Burgess
*Assistant Examiner* — Sara J Lewandroski
(74) *Attorney, Agent, or Firm* — Brake Hughes Bellermann LLP

(57) ABSTRACT

A system and a method for controlling a propulsor assembly of an electric aircraft. The system may include an electric motor, wherein the electric motor may include a rotor and a stator, a propulsor driven by the electric motor configured to propel an electric aircraft. The propulsor may include a propeller. The propeller may include a blade. The system may include a cyclic control assembly configured to deflect the blade. The cyclic control assembly may include an actuator and a push rod mechanically connected to the actuator and the propulsor. The system may include a flight controller. The flight controller may be configured to receive sensor datum from at least a sensor communicatively connected to the electric aircraft, generate a deflection command as a function of the sensor datum and actuate the cyclic control assembly as a function of the deflection command.

21 Claims, 13 Drawing Sheets

(51) Int. Cl.
*B64D 27/24* (2024.01)
*B64U 50/19* (2023.01)
*B64U 10/20* (2023.01)

(58) Field of Classification Search
CPC ........ B64D 31/16; B64D 27/34; B64U 50/13;
B64U 50/19; B64U 50/20; B64U 10/10;
B64U 10/13; B64U 10/17; B64U 10/20;
B64U 30/20; B64U 70/80; B64U
2201/00; B64C 11/30; B64C 11/305;
B64C 11/32; B64C 11/34; B64C 11/343;
B64C 11/44; B64C 13/00; B64C 13/16;
B64C 13/18; B64C 13/20; B64C 13/22
See application file for complete search history.

(56) References Cited

U.S. PATENT DOCUMENTS

| | | | |
|---|---|---|---|
| 2,549,887 A | 4/1951 | Buivid | |
| 2,626,766 A | 1/1953 | McDonald | |
| 2,669,311 A | 2/1954 | De et al. | |
| 2,731,215 A | 1/1956 | Avery | |
| 2,994,386 A | 8/1961 | Enstrom | |
| 3,052,305 A | 9/1962 | Jones et al. | |
| 3,109,496 A | 11/1963 | Ellis et al. | |
| 3,135,334 A | 6/1964 | Culver | |
| 3,246,862 A | 4/1966 | Leo et al. | |
| 3,288,226 A | 11/1966 | Lemont et al. | |
| 3,370,809 A * | 2/1968 | Leoni | B64C 29/0033 |
| | | | 416/246 |
| 3,533,713 A | 10/1970 | Salmun | |
| 3,554,662 A * | 1/1971 | Lemont | B64C 27/605 |
| | | | 416/114 |
| 3,589,831 A * | 6/1971 | Lemnios | B64C 27/72 |
| | | | 416/114 |
| 3,762,667 A | 10/1973 | Pender | |
| 4,092,084 A | 5/1978 | Barltrop | |
| 4,109,885 A | 8/1978 | Pender | |
| 4,115,031 A | 9/1978 | Drees et al. | |
| 4,310,284 A | 1/1982 | Randolph | |
| 4,443,154 A | 4/1984 | Randolph | |
| 4,573,873 A | 3/1986 | Yao et al. | |
| 4,913,411 A | 4/1990 | Collins et al. | |
| 5,028,210 A | 7/1991 | Peterson et al. | |
| 5,032,057 A | 7/1991 | Speer | |
| 5,145,321 A | 9/1992 | Flux et al. | |
| 5,242,267 A * | 9/1993 | Byrnes | B64C 27/48 |
| | | | 416/134 A |
| 5,259,729 A | 11/1993 | Fujihira et al. | |
| 5,263,821 A * | 11/1993 | Noehren | B64C 27/33 |
| | | | 415/115 |
| 5,301,900 A | 4/1994 | Groen et al. | |
| 5,304,036 A | 4/1994 | Groen et al. | |
| 5,433,669 A | 7/1995 | Chang et al. | |
| 5,511,947 A | 4/1996 | Schmuck | |
| 5,826,822 A | 10/1998 | Rehm | |
| 6,082,968 A | 7/2000 | Nyhus | |
| 6,161,799 A | 12/2000 | Nyhus | |
| 6,764,280 B2 | 7/2004 | Sehgal et al. | |
| 7,097,169 B2 | 8/2006 | Mueller | |
| 7,448,571 B1 * | 11/2008 | Carter, Jr. | B64C 27/021 |
| | | | 244/6 |
| 7,677,862 B2 | 3/2010 | Boatner | |
| 7,789,341 B2 | 9/2010 | Arlton et al. | |
| 8,047,792 B2 | 11/2011 | Bech et al. | |
| 8,052,094 B2 | 11/2011 | Roesch | |
| 8,052,500 B2 | 11/2011 | Van et al. | |
| 8,070,090 B2 | 12/2011 | Tayman | |
| 8,109,722 B2 | 2/2012 | Gamble et al. | |
| 8,246,302 B2 | 8/2012 | Bertolotti | |
| 8,262,358 B1 | 9/2012 | Muylaert et al. | |
| 8,403,255 B2 | 3/2013 | Piasecki | |
| 8,583,295 B2 | 11/2013 | Eglin | |
| 8,690,096 B2 | 4/2014 | Alvarez | |
| 8,770,934 B2 | 7/2014 | Perkinson | |
| 8,944,764 B2 | 2/2015 | Cardell et al. | |
| 8,985,951 B2 | 3/2015 | Rauber et al. | |
| 8,998,125 B2 | 4/2015 | Hollimon et al. | |
| 9,126,681 B1 | 9/2015 | Judge | |
| 9,334,049 B1 * | 5/2016 | LeGrand, III | B64D 27/24 |
| 9,764,833 B1 * | 9/2017 | Tighe | B64U 10/10 |
| 9,828,095 B1 | 11/2017 | Wilcox et al. | |
| 10,150,567 B2 | 12/2018 | Lauder et al. | |
| 10,308,356 B2 | 6/2019 | Hampton et al. | |
| 10,384,771 B2 | 8/2019 | Haldeman et al. | |
| 10,392,098 B2 | 8/2019 | Baldwin et al. | |
| 10,421,538 B2 | 9/2019 | Seale et al. | |
| 10,473,107 B1 | 11/2019 | Newton et al. | |
| 10,494,095 B2 | 12/2019 | Groninga et al. | |
| 10,822,079 B2 | 11/2020 | Schwaiger | |
| 10,960,974 B2 | 3/2021 | Muren et al. | |
| 11,104,415 B2 | 8/2021 | Judas et al. | |
| 11,167,845 B2 | 11/2021 | Schank | |
| 11,186,363 B2 | 11/2021 | Lauder et al. | |
| 11,203,422 B2 | 12/2021 | Buesing | |
| 11,267,564 B2 * | 3/2022 | Landry | B64C 11/001 |
| 11,267,569 B2 | 3/2022 | Muren et al. | |
| 11,312,484 B2 | 4/2022 | Bernard | |
| 11,401,031 B2 | 8/2022 | Ensslin | |
| 11,401,042 B2 | 8/2022 | Peleg | |
| 11,433,093 B2 | 9/2022 | George | |
| 11,472,538 B1 | 10/2022 | Skroski | |
| 11,511,849 B2 | 11/2022 | Gazzino et al. | |
| 11,511,854 B2 | 11/2022 | Baity et al. | |
| 11,643,196 B1 | 5/2023 | Spira et al. | |
| 11,673,659 B2 | 6/2023 | Howes et al. | |
| 11,673,660 B1 | 6/2023 | Brookes | |
| 11,814,161 B2 | 11/2023 | Andryukov et al. | |
| 11,975,829 B2 | 5/2024 | Sato et al. | |
| 2002/0109044 A1 | 8/2002 | Rock | |
| 2004/0232280 A1 * | 11/2004 | Carter | B64C 27/52 |
| | | | 244/17.25 |
| 2005/0037685 A1 * | 2/2005 | Helmlinger | A63H 27/12 |
| | | | 446/34 |
| 2006/0097103 A1 * | 5/2006 | Atmur | B64D 31/12 |
| | | | 244/7 C |
| 2006/0102777 A1 | 5/2006 | Rock | |
| 2006/0231677 A1 | 10/2006 | Zimet et al. | |
| 2007/0031253 A1 * | 2/2007 | Muren | B64C 27/50 |
| | | | 416/134 A |
| 2009/0016896 A1 * | 1/2009 | Hill | F03D 1/0658 |
| | | | 416/244 R |
| 2010/0230547 A1 | 9/2010 | Tayman | |
| 2011/0031355 A1 | 2/2011 | Alvarez | |
| 2012/0012692 A1 * | 1/2012 | Kroo | B64C 29/0025 |
| | | | 244/6 |
| 2012/0257974 A1 | 10/2012 | Mok | |
| 2012/0321472 A1 * | 12/2012 | Davis | A63H 27/12 |
| | | | 416/147 |
| 2014/0091172 A1 * | 4/2014 | Arlton | B64U 50/19 |
| | | | 244/17.23 |
| 2014/0265077 A1 | 9/2014 | Hinks | |
| 2015/0003982 A1 | 1/2015 | Radovich et al. | |
| 2015/0014475 A1 | 1/2015 | Taylor et al. | |
| 2015/0086358 A1 * | 3/2015 | Filter | B64C 27/32 |
| | | | 416/134 A |
| 2015/0226186 A1 | 8/2015 | Mitsch et al. | |
| 2015/0246725 A1 * | 9/2015 | Reilly | B64C 27/24 |
| | | | 244/92 |
| 2015/0314864 A1 | 11/2015 | Cserfoi | |
| 2016/0059958 A1 | 3/2016 | Kvitnevskiy | |
| 2016/0059960 A1 | 3/2016 | Fearn et al. | |
| 2016/0090178 A1 | 3/2016 | Paynton | |
| 2016/0236773 A1 | 8/2016 | Jolly et al. | |
| 2016/0257399 A1 | 9/2016 | Carter et al. | |
| 2016/0282140 A1 * | 9/2016 | Bergelin | G01D 5/12 |
| 2016/0340034 A1 * | 11/2016 | Covington | B64C 27/605 |
| 2017/0021922 A1 * | 1/2017 | Litwinowicz | B64C 27/57 |
| 2017/0210463 A1 * | 7/2017 | Koessick | B64C 27/48 |
| 2017/0283051 A1 | 10/2017 | Radekopf et al. | |
| 2017/0341733 A1 * | 11/2017 | D'Anna | B64C 29/02 |
| 2018/0017040 A1 | 1/2018 | Lee | |

(56) References Cited

U.S. PATENT DOCUMENTS

| | | | |
|---|---|---|---|
| 2018/0141654 A1* | 5/2018 | Choi | B64C 27/28 |
| 2018/0257772 A1 | 9/2018 | Bernhardt | |
| 2018/0362146 A1* | 12/2018 | Klein | B64U 10/13 |
| 2019/0002085 A1 | 1/2019 | Choi et al. | |
| 2019/0016441 A1 | 1/2019 | Schank et al. | |
| 2019/0047688 A1 | 2/2019 | Muren et al. | |
| 2019/0047689 A1 | 2/2019 | Muren et al. | |
| 2019/0118935 A1 | 4/2019 | Love et al. | |
| 2019/0118943 A1 | 4/2019 | Machin | |
| 2019/0329882 A1* | 10/2019 | Baity | B64U 30/14 |
| 2019/0389569 A1 | 12/2019 | Paulson et al. | |
| 2020/0148347 A1* | 5/2020 | Bevirt | B64D 27/31 |
| 2020/0331602 A1 | 10/2020 | Mikic et al. | |
| 2020/0377209 A1 | 12/2020 | Schmaling et al. | |
| 2020/0391860 A1* | 12/2020 | Foskey | B64C 27/24 |
| 2021/0009283 A1* | 1/2021 | Pawliczek | B64D 47/06 |
| 2021/0039776 A1* | 2/2021 | Peoples | B64C 27/82 |
| 2021/0114715 A1 | 4/2021 | Cravener et al. | |
| 2021/0147091 A1 | 5/2021 | Deloyer | |
| 2021/0214071 A1* | 7/2021 | Nyiri | B64C 23/06 |
| 2021/0221498 A1* | 7/2021 | Gallagher, V | B64C 27/605 |
| 2021/0253231 A1 | 8/2021 | Ensslin | |
| 2021/0284329 A1 | 9/2021 | Bernard | |
| 2021/0339881 A1 | 11/2021 | Bevirt et al. | |
| 2021/0354815 A1 | 11/2021 | Cravener | |
| 2022/0119102 A1 | 4/2022 | Shaanan | |
| 2022/0153407 A1 | 5/2022 | Howes | |
| 2022/0274693 A1 | 9/2022 | Sato et al. | |
| 2022/0355923 A1 | 11/2022 | Andrews | |
| 2023/0118750 A1 | 4/2023 | Baskin et al. | |
| 2023/0339601 A1* | 10/2023 | Marshall | B64C 29/02 |
| 2024/0092493 A1 | 3/2024 | Orbon et al. | |

FOREIGN PATENT DOCUMENTS

| | | |
|---|---|---|
| EP | 1944234 A1 | 7/2008 |
| FR | 3074778 A1 | 6/2019 |
| GB | 886582 A | 1/1962 |
| GB | 2356616 A | 5/2001 |
| RU | 2155702 C1 | 9/2000 |
| RU | 2709081 C1 | 12/2019 |
| WO | 2021030630 A2 | 2/2021 |
| WO | 2022113086 A1 | 6/2022 |
| WO | 2002086312 A1 | 10/2022 |

OTHER PUBLICATIONS

Casabuono, "Forced Auto", Rotary Wing Forum (https://www.rotaryforum.com/threads/forced-auto.33027), Dec. 6, 2011, 11 pages.

Dvorak, "Teeter Bearing Help Wind Turbines Ssssssh", Windpower Engineering & Development (https://www.windpowerengineering.com/teeter-bearing-help-wind-turbines-ssssssh/), Jul. 18, 2009, 5 pages.

Pavel, "Understanding tile control characteristics of electric vertical take-off and landing (eVTOL) aircraft for urban air mobility", Aerospace Science and Technology, vol. 125, Jun. 12, 2021, 10 pages.

Shen, et al., "Muitibody Dynamics Mode! of a VTOL Teetering Rotor", AHS Aeromechanics Specialists Conference 2010 (https://www.researchgate.net/publication/239590219_Multibody_Dynamics_Model_of_a_VTOL_Teetering_Rotor), Jan. 20, 2010, 8 pages.

* cited by examiner

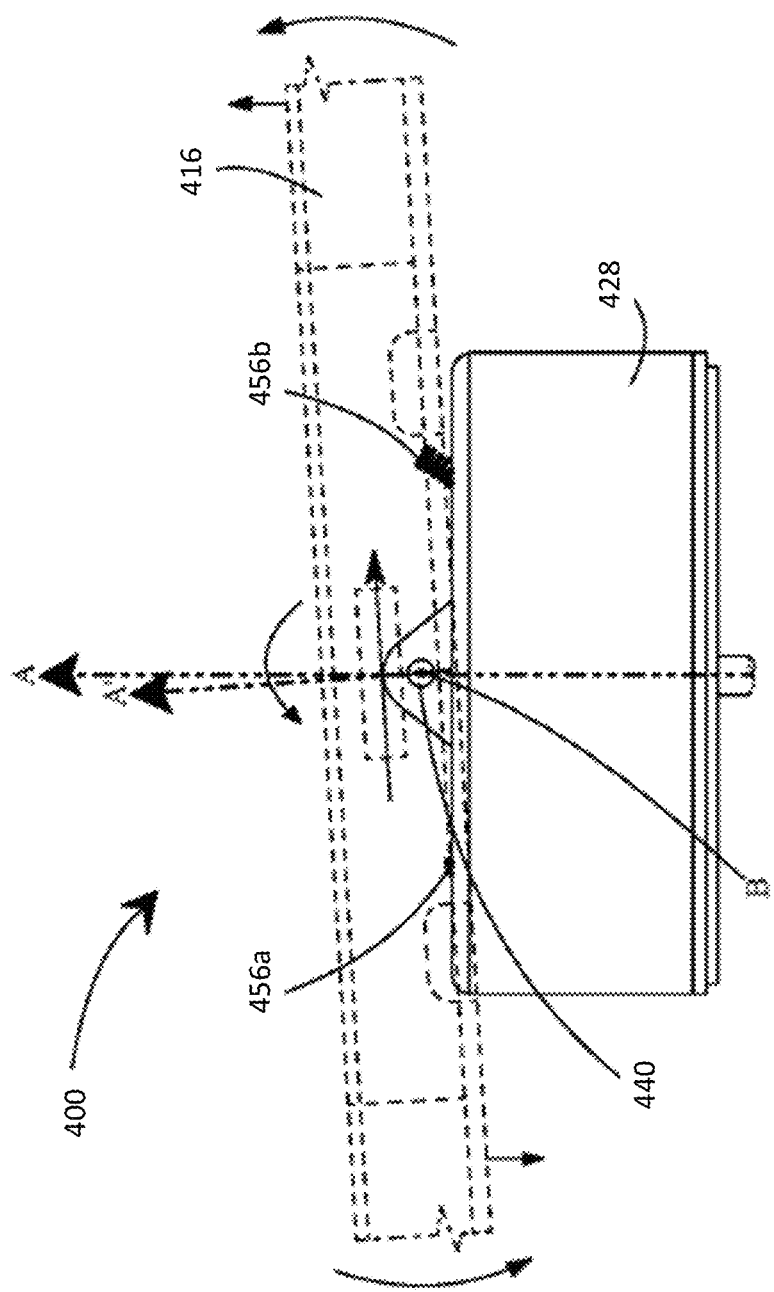

SYSTEM FOR CONTROLLING A PROPULSOR ASSEMBLY OF AN ELECTRIC AIRCRAFT

FIELD OF THE INVENTION

The present invention generally relates to the field of propulsor assemblies. In particular, the present invention is directed to a system for controlling a propulsor assembly of an electric aircraft.

BACKGROUND

Propulsors on electric aircraft may experience adverse forces during flight. For example, these forces may include gusts of wind or force imbalances resulting from the different amounts of lift generated by the advancing and proceeding blades of a propulsor. Existing solutions are not sufficient to solve this issue.

SUMMARY OF THE DISCLOSURE

In an aspect, a system for controlling a propulsor assembly of an electric aircraft is disclosed. The system may include an electric motor, wherein the electric motor may include a rotor and a stator, a propulsor driven by the electric motor configured to propel an electric aircraft. The propulsor may include a propeller. The propeller may include a blade. The system may include a cyclic control assembly configured to deflect the blade. The cyclic control assembly may include an actuator and a push rod mechanically connected to the actuator and the propulsor. The system may include a flight controller. The flight controller may be configured to receive sensor datum from at least a sensor communicatively connected to the electric aircraft, generate a deflection command as a function of the sensor datum and actuate the cyclic control assembly as a function of the deflection command.

In another aspect, a method for controlling a propulsor assembly of an electric aircraft is disclosed. The method may include receiving, using a flight controller, sensor datum from at least a sensor, wherein the at least a sensor is communicatively connected to an electric aircraft, wherein the electric aircraft comprises an electric motor comprising a stator and a rotor and a propulsor, wherein the propulsor comprises a propeller comprising a blade. The method may include generating, using the flight controller, a deflection command as a function of the sensor datum. The method may include actuating, using the flight controller, the cyclic control assembly as a function of the deflection command.

These and other aspects and features of non-limiting embodiments of the present invention will become apparent to those skilled in the art upon review of the following description of specific non-limiting embodiments of the invention in conjunction with the accompanying drawings.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein:

FIGS. 5A-B are a set of schematic diagrams illustrating an exemplary movement of teetering propulsor assembly in accordance with one or more embodiments of the present disclosure;

The drawings are not necessarily to scale and may be illustrated by phantom lines, diagrammatic representations and fragmentary views. In certain instances, details that are not necessary for an understanding of the embodiments or that render other details difficult to perceive may have been omitted.

DETAILED DESCRIPTION

At a high level, aspects of the present disclosure are directed to a system and a method for controlling a propulsor assembly of an electric aircraft. The system may include an electric motor, wherein the electric motor may include a rotor and a stator, and a propulsor driven by the electric motor configured to propel an electric aircraft. The propulsor may include a propeller. The propeller may include a blade. The system may include a cyclic control assembly configured to deflect the blade. The cyclic control assembly may include an actuator and a push rod mechanically connected to the actuator and the propulsor. The system may include a flight controller. The flight controller may be configured to receive sensor datum from at least a sensor communicatively connected to the electric aircraft, generate a deflection command as a function of the sensor datum and actuate the cyclic control assembly as a function of the deflection command.

Aspects of the present disclosure include a cyclic control assembly, wherein the cyclic control assembly may alter the flap angle and/or pitch angle of propulsor blades in order to compensate for unwanted forces. Cyclic control assembly may also provide greater ability for the pilot to control the electric aircraft. The cyclic control assembly includes a pushrod that translates movement from a swashplate, to the propulsor of the electric aircraft. In some embodiments, pushrod may extend through a rotor of an electric motor of the electric aircraft. This may decrease the drag generated by the cyclic control assembly. The swashplate may be actuated by an actuator. Movement of the swashplate may result in movement of the pushrod, which may change the pitch and/or flap angle of propulsor blades.

Aspects of the present disclosure allow the propulsor to include a flap mechanism. Flap mechanism may include a hinge for propulsor to rock back and forth on. In some embodiments, cyclic control assembly and/or flap mechanism may have a delta-3 angle that is not 90 degrees. This may allow for cyclic control assembly and/or flap mechanism to control the flap angle and pitch angle of a propulsor blade at the same time as flap angle and pitch angle are coupled together in this instance.

Figure 1:
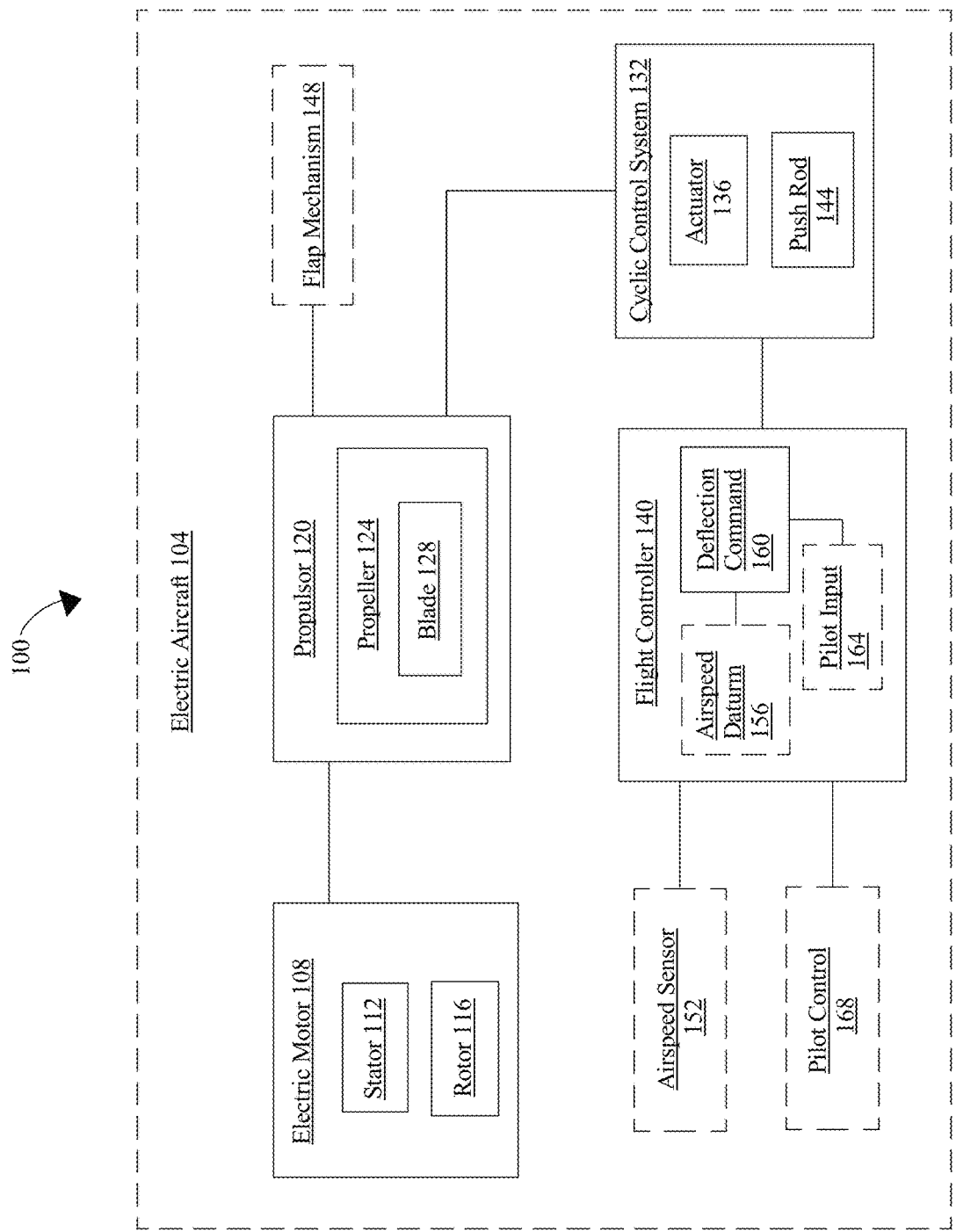
FIG. 1 is a block diagram of an exemplary system for controlling a propulsor assembly of an electric aircraft.

Referring now to FIG. 1, a block diagram of an exemplary system 100 for controlling a propulsor assembly of an electric aircraft is shown. For the purposes of this disclosure, an "electric aircraft" is an electrically powered aircraft. Electric aircraft 104 may be capable of rotor-based cruising flight, rotor-based takeoff, rotor-based landing, fixed-wing cruising flight, airplane-style takeoff, airplane-style landing, and/or any combination thereof. "Rotor-based flight," as described in this disclosure, is where the aircraft generated lift and propulsion by way of one or more powered rotors coupled with an engine, such as a quadcopter, multi-rotor helicopter, or other vehicle that maintains its lift primarily using downward thrusting propulsors. "Fixed-wing flight," as described in this disclosure, is where the aircraft is capable of flight using wings and/or foils that generate lift caused by the aircraft's forward airspeed and the shape of the wings and/or foils, such as airplane-style flight. In an embodiment, electric aircraft 104 may include electric vertical takeoff and landing (eVTOL) aircraft. A "vertical take-off and landing aircraft," as used in this disclosure, is an aircraft that can hover, take off, and land vertically. In another embodiment, an electric aircraft 104 may include an electric conventional takeoff and landing (eCTOL) aircraft. For the purposes of this disclosure, a "conventional take-off and landing aircraft" is an aircraft taking off and landing horizontally from a conventional length runway in the distance. In another embodiment, an electric aircraft 104 may include an electric short takeoff and landing (eSTOL) aircraft. For the purposes of this disclosure, a "short takeoff and landing aircraft" is an aircraft that needs a shorter minimum horizontal distance to accelerate in order to ascend into the air than typical fixed wing types of aircrafts. Additionally, the electric aircraft 104 disclosed herein is further described in detail in FIG. 9.

With continued reference to FIG. 1, system 100 includes an electric motor 108. An "electric motor," for the purposes of this disclosure, is a device that converts electrical energy into mechanical energy. Electric motor 108 may be driven by direct current (DC) electric power; for instance, a motor may include a brushed DC motor or the like. Electric motor 108 may be driven by electric power having varied or reversing voltage levels, such as alternating current (AC) power as produced by an alternating current generator and/or inverter, or otherwise varying power, such as produced by a switching power source. Electric motor 108 may include, without limitation, a brushless DC electric motor, a permanent magnet synchronous motor, a switched reluctance motor, and/or an induction motor; persons skilled in the art, upon reviewing the entirety of this disclosure, will be aware of various alternative or additional forms and/or configurations that a motor may take or exemplify as consistent with this disclosure. In addition to inverter and/or switching power source, a circuit driving motor may include electronic speed controllers (not shown) or other components for regulating motor speed, rotation direction, torque, and the like.

With continued reference to FIG. 1, an electric motor 108 includes a stator 112. For the purposes of this disclosure, a "stator" is a stationary portion of an electric motor. Electric motor 108 includes a rotor 116. A "rotor," for the purposes of this disclosure, is a rotating portion of an electric motor. As a non-limiting example, electric motor 108 may convert electrical energy into mechanical energy by rotating rotor 116. In some embodiments, rotor 116 may include a circular cross-section. In some embodiments, rotor 116 may include a hollow central portion. The rotor 116 disclosed herein may be consistent with a rotor described with respect to FIG. 6A-6B.

With continued reference to FIG. 1, in some embodiments, a rotor 116 may be connected to a shaft. For the purposes of this disclosure, a "shaft" is a mechanical element that is configured to rotate about its longitudinal axis. In some embodiments, shaft may define a central lumen. For the purposes of this disclosure, a "lumen" is a cavity in a tubular element. For the purposes of this disclosure, a "central lumen" is a lumen that runs longitudinally down the center of a tubular element. As a nonlimiting example, shaft may comprise a tubular element and a central lumen running from a first end of the rotor to a second end. In some embodiments, rotor 116 may be a component of shaft.

With continued reference to FIG. 1, in some embodiments, an electric motor 108 may be configured to rotate about a rotational axis. In some embodiments, rotational axis may extend longitudinally through rotor 116. In some embodiments, rotational axis may extend longitudinally through shaft. In some embodiments, rotational axis may extend longitudinally through the central axis of central lumen.

With continued reference to FIG. 1, in some embodiments, an electric motor 108 may include a plurality of electric motors. In some embodiments, electric motor 108 may include two electric motors 108. As a nonlimiting example, electric motor 108 may include a first electric motor and a second electric motor. In some embodiments, first electric motor may be consistent with electric motor 108 as described throughout this disclosure. In some embodiments, second electric motor may be consistent with electric motor 108 as described throughout this disclosure. First electric motor may comprise a stator 112 consistent with the stator 112 of electric motor 108. Second electric motor may comprise a stator 112 consistent with the stator 112 of electric motor 108. In some embodiments, first electric motor and second electric motor may each include a rotor. The rotor of first electric motor and second electric motor may be consistent with rotor 116 of electric motor 108. In some embodiments, first electric motor and second electric motor may include a shared rotor. Shared rotor may be consistent with rotor 116 of electric motor 108. In some embodiments, the rotor 116 of first electric motor may be a first rotor and/or the rotor 116 of second electric motor may be a second rotor. In some embodiments, first electric motor and second electric motor may each include a sprag clutch. Sprag clutch may allow first electric motor to rotate shaft even if second electric motor is not functioning, or vice versa. As non-limiting examples, a sprag clutch may be located between the first rotor and shaft and/or the second rotor and shaft. In some embodiments, electric motor 108 may be consistent with disclosure of motor in U.S. patent application Ser. No. 17/563,498, filed on Dec. 28, 2021 and titled "AN ELECTRIC AIRCRAFT LIFT MOTOR WITH AIR COOLING", which is incorporated by reference herein in its entirety.

With continued reference to FIG. 1, system 100 includes a propulsor 120 driven by an electric motor 108. In some embodiments, the propulsor 120 may be mechanically connected to a rotor 116 of the electric motor 108. In some embodiments, propulsor 120 may be connected to the rotor 116 using a shaft. As a non-limiting example, the shaft may transmit rotational motion between the rotor 116 and the propulsor 120. A "propulsor", as used in this disclosure, is a component or device used to propel a craft by exerting force on a fluid medium, which may include a gaseous medium such as air or a liquid medium such as water. As a non-limiting example, the propulsor is configured to propel an electric aircraft 104. Propulsor 120 may include one or more propulsive devices. The propulsor 120 disclosed herein may be consistent with a propulsor disclosed with respect to FIG. 2. The propulsor 120 disclosed herein may be consistent with a propulsor found in U.S. patent application Ser. No. 18/129,424, filed on Mar. 31, 2023, and entitled "PROPULSOR ASSEMBLY OF AN ELECTRIC AIRCRAFT," the entirety of which is incorporated as a reference.

With continued reference to FIG. 1, a propulsor 120 may include at least a lift propulsor. A "lift propulsor," for the purposes of this disclosure, is a propulsor that is configured to generate lift. For the purposes of this disclosure, "lift" is a force that is directed upwards. In some embodiments, propulsor 120 may include a plurality of lift propulsors. In some embodiments, propulsor 120 may include two lift propulsors. In some embodiments, propulsor 120 may include 4 lift propulsors. In some embodiments, propulsor 120 may include 8 lift propulsors.

With continued reference to FIG. 1, in an embodiment, a propulsor 120 may include a thrust element. Front propulsors and/or rear propulsors of propulsor 120 may each be lift propulsors. A thrust element may include any device or component that converts the mechanical energy of a motor, for instance in the form of rotational motion of a shaft, into thrust in a fluid medium. For example, a thrust element may include without limitation a marine propeller or screw, an impeller, a turbine, a pump-jet, a paddle or paddle-based device, or the like. Persons skilled in the art, upon reviewing the entirety of this disclosure, would appreciate, after having read the entirety of this disclosure, various devices that may be used as at least a thrust element. As used herein, a thrust element may include, without limitation, a device using moving or rotating foils, including without limitation one or more rotors, an airscrew or propeller, a set of airscrews or propellers such as contra-rotating propellers, a moving or flapping wing, or the like.

With continued reference to FIG. 1, a propulsor 120 includes a propeller 124. For the purposes of this disclosure, a "propeller" is a part of a propulsor that propels an aircraft and includes a blade and a hub. In some embodiments, the propeller 124 includes a blade 128. For the purposes of this disclosure, a "blade" is an element that extends outward from a hub of a propulsor and configured to generate a force when rotated about a rotational axis of the propulsor. In some embodiments, blade 128 may include an airfoil cross section. An "airfoil cross section," for the purposes of this disclosure, is a two-dimensional shape designed to produce an aerodynamic force when moved through a gas. As a non-limiting example, airfoil cross section may include a NACA airfoil. In some embodiments, the shape of the airfoil cross section may change as blade 128 progresses from root to tip. In some embodiments, plurality of blades 128 may include two blades 128. In some embodiments, plurality of blades 128 may include three blades 128. In some embodiments, plurality of blades 128 may include four blades 128. In some embodiments, plurality of blades 128 may include six blades 128. Plurality of blades 128 may be disposed symmetrically about hub 118. Plurality of blades 128 may be disposed at equal angles about hub 118. In some embodiments, blades 128 of plurality of blades 128 may be set at a fixed pitch, wherein blades 128 are not able to adjust their pitch while in flight. In some embodiments, blades 128 may be able to alter their pitch, such as through rotation. In some embodiments, propulsor 120 may comprise a monolithic propulsor 120. A "monolithic propulsor," for the purposes of this disclosure is a propulsor, wherein the blades and hub components are a singular unit. A "hub," for the purposes of this disclosure is a central portion of a propulsor to which blades of a propeller connect. In an embodiment, when a propulsor 120 twists and pulls air behind it, it will, at the same time, push an electric aircraft 104 forward with an equal amount of force. In an embodiment, when the propulsor 120 twists and pulls air below it, it will, at the same time, push the electric aircraft 104 upward with an equal amount of force. In an embodiment, thrust element may include a helicopter rotor incorporated into propulsor 120. A helicopter rotor, as used herein, may include one or more blade or wing elements driven in a rotary motion to drive fluid medium in a direction axial to the rotation of the blade or wing element. Its rotation is due to the interaction between the windings and magnetic fields which produces a torque around the rotor's axis. A helicopter rotor may include a plurality of blade or wing elements. Persons skilled in the art, upon reviewing the entirety of this disclosure, will be aware of various devices that may be used as propulsor 120.

With continued reference to FIG. 1, system 100 includes a cyclic control assembly 132. A "cyclic control assembly," for the purposes of this disclosure, is an assembly configured to alter the pitch of propulsor blades, such that each blade will have the same angle of incidence when they pass the same point in the cycle. The cyclic control assembly 132 disclosed herein may be consistent with a cyclic control assembly found in patent application Ser. No. 18/129,424, filed on Mar. 31, 2023, and entitled "PROPULSOR ASSEMBLY OF AN ELECTRIC AIRCRAFT,', the entirety of which is incorporated as a reference.

With continued reference to FIG. 1, a cyclic control assembly 132 includes an actuator 136. For the purposes of this disclosure, an "actuator" is a component of a machine that is responsible for moving and/or controlling a mechanism or system. The actuator 136 may, in some cases, require a control signal and/or a source of energy or power. In some cases, a control signal may be relatively low energy. Exemplary control signal forms include electric potential or current, pneumatic pressure or flow, or hydraulic fluid pressure or flow, mechanical force/torque or velocity, or even human power. In some cases, the actuator 136 may have an energy or power source other than control signal. This may include a main energy source, which may include for example electric power, hydraulic power, pneumatic power, mechanical power, and the like. In some cases, upon receiving a control signal, the actuator 136 may respond by converting source power into mechanical motion. In some cases, the actuator 136 may be understood as a form of automation or automatic control. The actuator 136 disclosed herein may be consistent with an actuator found in patent application Ser. No. 18/129,424, filed on Mar. 31, 2023, and entitled "PROPULSOR ASSEMBLY OF AN ELECTRIC AIRCRAFT,' the entirety of which is incorporated as a reference.

With continued reference to FIG. 1, in some embodiments, an actuator 136 may include a hydraulic actuator. The hydraulic actuator may consist of a cylinder or fluid motor that uses hydraulic power to facilitate mechanical operation. Output of the hydraulic actuator may include mechanical motion, such as without limitation linear, rotatory, or oscillatory motion. In some cases, the hydraulic actuator may employ a liquid hydraulic fluid. As liquids, in some cases. are incompressible, a hydraulic actuator can exert large forces. Additionally, as force is equal to pressure multiplied by area, the hydraulic actuators may act as force transformers with changes in area (e.g., cross sectional area of cylinder and/or piston). An exemplary hydraulic cylinder may consist of a hollow cylindrical tube within which a piston can slide. In some cases, the hydraulic cylinder may be considered single acting. The single acting hydraulic cylinder may be used when fluid pressure is applied substantially to just one side of a piston. Consequently, a single acting piston can move in only one direction. In some cases, a spring may be used to give a single acting piston a return stroke. In some cases, a hydraulic cylinder may be double acting. The double acting hydraulic cylinder may be used when pressure is applied substantially on each side of a piston; any difference in resultant force between the two sides of the piston causes the piston to move.

With continued reference to FIG. 1, in some embodiments, an actuator 136 may include a pneumatic actuator. In some cases, the pneumatic actuator may enable considerable forces to be produced from relatively small changes in gas pressure. In some cases, the pneumatic actuator May respond more quickly than other types of actuators, for example hydraulic actuators. The pneumatic actuator may use compressible fluid (e.g., air). In some cases, the pneumatic actuator may operate on compressed air. Operation of hydraulic and/or pneumatic actuators may include control of one or more valves, circuits, fluid pumps, and/or fluid manifolds.

With continued reference to FIG. 1, an actuator 136 may be an electric actuator. In some embodiments, the electric actuator may include any electromechanical actuators, linear motors, and the like. In some cases, the actuator 136 may include an electromechanical actuator. The electromechanical actuator may convert a rotational force of an electric rotary motor into a linear movement to generate a linear movement through a mechanism. Exemplary mechanisms, include rotational to translational motion transformers, such as without limitation a belt, a screw, a crank, a cam, a linkage, a scotch yoke, and the like. In some cases, control of an electromechanical actuator may include control of electric motor, for instance a control signal may control one or more electric motor parameters to control electromechanical actuator. Exemplary non-limitation electric motor parameters include rotational position, input torque, velocity, current, and potential. The electric actuator may include a linear motor. The linear motors may differ from electromechanical actuators, as power from linear motors is output directly as translational motion, rather than output as rotational motion and converted to translational motion. In some cases, the linear motor may cause lower friction losses than other devices. The linear motors may be further specified into at least 3 different categories, including flat linear motor, U-channel linear motors and tubular linear motors. The linear motors may be directly controlled by a control signal for controlling one or more linear motor parameters. Exemplary linear motor parameters include without limitation position, force, velocity, potential, and current.

With continued reference to FIG. 1, in some embodiments, an actuator 136 may include a mechanical actuator. In some cases, the mechanical actuator may function to execute movement by converting one kind of motion, such as rotary motion, into another kind, such as linear motion. An exemplary mechanical actuator may include a rack and pinion. In some cases, a mechanical power source, such as a power take off may serve as power source for the mechanical actuator. The mechanical actuators may employ any number of mechanisms, including for example without limitation gears, rails, pulleys, cables, linkages, and the like.

With continued reference to FIG. 1, in some embodiments, an actuator 136 may be attached to a fixed portion of an electric aircraft 104 and a swashplate. A "swashplate," for the purposes of this disclosure, is a mechanical device that translates input from pilot controls to a propulsor, including at least translating input from pilot controls to a cyclic control assembly. Translating input from pilot controls to propulsor 120 may include receiving commands from a flight controller 140. The flight controller 140 disclosed herein is further described below. The swash plate disclosed herein may be consistent with a swashplate found in patent application Ser. No. 18/129,424, filed on Mar. 31, 2023, and entitled "PROPULSOR ASSEMBLY OF AN ELECTRIC AIRCRAFT,' the entirety of which is incorporated as a reference.

With continued reference to FIG. 1, cyclic control assembly 132 includes a push rod 144. A "push rod," for the purposes of this disclosure, is a mechanical linkage that transmits linear motion between an actuator and a propulsor. A "mechanical linkage," is a mechanical component that is configured to transmit motion and/or forces. Push rod 144, in some embodiments, may include a long, thin rod, wherein the rod's length is more than 5 times its thickness. Push rod 144 may be made from a variety of materials, including, but not limited to aluminum, titanium, and the like. Push rod 144 is mechanically connected to an actuator 136 and propulsor 120. For the purposes of this disclosure, "mechanically connected" refers to components that are connected by one or more mechanical components by way of mechanical coupling. As a non-limiting example, the components may be connected by way of mechanical linkages or fasteners. Said mechanical coupling can include, for another example without limitation, rigid coupling, such as beam coupling, bellows coupling, bushed pin coupling, constant velocity, split-muff coupling, diaphragm coupling, disc coupling, donut coupling, elastic coupling, flexible coupling, fluid coupling, gear coupling, grid coupling, Hirth joints, hydrodynamic coupling, jaw coupling, magnetic coupling, Oldham coupling, sleeve coupling, tapered shaft lock, twin spring coupling, rag joint coupling, universal joints, or any combination thereof. In some instances, the terminology "mechanically connected" may be used in place of mechanically coupled in this disclosure. The push rod 144 disclosed herein may be consistent with a push rod found in patent application Ser. No. 18/129,424, filed on Mar. 31, 2023, and entitled "PROPULSOR ASSEMBLY OF AN ELECTRIC AIRCRAFT,' the entirety of which is incorporated as a reference.

With continued reference to FIG. 1, in some embodiments, a blade angle of a propulsor 120 may be changed by a cyclic control assembly 132. "Blade angle," for the purposes of this disclosure, is an angular property of a blade of a propulsor. In some embodiments, the blade angle may include a pitch angle. A "pitch angle," for the purposes of this disclosure, is the angle between the chord line of a blade of a propulsor and a reference plane containing a hub of the propulsor. In some embodiments, the blade angle may include a flap angle. A "flap angle," for the purposes of this disclosure, is the angle between a longitudinal axis of a blade of a propulsor and a reference plane containing a hub of the propulsor. For the purposes of this disclosure, a "reference plane" is an axis passing horizontally through a propulsor hub when the propulsor is in its default position. In some embodiments, the reference plane may run from a tip of a first blade of blades 128 of a propeller 124 to a tip of a second blade of the blades 128 of the propeller 124. An "increase" in blade angle may occur when the propulsor 120 rotates in a clockwise direction about an axis going into the page in FIG. 2. A "decrease" in the blade angle may occur when the propulsor rotates in a counterclockwise direction about an axis going into the page in FIG. 2. Clockwise and counterclockwise are defined with reference to FIG. 2. The push rod 144 may be configured to increase a blade angle of the propulsor 120 when the push rod 144 is displaced in a first direction. First direction, in some embodiments, may be defined as a downwards direction. The push rod 144 may be configured to decrease a blade angle of the propulsor 120 when the push rod 144 is displaced in a second direction. Second direction, in some embodiments, may be defined as an upwards direction. "Upwards" and "downwards" are defined with reference to FIG. 2. In some embodiments, the push rod 144 may extend at least partially through a central lumen. In some embodiments, the push rod 144 may extend through the entirety of central lumen. The push rod 144 may run parallel to a rotational axis of the propulsor 120. In some embodiments, the rotational axis may run through the push rod 144. In some embodiments, increasing and/or decreasing a blade angle of the propulsor 120 may include changing pitch angle and/or flap angle of a blade 128 of the propulsor 120.

With continued reference to FIG. 1, in some embodiments, system 100 may include a flap mechanism 148. A "flap mechanism," for the purposes of this disclosure, is a mechanism configured to allow a propulsor to flap. Flap mechanism 148 may be mechanically connected to propulsor 120. In some embodiments, flap mechanism 148 may change the flap angle of blades 128 of propulsor 120. In some embodiments, flap mechanism 148 may be configured to passively control in-flight transients. For the purposes of this disclosure, "in-flight transients" are transient forces on a propulsor that arise in flight. As a non-limiting example, in-flight transients may include gusts of wind. As a non-limiting example, in-flight transients may cause uneven forces on blades 128 of propulsor 120 resulting in a torque about a hub of propulsor 120 and rotor 116 of electric motor 108. This torque may lead to the failure of excessive wearing of components and is desirable to avoid. In some embodiments, flap mechanism 148 may be actively controlled by a flight controller 140. Flap mechanism 148 is further disclosed with reference to a flapping mechanism of FIGS. 4, 5A, and 5B.

With continued reference to FIG. 1, in some embodiments, a system 100 may include at least a sensor. For the purposes of this disclosure, a "sensor" is a device that produces an output signal for the purpose of sensing a physical phenomenon. For example, and without limitation, the at least a sensor may transduce a detected phenomenon, such as without limitation, temperature, voltage, current, pressure, speed, motion, light, moisture, and the like, into a sensed signal. The at least a sensor may output the sensed signal, such as without limitation sensor datum. The sensor datum disclosed herein is further described below. The at least a sensor may include any computing device as described in the entirety of this disclosure and configured to convert and/or translate a plurality of signals detected into electrical signals for further analysis and/or manipulation. Electrical signals may include analog signals, digital signals, periodic or aperiodic signal, step signals, unit impulse signal, unit ramp signal, unit parabolic signal, signum function, exponential signal, rectangular signal, triangular signal, sinusoidal signal, sinc function, or pulse width modulated signal. Any datum captured by the at least a sensor may include circuitry, computing devices, electronic components or a combination thereof that translates into at least an electronic signal configured to be transmitted to another electronic component. In a non-limiting embodiment, the at least a sensor may include a plurality of sensors comprised in a sensor suite. In one or more embodiments, and without limitation, the at least a sensor may include a plurality of sensors.

With continued reference to FIG. 1, in some embodiments, at least a sensor may include an airspeed sensor 152. For the purposes of this disclosure, an "airspeed sensor" is instrument that measures the speed of an aircraft relative to the surrounding air. In some embodiments, the airspeed sensor 152 may be configured to detect and transduce airspeed of an electric aircraft 104 into airspeed datum. In some embodiments, the airspeed sensor 152 may be configured to transmit the airspeed datum to a flight controller 140. The airspeed sensor 152 may be analog or digital sensor. The airspeed sensor 152 may measure the speed of an electric aircraft 104 using the differential between the pressure of still air (static pressure) and that of moving air compressed by the forward motion of the electric aircraft (ram pressure.) In some embodiments, the airspeed sensor 152 may include a pitot tube. For the purposes of this disclosure, a "pitot tube" is instrument for measuring the velocity of a flowing fluid, such as without limitation air. The pitot tube may include a U-shaped apparatus with two ports, one perpendicular to the flow of air past the electric aircraft 104 (static port) and one facing directly into the flow (dynamic port). Mercury or a similar liquid may fill the bend in the pitot tube, forming parallel columns balanced by the air pressure on each side. When static and ram pressure are equal, the columns may have the same height. As the ram pressure increases, mercury on that side of the tube may be pushed back and the columns become imbalanced. The difference between the two columns may be calibrated to indicate the speed of the electric aircraft 104. In some embodiments, the airspeed sensor 152 may include a pressure sensor. For the purposes of this disclosure, a "pressure sensor" is a measure of force required to stop a fluid from expanding and is usually stated in terms of force per unit area. The pressure sensor that may be included in at least a sensor may be configured to measure an atmospheric pressure and/or a change of atmospheric pressure. In some embodiments, the pressure sensor may include an absolute pressure sensor, a gauge pressure sensor, a vacuum pressure sensor, a differential pressure sensor, a sealed pressure sensor, and/or other unknown pressure sensors or alone or in a combination thereof. The pressure sensor may include a barometer. In some embodiments, the pressure sensor may be used to indirectly measure fluid flow, speed, water level, and altitude. In some embodiments, the pressure sensor may be configured to transform a pressure into an analogue electrical signal. In some embodiments, the pressure sensor may be configured to transform a pressure into a digital signal. The ports of the pitot tube may be connected to the pressure sensor. When the pitot tube is pointing forward on the electric aircraft 104, it may measure the difference between the pressure from dynamic and static port. When factoring in the temperature it may estimate the speed of the aircraft through air. In some embodiments, the airspeed sensor 152 may include a temperature sensor. For the purposes of this disclosure, a "temperature sensor" is a device that detects heat and converts it into an electrical signal. As a non-limiting example, the temperature sensor may include thermocouples, thermistors, thermometers, passive infrared sensors, resistance temperature sensors (RTD's), semiconductor based integrated circuits (IC), a combination thereof or another undisclosed sensor type, alone or in combination. For the purposes of this disclosure and as would be appreciated by someone of ordinary skill in the art, "temperature" is a measure of the heat energy of a system. Temperature, as measured by any number or combinations of sensors, may be measured in Fahrenheit (° F.), Celsius (° C.), Kelvin (° K), or another scale alone or in combination. The temperature measured by sensors may comprise electrical signals which are transmitted to their appropriate destination wireless or through a wired connection. In some embodiments, the airspeed sensor may include a Machmeter. For the purposes of this disclosure, "Machmeter" is instrument that measure the airspeed relative to the speed of sound. The Machmeter may provide an indication of the Mach Number, (M), which is the ratio between the aircraft true air speed (TAS) and the local speed of sound (LSS).

With continued reference to FIG. 1, in some embodiments, a system 100 includes a flight controller 140. The flight controller 140 may include any computing device as described in this disclosure, including without limitation a microcontroller, microprocessor, digital signal processor (DSP) and/or system on a chip (SoC) as described in this disclosure. Computing device may include, be included in, and/or communicate with a mobile device such as a mobile telephone or smartphone. The flight controller 140 may include a single computing device operating independently, or may include two or more computing device operating in concert, in parallel, sequentially or the like; two or more computing devices may be included together in a single computing device or in two or more computing devices. The flight controller 140 may interface or communicate with one or more additional devices as described below in further detail via a network interface device. Network interface device may be utilized for connecting the flight controller 140 to one or more of a variety of networks, and one or more devices. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network may employ a wired and/or a wireless mode of communication. In general, any network topology may be used. Information (e.g., data, software etc.) may be communicated to and/or from a computer and/or a computing device. The flight controller 140 may include but is not limited to, for example, a computing device or cluster of computing devices in a first location and a second computing device or cluster of computing devices in a second location. The flight controller 140 may include one or more computing devices dedicated to data storage, security, distribution of traffic for load balancing, and the like. The flight controller 140 may distribute one or more computing tasks as described below across a plurality of computing devices of computing device, which may operate in parallel, in series, redundantly, or in any other manner used for distribution of tasks or memory between computing devices. The flight controller 140 may be implemented using a "shared nothing" architecture in which data is cached at the worker, in an embodiment, this may enable scalability of system 100 and/or computing device.

With continued reference to FIG. 1, a flight controller 140 may be designed and/or configured to perform any method, method step, or sequence of method steps in any embodiment described in this disclosure, in any order and with any degree of repetition. For instance, the flight controller 140 may be configured to perform a single step or sequence repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. The flight controller 140 may perform any step or sequence of steps as described in this disclosure in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

With continued reference to FIG. 1, in some embodiments, a flight controller 140 is communicatively connected to at least a sensor. The flight controller 140 is configured to receive sensor datum from the at least a sensor. For the purposes of this disclosure, "sensor datum" is datum generated by at least a sensor. In some embodiments, the sensor datum may include airspeed datum 156. For the purposes of this disclosure, "airspeed datum" is sensor datum related to airspeed. For the purposes of this disclosure, "airspeed" is the speed of an aircraft relative to the air through which it is moving. As a non-limiting example, an airspeed sensor 152 may detect airspeed of an electric aircraft 104 and output the airspeed of the electric aircraft 104 as airspeed datum 156 to the flight controller 140.

With continued reference to FIG. 1, for the purposes of this disclosure, "communicatively connected" means connected by way of a connection, attachment or linkage between two or more relata which allows for reception and/or transmittance of information therebetween. For example, and without limitation, this connection may be wired or wireless, direct or indirect, and between two or more components, circuits, devices, systems, and the like, which allows for reception and/or transmittance of data and/or signal(s) therebetween. Data and/or signals therebetween may include, without limitation, electrical, electromagnetic, magnetic, video, audio, radio and microwave data and/or signals, combinations thereof, and the like, among others. A communicative connection may be achieved, for example and without limitation, through wired or wireless electronic, digital or analog, communication, either directly or by way of one or more intervening devices or components. Further, communicative connection may include electrically coupling or connecting at least an output of one device, component, or circuit to at least an input of another device, component, or circuit. For example, and without limitation, via a bus or other facility for intercommunication between elements of a computing device. Communicative connecting may also include indirect connections via, for example and without limitation, wireless connection, radio communication, low power wide area network, optical communication, magnetic, capacitive, or optical coupling, and the like. In some instances, the terminology "communicatively coupled" may be used in place of communicatively connected in this disclosure.

With continued reference to FIG. 1, a flight controller 140 is configured to generate a deflection command 160 as a function of sensor datum. In some embodiments, the flight controller 140 may be configured to generate the deflection command 160 as a function of airspeed datum 156. For the purposes of this disclosure, a "deflection command" is a command to deflect a blade of an electric aircraft. The blade 128 disclosed herein is further described above. In some embodiments, the deflection command 160 may include 'increase a blade angle of the blade 128 of the electric aircraft 104.' The blade angle disclosed herein is further described above. In another embodiment, the deflection command 160 may include decrease the blade angle of the blade 128 of the electric aircraft 104.' In some embodiments, the deflection command 160 may include a blade angle, to which the blade gets deflected.

With continued reference to FIG. 1, database may be implemented, without limitation, as a relational database, a key-value retrieval database such as a NOSQL database, or any other format or structure for use as a database that a person skilled in the art would recognize as suitable upon review of the entirety of this disclosure. Database may alternatively or additionally be implemented using a distributed data storage protocol and/or data structure, such as a distributed hash table or the like. Database may include a plurality of data entries and/or records as described above. Data entries in a database may be flagged with or linked to one or more additional elements of information, which may be reflected in data entry cells and/or in linked tables such as tables related by one or more indices in a relational database. Persons skilled in the art, upon reviewing the entirety of this disclosure, will be aware of various ways in which data entries in a database may store, retrieve, organize, and/or reflect data and/or records as used herein, as well as categories and/or populations of data consistently with this disclosure.

With continued reference to FIG. 1, in some embodiments, a deflection command 160 may be configured to eliminate an imbalance of lift generated by at least an advancing blade and at least a receding blade of a propulsor. For the purposes of this disclosure, an "imbalance" of a force means the force applied on one point and the force applied on another point is not equal. The imbalance of lift may affect safety and efficiency of flight. The imbalance of lift may result in damage in the propulsor. For the purposes of this disclosure, an "advancing blade" is a blade of a propulsor that is moving into the airflow when the blade is rotating. For the purposes of this disclosure, a "receding blade" is a blade of a propulsor that is moving with the airflow when the blade is rotating. As the advancing blade is moving into the airflow when the advancing blade is rotating, the advancing blade may experience higher velocity of the airflow moving over the advancing blade than the receding blade. Thus, the advancing blade may generate more lift than the receding blade, which results in an imbalance of lift between the advancing blade and the receding blade, which also means an imbalance of lift in the propulsor.

With continued reference to FIG. 1, in some embodiments, a flight controller 140 may calculate a deflection command 160 to eliminate an imbalance of lift using an equation below.

$$Lift = Cl * \frac{\rho * V^2}{2} * A,$$

wherein Cl is lift coefficient, ρ is air density, V is airspeed, A is area of a blade. For the purposes of this disclosure, a "lift coefficient" is a dimensionless quantity that relates the lift generated by a lifting body to the fluid density around the body, the fluid velocity and an associated reference area.

With continued reference to FIG. 1, in some embodiments, a flight controller 140 may be configured to generate a deflection command 160 using a deflection lookup table. For the purposes of this disclosure, a "deflection lookup table" is a lookup table for generating a deflection command. A "lookup table," for the purposes of this disclosure, is an array of data that maps input values to output values. In some embodiments, the flight controller 140 may 'lookup' a given airspeed datum 156 for the related deflection command 160. As a non-limiting example, the flight controller 140 may 'lookup' a given airspeed datum 156 to a deflection command 160 of 'increase the blade angle of the blade.' As another non-limiting example, the flight controller 140 may 'lookup' a given airspeed datum 156 to a deflection command 160 of 'decrease the blade angle of the blade.' The lookup table may be used to replace a runtime computation with an array indexing operation. As a non-limiting example, an input value of the deflection lookup table may include a plurality of airspeed datum. As a non-limiting example, an output value of the deflection lookup table may include a plurality of deflection angles of a blade. For example without limitation, the output value may include −38, −15, −10, −5, −1, 0, 5, 8, 13, 20, 50, 70, and the like. The negative value of the output value may indicate decreasing a deflection angle of a blade 128, while the positive value of the output value may indicate increasing the deflection angle of the blade 128 upward. The output value of zero may indicate that the blade does not need to be changed. As a non-limiting example, when the output of the deflection lookup table is −10, then the flight controller 140 may generate the deflection command 160 as 'decrease a deflection angle of a blade by 10°. As another non-limiting example, when the output of the deflection lookup table is 20, then the flight controller 140 may generate the deflection command 160 as 'increase a deflection angle of a blade by 20°. As another non-limiting example, when the output of the deflection lookup table is 0, the flight controller 140 may generate the deflection command 160 as 'do not change a blade angle.' As another non-limiting example, when the output of the deflection lookup table is 0, then the flight controller 140 may not generate the deflection command 160. In an embodiment, the lookup table may include interpolation. For the purposes of this disclosure, an "interpolation" refers to a process for estimating values that lie between the range of known data. As a non-limiting example, the lookup table may include an output value for each of input values. When the lookup table does not define the input values, then the lookup table may estimate the output values based on the nearby table values. In another embodiment, the lookup table may include an extrapolation. For the purposes of this disclosure, an "extrapolation" refers to a process for estimating values that lie beyond the range of known data. As a non-limiting example, the lookup table may linearly extrapolate the nearest data to estimate an output value for an input beyond the data.

With continued reference to FIG. 1, in some embodiments, a flight controller 140 is configured to actuate a cyclic control assembly 132 as a function of a deflection command 160. In some embodiments, a flight controller 140 may be communicatively connected to a cyclic control assembly 132. In some embodiments, the flight controller 140 may be communicatively connected to an actuator 136 of the cyclic control assembly 132. As a non-limiting example, the flight controller 140 may command the actuator 136 of the cyclic control assembly 132 to increase a deflection angle of a blade 128 of a propulsor 120. For the purposes of this disclosure, a "deflection angle" of a blade refers to an angle of a blade getting deflected. In some embodiments, a deflection angle may include a pitch angle. As another non-limiting example, the flight controller 140 may be configured to command the actuator 136 of the cyclic control assembly 132 to decrease the deflection angle of the blade 128 of the propulsor 120. The cyclic control assembly 132 disclosed herein may be consistent with a cyclic control assembly disclosed in FIG. 2 and a cyclic control assembly found in U.S. patent application Ser. No. 18/129,424, filed on Mar. 31, 2023, and entitled "PROPULSOR ASSEMBLY OF AN ELECTRIC AIRCRAFT,' the entirety of which is incorporated as a reference.

With continued reference to FIG. 1, in some embodiments, a flight controller 140 may be configured to receive a pilot input 164 from a pilot control 168. In some embodiments, the flight controller 140 may be communicatively connected to the pilot control 168. For the purposes of this disclosure, a "pilot input" is any input generated from maneuvering a pilot control. For the purposes of this disclosure, a "pilot control" is a mechanism or means which allows a pilot to control operation of flight components of an aircraft. For example, and without limitation, the pilot control 168 may include a collective, inceptor, foot bake, steering and/or control wheel, control stick, pedals, throttle levers, and the like. In some embodiments, the pilot control 168 may not include a collective control. The pilot control 168 may be configured to translate a pilot's desired torque and/or movement for each flight component of the plurality of flight components. As a non-limiting example, the flight components may include propulsor 120, cyclic control assembly 132, wherein the cyclic control assembly 132 includes an actuator 136. The pilot control 168 may be configured to control, via inputs and/or signals such as from a pilot, the blade 128 of an electric aircraft 104. The pilot control 168 may be physically located in a cockpit of an electric aircraft 104 or remotely located outside of the electric aircraft 104 in another location communicatively connected to at least a portion of the electric aircraft 104. Pilot control 168 may include buttons, switches, or other binary inputs in addition to, or alternatively than digital controls about which a plurality of inputs may be received. Pilot control 168 may be configured to receive a physical manipulation of a control like a pilot using a hand and arm to push or pull a lever, or a pilot using a finger to manipulate a switch. Pilot control 168 may also be operated by a voice command by a pilot to a microphone and computing system consistent with the entirety of this disclosure. Pilot control 168 may be communicatively connected to any other component presented in the system 100, the communicative connection may include redundant connections configured to safeguard against single-point failure. Pilot controls are further described in U.S. patent application Ser. No. 18/090,278, filed on Dec. 22, 2022, and titled "HOVER AND THRUST ASSEMBLY FOR DUAL-MODE AIRCRAFT," the entirety of which is incorporated herein by reference. The collective control may be consistent with disclosure of collective pitch control in U.S. patent application Ser. No. 16/929,206, filed Jul. 15, 2020, and titled "HOVER AND THRUST CONTROL ASSEMBLY FOR DUAL-MODE AIRCRAFT", which is incorporated herein by reference in its entirety.

With continued reference to FIG. 1, in some embodiments, a flight controller 140 may receive pilot input 164 from a pilot control 168 and control a cyclic control assembly 132 in response to the pilot input 164. As a non-limiting example, the flight controller 140 may receive the pilot input 164 from the pilot control 168 to decrease a blade angle of a blade 128 of a propulsor 120, then the flight controller 140 may control an actuator 136 of the cyclic control assembly 132 to deflect the blade 128 to decrease the blade angle of the blade 128. As another non-limiting example, the flight controller 140 may receive the pilot input 164 from the pilot control 168 to increase the blade angle of the blade of the propulsor 120, then the flight controller 140 may control the actuator 136 of the cyclic control assembly 132 to deflect the blade 128 to increase the blade angle of the blade 128. In some embodiments, an actuator 136 of the cyclic control assembly 132 may be mechanically disconnected from the pilot control 168. In some embodiments, the actuator 136 may be mechanically disconnected from the pilot control 168 if there is no mechanical reversion between the actuator 136 and the pilot control 168. For the purposes of this disclosure, "Mechanical reversion," for the purposes of this disclosure, is actuation using only mechanical means of one of more control elements of an aircraft.

With continued reference to FIG. 1, in some embodiments, a flight controller 140 may be configured to control an attitude of an electric aircraft 104 by controlling power to a propulsor 120. As a non-limiting example, the flight controller 140 may control one or more torque, current, RPM, and the like of the propulsor 120. Additional disclosure of the flight controller 140 may be found in patent application Ser. No. 18/129,366, filed on Mar. 31, 2023, and entitled "A SYSTEM AND A METHOD FOR A BATTERY POWER MANAGEMENT SYSTEM FOR AN ELECTRIC AIRCRAFT," the entirety of which is incorporated by reference.

Figure 2:
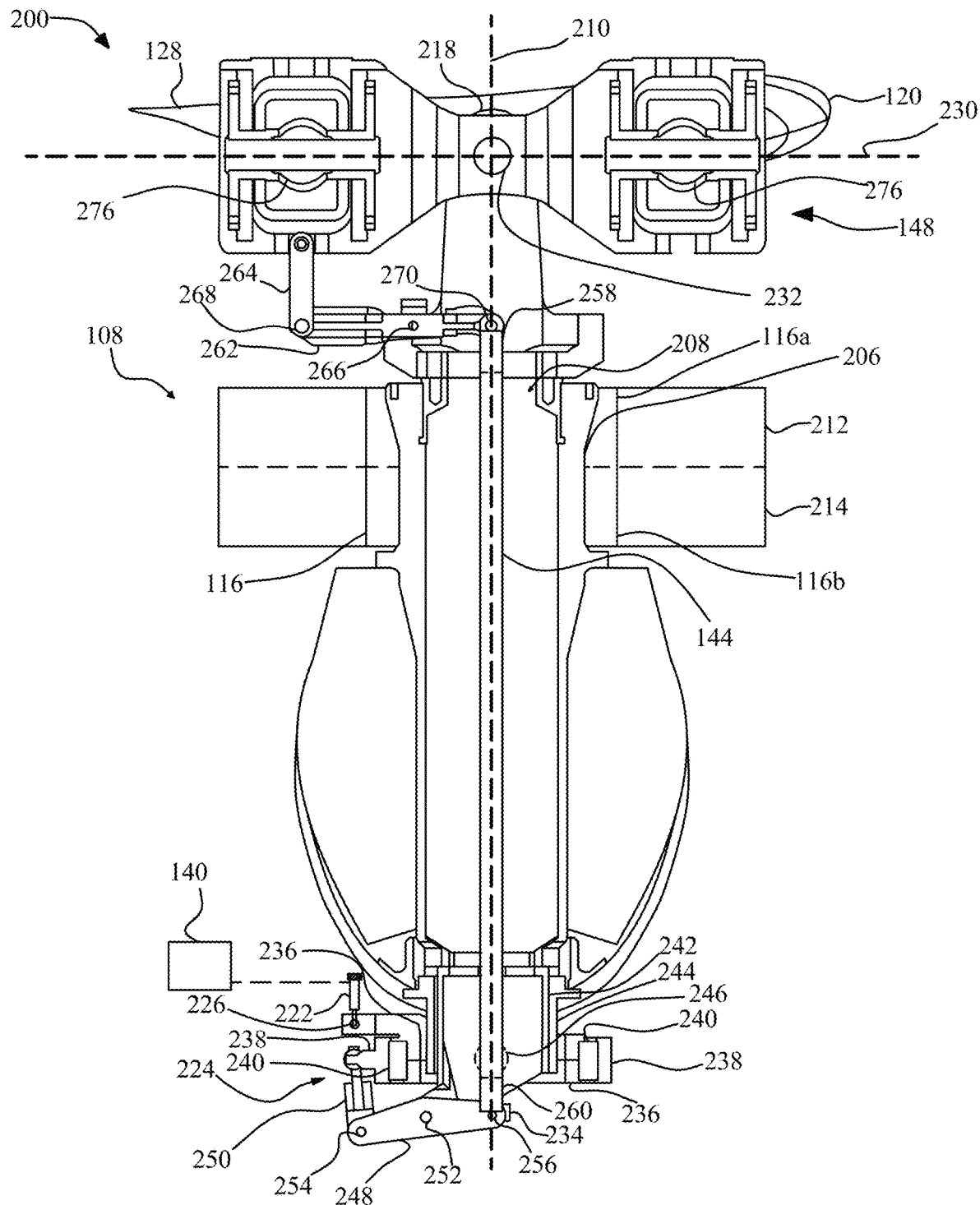
FIG. 2 is an illustration of an exemplary embodiment of a propulsor assembly of an electric aircraft.

Referring now to FIG. 2, an exemplary embodiment of a propulsor assembly 200 of an electric aircraft is illustrated. The propulsor assembly disclosed herein may be consistent with a propulsor 120. Assembly 200 may include an electric motor 108. Electric motor 108 may be driven by direct current (DC) electric power; for instance, a motor may include a brushed DC motor or the like. Electric motor 108 may be driven by electric power having varying or reversing voltage levels, such as alternating current (AC) power as produced by an alternating current generator and/or inverter, or otherwise varying power, such as produced by a switching power source. Electric motor 108 may include, without limitation, a brushless DC electric motor, a permanent magnet synchronous motor, a switched reluctance motor, and/or an induction motor; persons skilled in the art, upon reviewing the entirety of this disclosure, will be aware of various alternative or additional forms and/or configurations that a motor may take or exemplify as consistent with this disclosure. In addition to inverter and/or switching power source, a circuit driving motor may include electronic speed controllers (not shown) or other components for regulating motor speed, rotation direction, torque, and the like.

With continued reference to FIG. 2, electric motor 108 may include a stator. Electric motor 108 may include a rotor 116. As a non-limiting example, electric motor 108 may convert electrical energy into mechanical energy by rotating rotor 116. In some embodiments, rotor 116 may include a circular cross-section. In some embodiments, rotor 116 may include a hollow central portion.

With continued reference to FIG. 2, in some embodiments, rotor 116 may be connected to a shaft 206. In some embodiments, shaft 206 may define a central lumen 208. As a non-limiting example, shaft 206 may comprise a tubular element and a central lumen 208 running from a first end of the rotor to a second end. In some embodiments, rotor 116 may be a component of shaft 206.

With continued reference to FIG. 2, in some embodiments, electric motor 108 may be configured to rotate about a rotational axis 210. In some embodiments, rotational axis 210 may extend longitudinally through rotor 116. In some embodiments, rotational axis 210 may extend longitudinally through shaft 206. In some embodiments, rotational axis 210 may extend longitudinally through the central axis of central lumen 208.

With continued reference to FIG. 2, in some embodiments, electric motor 108 may include a plurality of electric motors. In some embodiments, electric motor 108 may include two electric motors. As a nonlimiting example, electric motor 108 may include a first electric motor 212 and a second electric motor 214. In some embodiments, first electric motor 212 may be consistent with electric motor 108 as described throughout this disclosure. In some embodiments, second electric motor 214 may be consistent with electric motor 108 as described throughout this disclosure. First electric motor 212 may comprise a stator consistent with the stator of electric motor 108. Second electric motor 214 may comprise a stator consistent with the stator of electric motor 108. In some embodiments, first electric motor 212 and second electric motor 214 may each include a rotor. The rotor of first electric motor 212 and second electric motor may be consistent with rotor 116 of electric motor 108. In some embodiments, first electric motor 212 and second electric motor 214 may include a shared rotor. Shared rotor may be consistent with rotor 116 of electric motor 108. In some embodiments, rotor of first electric motor 212 may be rotor 116a and/or rotor of second electric motor 214 may be rotor 116b. In some embodiments, first electric motor 212 and second electric motor 214 may each include a sprag clutch. Sprag clutch may allow first electric motor 212 to rotate shaft 206 even if second electric motor 214 is not functioning, or vice versa. As non-limiting examples, a sprag clutch may be located between rotor 116a and shaft 206 and/or rotor 116b and shaft 206. In some embodiments, electric motor 108 may be consistent with disclosure of motor in U.S. patent application Ser. No. 17/563,498, filed on Dec. 28, 2021 and titled "AN ELECTRIC AIRCRAFT LIFT MOTOR WITH AIR COOLING", which is incorporated by reference herein in its entirety.

With continued reference to FIG. 2, assembly 200 include a propulsor 216 mechanically connected to rotor 116 of electric motor 108. In some embodiments, propulsor 216 may be connected to rotor 116 using shaft 206. As a non-limiting example, shaft 206 may transmit rotational motion between rotor 116 and propulsor 216. Propulsor 216 may include one or more propulsive devices. Propulsor 216 may include at least a lift propulsor. In an embodiment, propulsor 216 may include a thrust element. Front propulsors and/or rear propulsors of propulsor 216 may each be lift propulsors. In some embodiments, propulsor 216 may include a plurality of lift propulsors. A thrust element may include any device or component that converts the mechanical energy of a motor, for instance in the form of rotational motion of a shaft, into thrust in a fluid medium. For example, a thrust element may include without limitation a marine propeller or screw, an impeller, a turbine, a pump-jet, a paddle or paddle-based device, or the like. Persons skilled in the art, upon reviewing the entirety of this disclosure, would appreciate, after having read the entirety of this disclosure, various devices that may be used as at least a thrust element. As used herein, a propulsive device may include, without limitation, a device using moving or rotating foils, including without limitation one or more rotors, an airscrew or propeller, a set of airscrews or propellers such as contra-rotating propellers, a moving or flapping wing, or the like. Persons skilled in the art, upon reviewing the entirety of this disclosure, will be aware of various devices that may be used as propulsor 216. In an embodiment, when a propulsor twists and pulls air behind it, it will, at the same time, push the aircraft forward with an equal amount of force. In an embodiment, when a propulsor twists and pulls air below it, it will, at the same time, push the aircraft upward with an equal amount of force. In an embodiment, thrust element may include a helicopter rotor incorporated into propulsor 216. A helicopter rotor, as used herein, may include one or more blade or wing elements driven in a rotary motion to drive fluid medium in a direction axial to the rotation of the blade or wing element. Its rotation is due to the interaction between the windings and magnetic fields which produces a torque around the rotor's axis. A helicopter rotor may include a plurality of blade or wing elements.

With continued reference to FIG. 2, in some embodiments, propulsor 216 may include a hub 218. In some embodiments, propulsor 216 may include a plurality of blades 128. Blades 128 may be connected to and extend outward from hub 218. In an embodiment, propulsor 216 may include at least a blade 128. In some embodiments, blade 128 may include an airfoil cross section. As a non-limiting example, airfoil cross section may include a NACA airfoil. In some embodiments, the shape of the airfoil cross section may change as blade 128 progresses from root to tip. In some embodiments, plurality of blades 128 may include two blades 128. In some embodiments, plurality of blades 128 may include three blades 128. In some embodiments, plurality of blades 128 may include four blades 128. In some embodiments, plurality of blades 128 may include six blades 128. Plurality of blades 128 may be disposed symmetrically about hub 218. Plurality of blades 128 may be disposed at equal angles about hub 218. In some embodiments, blades 128 of plurality of blades 128 may be set at a fixed pitch, wherein blades 128 are not able to adjust their pitch while in flight. In some embodiments, blades 128 may be able to alter their pitch, such as through rotation. In some embodiments, propulsor 216 may comprise a monolithic propulsor 216.

With continued reference to FIG. 2, in some embodiments, propulsor 216 may include a lift propulsor. In some embodiments, propulsor 216 may include two lift propulsors. In some embodiments, propulsor 216 may include 4 lift propulsors. In some embodiments, propulsor 216 may include 8 lift propulsors. In some embodiments, assembly 200 may include a cyclic control assembly. Cyclic control assembly may include a first actuator 222.

With continued reference to FIG. 2, a first actuator 222 may include a component of a machine that is responsible for moving and/or controlling a mechanism or system. A first actuator 222 may, in some cases, require a control signal and/or a source of energy or power. In some cases, a control signal may be relatively low energy. Exemplary control signal forms include electric potential or current, pneumatic pressure or flow, or hydraulic fluid pressure or flow, mechanical force/torque or velocity, or even human power. In some cases, an actuator may have an energy or power source other than control signal. This may include a main energy source, which may include for example electric power, hydraulic power, pneumatic power, mechanical power, and the like. In some cases, upon receiving a control signal, a first actuator 222 responds by converting source power into mechanical motion. In some cases, a first actuator 222 may be understood as a form of automation or automatic control.

With continued reference to FIG. 2, in some embodiments, first actuator 222 may include a hydraulic actuator. A hydraulic actuator may consist of a cylinder or fluid motor that uses hydraulic power to facilitate mechanical operation. Output of hydraulic first actuator 222 may include mechanical motion, such as without limitation linear, rotatory, or oscillatory motion. In some cases, hydraulic actuator may employ a liquid hydraulic fluid. As liquids, in some cases, are incompressible, a hydraulic actuator can exert large forces. Additionally, as force is equal to pressure multiplied by area, hydraulic actuators may act as force transformers with changes in area (e.g., cross sectional area of cylinder and/or piston). An exemplary hydraulic cylinder may consist of a hollow cylindrical tube within which a piston can slide. In some cases, a hydraulic cylinder may be considered single acting. Single acting may be used when fluid pressure is applied substantially to just one side of a piston. Consequently, a single acting piston can move in only one direction. In some cases, a spring may be used to give a single acting piston a return stroke. In some cases, a hydraulic cylinder may be double acting. Double acting may be used when pressure is applied substantially on each side of a piston; any difference in resultant force between the two sides of the piston causes the piston to move.

With continued reference to FIG. 2, in some embodiments, first actuator 222 may include a pneumatic first actuator 222. In some cases, a pneumatic actuator may enable considerable forces to be produced from relatively small changes in gas pressure. In some cases, a pneumatic actuator may respond more quickly than other types of actuators, for example hydraulic actuators. A pneumatic actuator may use compressible fluid (e.g., air). In some cases, a pneumatic actuator may operate on compressed air. Operation of hydraulic and/or pneumatic actuators may include control of one or more valves, circuits, fluid pumps, and/or fluid manifolds.

With continued reference to FIG. 2, first actuator 222 is an electric actuator. In some embodiments, Electric first actuator 222 may include any of electromechanical actuators, linear motors, and the like. In some cases, first actuator 222 may include an electromechanical actuator. An electromechanical actuator may convert a rotational force of an electric rotary motor into a linear movement to generate a linear movement through a mechanism. Exemplary mechanisms, include rotational to translational motion transformers, such as without limitation a belt, a screw, a crank, a cam, a linkage, a scotch yoke, and the like. In some cases, control of an electromechanical actuator may include control of electric motor, for instance a control signal may control one or more electric motor parameters to control electromechanical actuator. Exemplary non-limitation electric motor parameters include rotational position, input torque, velocity, current, and potential. Electric first actuator 222 may include a linear motor. Linear motors may differ from electromechanical actuators, as power from linear motors is output directly as translational motion, rather than output as rotational motion and converted to translational motion. In some cases, a linear motor may cause lower friction losses than other devices. Linear motors may be further specified into at least 3 different categories, including flat linear motor, U-channel linear motors and tubular linear motors. Linear motors may be directly controlled by a control signal for controlling one or more linear motor parameters. Exemplary linear motor parameters include without limitation position, force, velocity, potential, and current.

With continued reference to FIG. 2, in some embodiments, a first actuator 222 may include a mechanical first actuator 222. In some cases, a mechanical actuator may function to execute movement by converting one kind of motion, such as rotary motion, into another kind, such as linear motion. An exemplary mechanical actuator includes a rack and pinion. In some cases, a mechanical power source, such as a power take off may serve as power source for a mechanical actuator. Mechanical actuators may employ any number of mechanism, including for example without limitation gears, rails, pulleys, cables, linkages, and the like.

With continued reference to FIG. 2, in some embodiments, first actuator 222 may be attached to a fixed portion of an aircraft and swashplate 224. Translating input from flight controls to propulsor 216 may include receiving commands from a flight controller. In some embodiments first actuator may be attached to an actuator attachment point 226 of swashplate 224. For the purposes of this disclosure, an "actuator attachment point" is a component of cyclic control assembly that is configured to attach to and receive actuation from an actuator.

With continued reference to FIG. 2, cyclic control assembly may include a push rod 144. Push rod 144, in some embodiments, may include a long, thin rod, wherein the rod's length is more than 5 times its thickness. Push rod 144 may be made from a variety of materials, including, but not limited to aluminum, titanium, and the like. Push rod 144 is mechanically connected to first actuator 222 and propulsor 216. For the purposes of this disclosure, "mechanically connected" refers to components that are connected by one or more mechanical components by way of mechanical linkages or fasteners.

With continued reference to FIG. 2, in some embodiments, the blade angle of propulsor 216 may be changed by the cyclic control assembly. In some embodiments, blade angle may include a pitch angle. In some embodiments blade angle may include a flap angle. In some embodiments, reference plane 230 may run from a tip of a first blade 128 to a tip of a second blade 128. An "increase" in blade angle occurs when propulsor 216 rotates in a clockwise direction about an axis going into the page in FIG. 2. A "decrease" in blade angle occurs when propulsor 216 rotates in a counterclockwise direction about an axis going into the page in FIG. 2. Clockwise and counterclockwise are defined with reference to FIG. 2. Push rod 144 is configured to increase a blade angle of propulsor 216 when push rod 144 is displaced in a first direction. First direction, in some embodiments, may be defined as a downwards direction. Push rod 144 is configured to decrease a blade angle of propulsor 216 when push rod 144 is displaced in a second direction. Second direction, in some embodiments, may be defined as an upwards direction. "Upwards" and "downwards" are defined with reference to FIG. 2. In some embodiments, push rod 144 may extend at least partially through central lumen 208. In some embodiments, push rod 144 may extend through the entirety of central lumen 208.

Push rod 144 may run parallel to rotational axis 210 of propulsor 216. In some embodiments, rotational axis 210 may run through push rod 144. In some embodiments, increasing and/or decreasing blade angle of propulsor 216 may include changing pitch angle and/or flap angle of a blade 128 of propulsor 216.

With continued reference to FIG. 2, in some embodiments, propulsor 216 may include one or more pitch bearings 232. A "bearing," for the purposes of this disclosure is a mechanical element that constrains motion to a desired motion and reduces friction between moving parts. Pitch bearing 232 may allow propulsor 216 to rotate and alter the blade angle and/or blade angle of incidence. In a non-limiting example, in some embodiments, propulsor 216 may rotate about pitch bearing 232 to increase or decrease blade angle. In some embodiments, pitch bearing 232 may include a pivot bearing.

With continued reference to FIG. 2, in some embodiments, cyclic control assembly may include a second actuator 234. Second actuator 234 may be consistent with first actuator 222 as disclosed throughout this disclosure. Second actuator 234 may be mechanically connected to push rod 144. Second actuator 234 may be configured to deflect push rod 144. Second actuator 234 may be configured to rotate push rod 144 about a transverse axis. A "transverse axis," for the purposes of this disclosure, is an axis that traverses from side to side. As a non-limiting example, second actuator 234 may be configured to rotate push rod 144 about a transverse axis extending from side to side, wherein the transverse axis is defined with reference to the illustration in FIG. 2. Deflection of push rod 144 by second actuator 234 may alter a blade angle of incidence, by rotating the blades 128 of propulsor 216 about an axis extending from the tip of a first blade 128 to a tip of a second blade 128. For the purposes of this disclosure, a "blade angle of incidence" is the angle formed between the chord line of a propulsor blade and the airflow over the propulsor blade. The addition of this second actuator 234 may allow cyclic control assembly to control the propulsor 216 in two axes. As a non-limiting example, the addition of second actuator 234 may allow cyclic control assembly to control the blade angle and blade angle of incidence of propulsor 216.

With continued reference to FIG. 2, swashplate 224 may include an inner swashplate element 236 and an outer swashplate element 238. In some embodiments, outer swashplate element 238 may be configured to rotate with respect to inner swashplate element 236. Inner swashplate element 236 may be connected to actuator 136. Inner swashplate element 236 may receive actuation from actuator 136. Inner swashplate element 236 may be made from a metal, such as aluminum, titanium, and the like. Outer swashplate element 238 may be made from a metal, such as aluminum, titanium, and the like. Inner swashplate element 236 and outer swashplate element 238 may be made from a light-weight metal, such as aluminum, in order to realize weight savings. In some embodiments, a main swashplate bearing 240 may be located between inner swashplate element 236 and outer swashplate element 238. A "main swashplate bearing," for the purposes of this disclosure is a bearing that allows an outer swashplate element to rotate with respect to an inner swashplate element. In some embodiments, main swashplate bearing 240 may include a rolling bearing. As non-limiting examples, main swashplate bearing 240 may include a ball bearing, roller bearing, deep-grove ball bearing, self-aligning ball bearing, angular-contact ball bearing, thrust ball bearing, tapered roller bearing, spherical roller bearing, cylindrical roller bearing, needle roller bearing, and the like. In some embodiments, outer swashplate element 238 may be mechanically connected to rotor 116 and/or shaft 206 of electric motor 108. Outer swashplate element 238 may rotate about rotational axis 210. Outer swashplate element 238 may rotate at an equal speed to rotor 116 of electric motor 108.

With continued reference to FIG. 2, in some embodiments, assembly 200 and or swashplate 224 may include an inner housing 242 and/or an outer housing 244. Inner housing 242 and/or outer housing 244 may be cylindrical bodies. In some embodiments, inner housing 242 and/or outer housing 244 may be colinear with rotational axis 210. In some embodiments, inner housing 242 and/or outer housing 244 may be colinear with central lumen. In some embodiments, inner housing 242 and/or outer housing 244 may be colinear with rotor 116 and/or shaft 206 of electric motor 108. In some embodiments, inner housing 242 may be disposed within outer housing 244. Outer housing 244 may have a larger diameter than inner housing 242 such that inner housing 242 may fit within outer housing 244. Inner housing 242 and/or outer housing 244 contain a metal. In some embodiments, inner housing 242 and/or outer housing 244 contain a lightweight metal, such as, as non-limiting examples, aluminum, titanium, and the like. In some embodiments, inner housing 242 and/or outer housing 244 may contain plastic, carbon fiber, and the like. In some embodiments, inner housing 242 may be mechanically connected to rotor 116 and/or shaft 206 of electric motor. In some embodiments, inner housing 242 may be configured to rotate at a same rotational speed as rotor 116 of electric motor. In some embodiments, outer housing 244 may not be able to rotate—that is, outer housing 244 may be fixed.

With continued reference to FIG. 2, in some embodiments, swashplate 224 may be connected to a swashplate pivot bearing 246. A "swashplate pivot bearing," for the purposes of this disclosure, is a bearing that allows a swashplate to pivot with respect to a fixed body. In some embodiments, swashplate pivot bearing 246 may allow swashplate 224 to pivot with respect to outer housing 244. In some embodiments, swashplate pivot bearing 246 may allow swashplate 224 to pivot with respect to outer housing 244 and inner housing 242. In some embodiments, swashplate pivot bearing 246 may be located between outer housing 244 and inner swashplate element 236. In some embodiments, swashplate pivot bearing 246 may include a plurality of swashplate pivot bearings 246. As a nonlimiting example, swashplate pivot bearing 246 may include two swashplate pivot bearings 246. As non-limiting examples, swashplate pivot bearing 246 may include a cantilevered pivot bearing, flexural pivot bearing, and the like. In some embodiments, swashplate pivot bearing 246 may include a torsional spring. Torsional spring may bias swashplate pivot bearing 246 so that it returns to a neutral position. Swashplate shown in dashed lines in FIG. 2, because it is hidden from view in the depicted embodiment of assembly 200.

With continued reference to FIG. 2, in some embodiments, assembly 200 may include a swashplate rocker 248. As used in this disclosure, "swashplate rocker" is a component of a swashplate configured to rotate about a pivot point and transfer motion to a push rod. In some embodiments, swashplate rocker may mechanically connect push rod 144 to first actuator 222. In some embodiments, swashplate rocker may be mechanically connected to a swashplate link 250. For the purposes of this disclosure a "swashplate link" is a mechanical linkage connecting a component of a swashplate to a swashplate rocker. In some embodiments, swashplate link 250 may include metal. In some embodiments, swashplate link 250 may include a lightweight metal, such as, as non-limiting examples, aluminum, titanium, and the like. In some embodiments, swashplate link 250 may connect outer swashplate element 238 to swashplate rocker 248.

With continued reference to FIG. 2, in some embodiments, swashplate rocker 248 may be configured to rotate about a swashplate rocker pivot point 252. As a non-limiting example, swashplate rocker pivot point may include a pin. In some embodiments, swashplate rocker pivot point 252 may be attached to inner housing 242. In some embodiments, swashplate rocker may include a first swashplate rocker end 254 and a second swashplate rocker end 256. First swashplate rocker end 254 may connect to swashplate link 250. Second swashplate rocker end 256 may connect to push rod 144. First swashplate rocker end 254 and second swashplate rocker end 256 may be located on opposite sides of swashplate rocker pivot point 252.

With continued reference to FIG. 2, in some embodiments, swashplate rocker pivot point 252 may be located at a midpoint of swashplate rocker 248. As a non-limiting example, this may result in a downward displacement at first swashplate rocker end 254 being translated to an equal-in-magnitude upward displacement at second swashplate rocker end 256. In some embodiments, swashplate rocker pivot point 252 may be located offset from the midpoint of swashplate rocker 248. As a non-limiting example, swashplate rocker pivot point 252 may be located closer to first swashplate rocker end 254 than to second swashplate rocker end 256. This may, as a non-limiting example, result in a downward displacement at first swashplate rocker pivot point 252 being translated into a greater-in-magnitude upward displacement at second swashplate rocker pivot point 252. A person of ordinary skill in the art, after having reviewed the entirety of this disclosure, would appreciate that the placement of swashplate rocker pivot point 252 may be selected based on the amount of displacement provided by first actuator 222 and the amount of displacement desired in push rod 144. In some embodiments, swashplate rocker 248 may be configured to translate movement by first actuator 222 in a first actuation direction into movement of push rod 144 in the first direction. In some embodiment, swashplate rocker 248 may be configured to translate movement by first actuator 222 in a second actuation direction into movement of push rod 144 in the second direction.

With continued reference to FIG. 2, in some embodiments, push rod 144 may include an upper pushrod link 258 and a lower pushrod link 260. For the purposes of this disclosure a "pushrod link" is a mechanical linkage, connecting a pushrod to another element. Lower pushrod link 260 may connect swashplate rocker 248 to push rod 144. In another embodiment, lower pushrod link 260 may connect second swashplate rocker end 256 to push rod 144. In some embodiments, lower pushrod link 260 may be pivotably connected to swashplate rocker 248.

With continued reference to FIG. 2, in some embodiments, assembly 200 may include a propulsor rocker 262. As used in this disclosure, "propulsor rocker" is a component of an element configured to rotate about a pivot point to transfer motion from a push rod to a propulsor. In some embodiments, propulsor rocker may mechanically connect push rod 144 to propulsor 216. In some embodiments, propulsor rocker 262 may be mechanically connected to a propulsor link 264. For the purposes of this disclosure a "propulsor link" is a mechanical linkage connecting a component of a propulsor to a propulsor rocker. In some embodiments, propulsor link 264 may include metal. In some embodiments, propulsor link 264 may include a lightweight metal, such as, as non-limiting examples, aluminum, titanium, and the like. In some embodiments, propulsor link 264 may connect propulsor 216 to propulsor rocker 262.

With continued reference to FIG. 2, in some embodiments, propulsor rocker 262 may be configured to rotate about a propulsor rocker pivot point 266. As a non-limiting example, propulsor rocker pivot point 266 may include a pin. In some embodiments, propulsor rocker 262 may include a first propulsor rocker end 268 and a second propulsor rocker end 270. First propulsor rocker end 268 may connect to propulsor link 264. Second propulsor rocker end 270 may connect to push rod 144. First propulsor rocker end 268 and second propulsor rocker end 270 may be located on opposite sides of propulsor rocker pivot point 266.

With continued reference to FIG. 2, in some embodiments, propulsor rocker pivot point 266 may be located at a midpoint of propulsor rocker 262. As a non-limiting example, this may result in a downward displacement at first propulsor rocker end 268 being translated to an equal-in-magnitude upward displacement at second propulsor rocker end 270. In some embodiments, propulsor rocker pivot point 266 may be located offset from the midpoint of propulsor rocker 262. As a non-limiting example, propulsor rocker pivot point 266 may be located closer to first propulsor rocker end 268 than to second propulsor rocker end 270. This may, as a non-limiting example, result in a downward displacement at first propulsor rocker pivot point 266 being translated into a greater-in-magnitude upward displacement at second propulsor rocker pivot point 266. A person of ordinary skill in the art, after having reviewed the entirety of this disclosure, would appreciate that the placement of propulsor rocker pivot point 266 may be selected based on the amount of displacement provided by push rod 144 and the amount of displacement desired in propulsor 216. In some embodiments, propulsor rocker 262 may be configured to translate movement by push rod 144 in a first direction to an increase in the blade angle of propulsor 216. In some embodiments, propulsor rocker 262 may be configured to translate movement by push rod 144 in a second direction to a decrease in blade angle of propulsor 216.

With continued reference to FIG. 2, upper pushrod link 258 may connect propulsor rocker 262 to push rod 144. In another embodiment, upper pushrod link 258 may connect second propulsor rocker end 270 to push rod 144. In some embodiments, upper pushrod link 258 may be pivotably connected to propulsor rocker 262.

With continued reference to FIG. 2, in some embodiments, assembly 200 may include a flap mechanism 148. Flap mechanism 148 may be mechanically connected to propulsor 216. In some embodiments, flap mechanism 148 may change the flap angle of blades 128 of propulsor 216. In some embodiments, flap mechanism 148 may be configured to passively control for in-flight transients. As a non-limiting example, in-flight transients may include gusts of wind. As a non-limiting example, in-flight transients may cause uneven forces on blades 128 of propulsor 216 resulting in a torque about hub 218 of propulsor 216 and rotor 116 of electric motor 108. This torque may lead to the failure of excessive wearing of components and is desirable to avoid. In some embodiments, flap mechanism 148 may be actively controlled by a flight controller 140. Flap mechanism 148 is further disclosed with reference to FIGS. 3, 5A, and 5B.

With continued reference to FIG. 2, in some embodiments, assembly 200 may include a flight controller 140. In some embodiments, flight controller 140 may be communicatively connected to first actuator 222. In some embodiments, flight controller 140 may be communicatively connected to pilot controls. In some embodiments, flight controller 140 may command first actuator 222 to increase blade angle of propulsor 216. In some embodiments, flight controller 140 may be configured to command first actuator 222 to decrease blade angle of propulsor 216. Pilot controls are further described in U.S. patent application Ser. No. 18/090,278, filed on Dec. 22, 2022, and titled "HOVER AND THRUST ASSEMBLY FOR DUAL-MODE AIRCRAFT," the entirety of which is incorporated herein by reference. In some embodiments, first actuator 222 may be mechanically disconnected from pilot controls. For the purposes of this disclosure, first actuator 222 is mechanically disconnected from pilot controls if there is no mechanical reversion between first actuator 222 and pilot controls. "Mechanical reversion," for the purposes of this disclosure, is actuation using only mechanical means of one of more control elements of an aircraft.

With continued reference to FIG. 2, in some embodiments, flap mechanism 148 may include a teeter bearing 276. In some embodiments, flap mechanism 148 may include a plurality of teeter bearings 276. In some embodiments, flap mechanism 148 may include two teeter bearings 276. For the purposes of this disclosure, a "teeter bearing" is a bearing about which a propulsor is able to flap. Teeter bearings 276 may allow propulsor 216 to flap.

Figure 3:
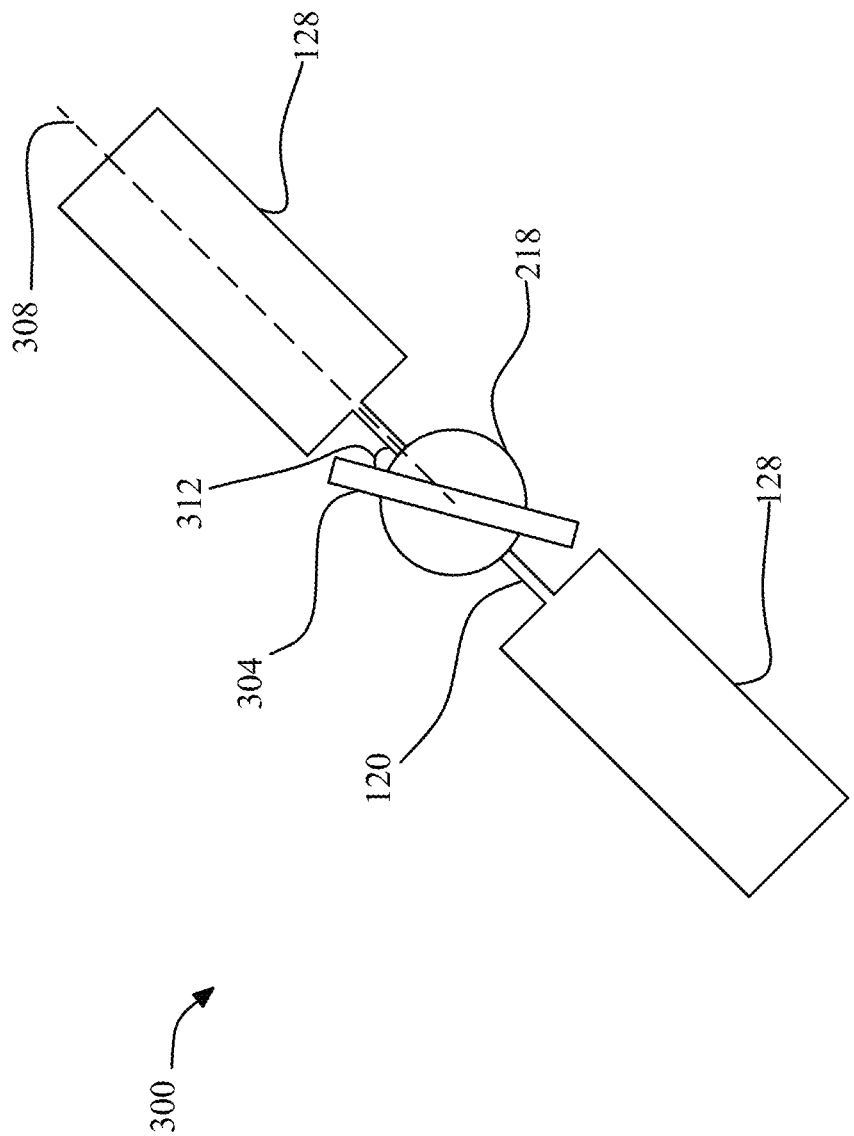
FIG. 3 is an illustration of a top-view of an exemplary embodiment of a propulsor assembly of an electric aircraft.

Referring now to FIG. 3, a top-view of an exemplary embodiment 300 of propulsor assembly 200 is illustrated. Embodiment 300 may include propulsor 120 and blades 128. Propulsor 120 may include a hub. Embodiment 300 may include a hinge 304. Hinge 304 may be consistent with hinge 336 disclosed with reference to FIG. 2. Propulsor 120 may include a propulsor axis 308. A "propulsor axis," for the purposes of this disclosure, is an axis that runs from a hub of a propulsor longitudinally down the length of a blade 128 to a blade tip. Embodiment 300 may include a delta-3 angle 312. For the purposes of this disclosure, a "delta-3 angle" is the angle between a hinge of a propulsor assembly and a blade of a propulsor.

With continued reference to FIG. 3, in some embodiments, delta-3 angle 312 may be equal to 90 degrees. When delta-3 angle 312 is 90 degrees, hinge 304 may purely control flap angle of propulsor. As a non-limiting example, when delta-3 angle 312 is 90 degrees, if hinge 304 allows propulsor 120 to deflect by 10 degrees, this will result in a flap angle of 10 degrees. In some embodiments, delta-3 angle 312 may be not equal to 90 degrees. In some embodiments, delta-3 angle 312 may be 20-70 degrees. In some embodiments, delta-3 angle 312 may be 20-60 degrees. In some embodiments, delta-3 angle 312 may be 30 degrees. In some embodiments, delta-3 angle 312 may be 45 degrees. When delta-3 angle 312 is not equal to 90 degrees, a deflection of propulsor 120 about hinge 304 will result in a change to both flap angle and pitch angle of blade 128 of propulsor 120. By using a delta-3 angle 312 that is not equal to 90 degrees, hinge 304 may control both flap angle and pitch angle, wherein flap angle and pitch angle are coupled.

With continued reference to FIG. 3, cyclic assembly (disclosed with reference to FIG. 2), may be implemented with a delta-3 angle 312 of 90 degrees. In some embodiments, cyclic control assembly, may be implemented with a delta-3 angle 312 that is not 90 degrees. In some embodiments, cyclic control assembly, may be implemented with any of the delta-3 angles 312 that are discussed above. When cyclic assembly is implemented at a delta-3 angle that is not 90 degrees, cyclic assembly may control both flap angle and pitch angle. As a non-limiting example, cyclic assembly may change blade angle about an axis that is 30 degrees offset from propulsor axis 308 of propulsor 120.

With continued reference to FIG. 3, in some embodiments, flap mechanism 148 (disclosed with reference to FIGS. 1-2), may be implemented with a delta-3 angle 312 of 90 degrees. In some embodiments, flap mechanism 148, may be implemented with a delta-3 angle 312 that is not 90 degrees. In some embodiments, flap mechanism 148, may be implemented with any of the delta-3 angles 312 that are discussed above. When flap mechanism 148 is implemented at a delta-3 angle that is not 90 degrees, flap mechanism 148 may control both flap angle and pitch angle. As a non-limiting example, flap mechanism 148 may change blade angle about an axis that is 30 degrees offset from a propulsor axis 308 of propulsor 120.

Figure 4:
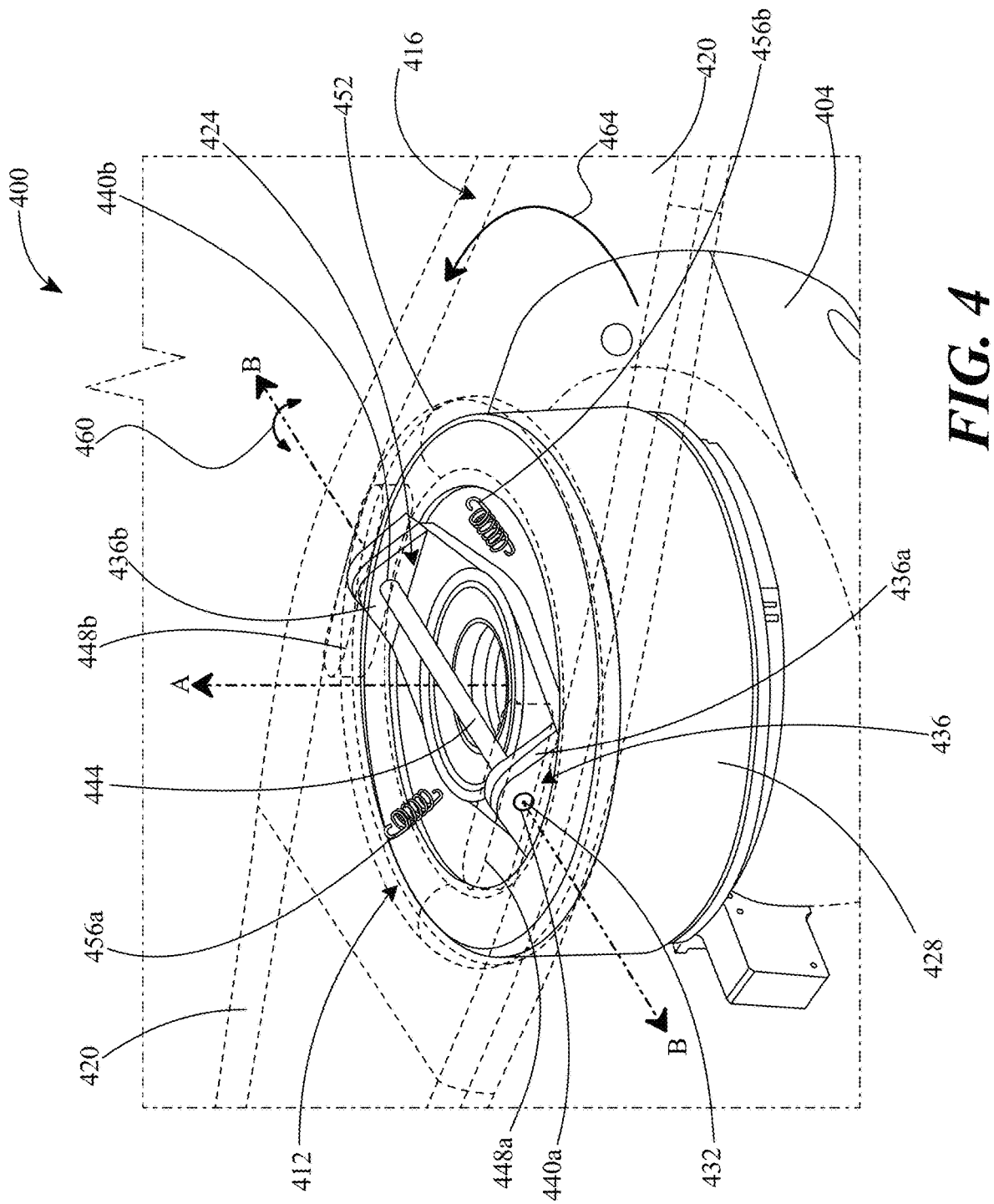
FIG. 4 is a schematic diagram illustrating an exemplary teetering propulsor assembly of an electric aircraft in accordance with one or more embodiments of the present disclosure.
Figure 7:
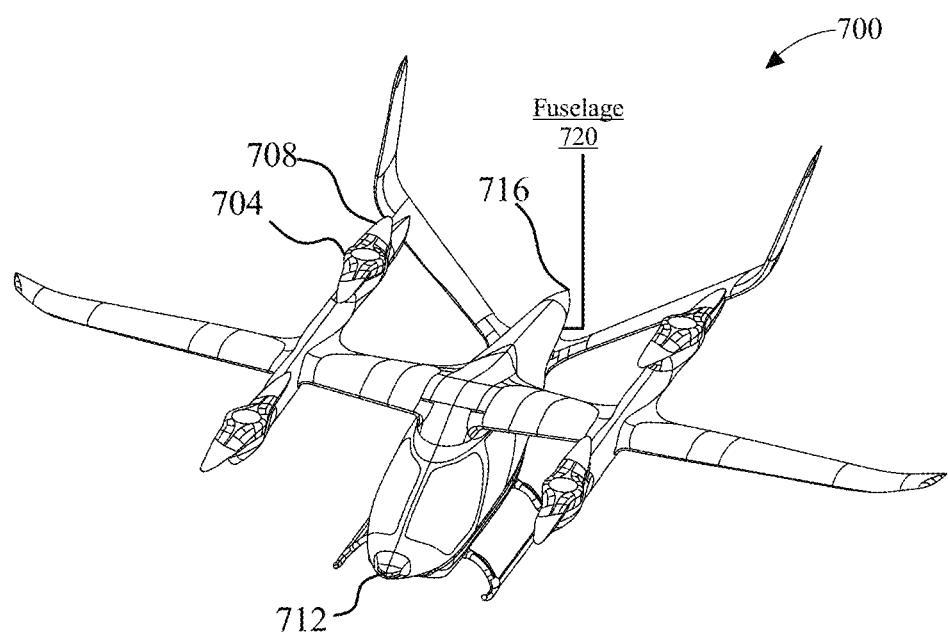
FIG. 7 is a diagrammatic representation of an exemplary embodiment of an aircraft.

Now referring to FIG. 4, an exemplary embodiment of a flapping assembly 400 of an electric aircraft 404 is illustrated. Electric aircraft 404 (also referred to herein as an "aircraft") may include an electrical vertical takeoff and landing (eVTOL) aircraft (as shown in FIG. 7, unmanned aerial vehicles (UAVs), drones, rotorcraft, commercial aircraft, and/or the like. Aircraft 404 may include one or more components that generate lift, including, without limitation, wings, airfoils, rotors, propellers, jet engines, or the like, or any other component or feature that an aircraft may use for mobility during flight. Aircraft 404 may be capable of rotor-based cruising flight, rotor-based takeoff, rotor-based landing, fixed-wing cruising flight, airplane-style takeoff, airplane-style landing, and/or any combination thereof.

With continued reference to FIG. 4, in one or more embodiments, flapping assembly 400 (also referred to in this disclosure as a "propulsor assembly" or "propulsor") includes a propeller 416. Flapping assembly 400 may be consistent with aspects of teeter mechanisms disclosed in U.S. Nonprovisional patent application Ser. No. 17/852,229, filed on Jun. 28, 2022, and entitled "TEETERING PROPULSOR ASSEMBLY OF AN ELECTRIC VERTICAL TAKEOFF AND LANDING AIRCRAFT, Nonprovisional patent application Ser. No. 17/824,309, filed on May 25, 2022, and entitled "SYSTEMS AND DEVICES FOR PARKING A PROPULSOR TEETER," or Nonprovisional patent application Ser. No. 18/096,931, filed on Jan. 13, 2023, and entitled "A COMBINED CYCLIC AND TEETER SYSTEM FOR AN EVTOL AIRCRAFT," each of which are incorporated herein by reference. Propeller 416 may include one or more blades 420 that radially extend from a hub 412 of propeller 416. For example, and without limitation, propeller 416 may include a plurality of blades 420, where each blade 420 may extend from hub 412 in an opposite direction from another blade 420. In some embodiments, propeller 416 may be a monolithic component, where blades 420 and hub 412 are a singular unit. For example, and without limitation, propeller may include a rigid, monolithic component. In other embodiments, propeller 416 may include multiple components, where blades 420 and hub 412 are assembled components that are fixedly and/or moveably attached. In one or more embodiments, hub 412 may be pivotably attached to a base 428 of assembly 400. Base 428 may be rotatably attached to electric vertical takeoff and landing aircraft 404 and configured to rotate about, for example, rotational axis A. Base 428, or at least a component of base 428, may rotate about axis A. Base 428 may be mechanically connected to a motor of assembly 400, either directly or indirectly, so that propulsor 416 may be driven by motor. In other embodiments, base 428 may include a motor and/or rotor of electric aircraft. In various embodiments, base 428 may be attached to or include a gearbox that translates mechanical movement from motor to propeller 416 so that propeller 416 may rotate about rotational axis A of propeller 416.

With continued reference to FIG. 4, in one or more embodiments, motor may be configured to power propeller 416. Motor may include a rotor, stator, motor shaft, and the like. Motor may be at least partially disposed in an airframe of aircraft 404, such as a boom or a wing of aircraft 404. Assembly 400 may include motor, which translates electrical power from a power source of aircraft 404 into a mechanical movement of propeller 416. Rotor of motor may rotate about a central axis of motor.

With continued reference to FIG. 4, in some embodiments, motor may include an electric motor. Electric motor may be driven by direct current (DC) electric power. As an example, and without limitation, electric motor may include a brushed DC electric motor or the like. An electric motor may be, without limitation, driven by electric power having varied or reversing voltage levels, such as alternating current (AC) power as produced by an alternating current generator and/or inverter, or otherwise varying power, such as produced by a switching power source. Electric motor may include, for example and without limitation, brushless DC electric motors, permanent magnet synchronous an electric motor, switched reluctance motors, induction motors, and the like. In addition to an inverter and/or a switching power source, a circuit driving electric motor may include electronic speed controllers (not shown) or other components for regulating motor speed, rotation direction, and/or dynamic braking. Motor may be used in an electric vehicle such as an electric automobile and an electric aircraft, including an electrical vertical takeoff and landing (eVTOL) aircraft, a commercial aircraft, an unmanned aerial vehicle, a rotorcraft, and the like. Hub 412 of propeller 416 may be mechanically connected to rotor, directly or indirectly. For example, and without limitation, hub 412 may be connected to a motor shaft that is rotated by rotor. In some embodiments, motor may include a direct drive motor, wherein one rotation of rotor also causes one rotation of hub 412 and/or propeller 416. In other embodiments, motor may include an indirect drive motor where, for example, a gearbox, pulleys, bearing, and/or various other components facilitate movement of propeller 416 by motor. Propulsor assembly components may be consistent with disclosure of propulsor assembly components in U.S. patent application Ser. No. 17/563,398, filed on Dec. 28, 2021 and titled "AN ELECTRIC AIRCRAFT LIFT MOTOR WITH AIR COOLING", in U.S. Pat. App. Ser. No. 17/732,791, filed on Apr. 29, 2022 and titled "MAGNETIC LOCKING SYSTEM OF AN ELECTRIC AIRCRAFT ROTOR AND METHODS THEREOF", in U.S. patent application Ser. No. 17/702,069, filed on Mar. 23, 2022 and titled "A DUAL-MOTOR PROPULSION ASSEMBLY", in U.S. Pat. App. Ser. No. 17/704,798 filed on Mar. 25, 2022 and titled "ROTOR FOR AN ELECTRIC AIRCRAFT MOTOR", all of which are incorporated by reference herein in their entirety.

With continued reference to FIG. 4, in some embodiments, assembly 400 may be used to propel aircraft 404 through a fluid medium by exerting a force on the fluid medium. In one or more non-limiting embodiments, assembly 400 may include a lift propulsor configured to create lift for aircraft 404. In other non-limiting embodiments, assembly 400 may include a thrust element, which may be integrated into the assembly 400. A thrust element may include any device or component that converts the mechanical energy of a motor, for instance in the form of rotational motion of a shaft, into thrust in a fluid medium. For example, a thrust element may include, without limitation, an impeller, a turbine, a pump-jet, a paddle or paddle-based device, and the like. As another non-limiting example, assembly 400 may include a six-bladed pusher propulsor, such as a six-bladed propeller mounted behind the motor to ensure the drive shaft is in compression. Persons skilled in the art, upon reviewing the entirety of this disclosure, will be aware of various devices that may be used as assembly 400. In various embodiments, when a propeller of assembly 400 twists and pulls air behind it, it will, at the same time, push aircraft 404 with a relatively equal amount of force. The more air pulled behind aircraft, the more aircraft is pushed forward. In various embodiments, propeller 416 of assembly 400 may be substantially rigid and not susceptible to bending during flight.

With continued reference to FIG. 4, assembly 400 may be a lift propulsor oriented such that a rotation plane C (shown in FIGS. 5A and 5B) of propeller 416 is parallel with a ground supporting aircraft 404 when aircraft 404 is landed. As used in this disclosure, a "rotation plane" (also referred to herein as a "plane of rotation") is a plane in which a propeller rotates. Rotation plane may be relatively orthogonal to an axis of rotation of propeller 416, such as axis A. A circumference of a rotational plane may be defined by a rotational path of a tip of blade 420 of propeller 416. As understood by one skilled in the art, assembly 400 may include various types of pitch-flap couplings, where hinge 436 may be oriented in various positions relative to rotation plane C. For instance, and without limitation, axis B may be at an angle relative to rotation plane C. For example, and without limitation, axis B may be perpendicular to rotation plane C. In another example, and without limitation, axis B may be at a non-perpendicular angle relative to rotation plane C. When there is a substantial force exerted on propulsor 416 that is orthogonal to rotational axis A, such as air resistance during edgewise flight, the force may cause significant stress and strain on propeller 416 and/or assembly 400. Edgewise flight (exaggerated for explanation) may occur when an aircraft is traveling in a direction orthogonal to a rotational axis of a propeller and parallel to a rotation plane of the propeller, causing an air stream to be directed at an edge of the propeller. Edgewise flight may also occur when an aircraft is traveling in a direction in which a component of the velocity of the aircraft is in a direction orthogonal to a rotational axis of a propulsor and parallel to rotation plane. Edgewise flight may cause issues with aircraft 404. For example, edgewise flight may cause excessive flapping of blades 420 during flight including flapping angulation. Thus, edgewise flight may lead to inadvertent displacement of propeller 416 that creates excessive loads on a propulsor assembly and/or components thereof.

With continued reference to FIG. 4, assembly 400 includes a passive flap 424 mechanically connected to hub 412 of propeller 416, where passive flap 424 is configured to permit propeller 416 to pivot about a pivot point 432 of passive flap 424 (as indicated by directional arrow 460). Passive flap 424 may allow for deflections of propeller 416 during a transition of flight modes or edgewise flight to reduce the issues discussed above caused by edgewise flight. Passive flap 424 may allow a rigid propeller to pivot relative to the rest of propulsor assembly. Passive flap 424 facilitates a certain amount of up-and-down tip, or blade displacement, per rotation of propeller 416 to reduce a load experienced by hub 412 and/or assembly 400, thus making assembly 400 more robust, especially against strong winds and dynamic operations of aircraft 404. Passive flap 424 may attach hub 412, and thus propeller 416, to base 428. In some embodiments, base 428 may be fixedly attached to a shaft, such as a motor shaft or a shaft of gearbox, which rotates propeller 416 about rotational axis A when motor is running (as indicated by directional arrow 464). Passive flap 424 may include one or more pivot points 432 so that propeller 416 may teeter about a pivot point. In one or more embodiments, when propeller 416 teeters about pivot point 432, rotation plane of propeller 416 may shift so that an orientation of rotation plane may vary relative to aircraft 404. In some embodiments, flapping assembly 400 may be configured to allow propulsor 416 to rotate about a pivot point 432 of assembly 400.

With continued reference to FIG. 4, in one or more embodiments, passive flap 424 may include a hinge 436 that connects base 428 and hub 412 of propeller 416, where hinge 436 is configured to allow propeller 416 to rotate about a pivot point 432. Hinge 436 may provide pivot point 432 on which propeller 416 may teeter and/or tilt. Hinge 436 may be attached to base 428. As understood by one of ordinary skill in the art, hinge 436 may be various shapes and sizes without altering the spirit or the scope of this disclosure. In some embodiments, hinge 436 may be a circular or semi-circular shape. In some embodiments, hinge 436 may be a triangular shape (as shown). In other embodiments, hinge 436 may include a curved corner extending from base 428 and may form a fulcrum on which propeller 416 may teeter. Hinge 436 may include an aperture 440 through which a rod 444 may be disposed therethrough. Rod 444 may have a longitudinal axis B that propeller 416 may rotate about to teeter. In one or more embodiments, axis B may be parallel to a span, or tip-to-tip, axis of propeller 416. In other embodiments, axis B may not be perpendicular to the span axis of propeller 416.

With continued reference to FIG. 4, in one or more embodiments, hinge 436 may include two opposing hinges, one hinge on either side of axis A and either end of axis B. For instance, and without limitations, hinge 436 may include a pair of hinges, such as a first hinge 436a and a second hinge 436b. Each hinge 436a, b may include an aperture that is disposed therein, such as first aperture 440a and second aperture 440b, respectively. Rod 444 may traverse through each aperture 440a, b. For example, and without limitation, a first end of rod 444 may be disposed within aperture 440a, and a second end of rod 444 may be disposed within aperture 440b. Rod 444 may run through each aperture 440a, b in each hinge 436a, b to connect hub 412 to base 428. In one or more embodiments, rod may be fixedly connected to hub 412. In some embodiments, rod 444 may include an integrated component of hub 412. In other embodiments, rod 444 may include a separate component from hub 412 that may be attached to hub 412. In some embodiments, rod 444 may include two separate rods, where a first rod 444 may run through first aperture 440a of first hinge 436a and attach to hub 412 on either or both sides of first hinge 436a, and a second rod 444 may run through second aperture 440b of second hinge 436b and attach to hub 412 on either or both sides of second hinge 436b. Hub 412 may be attached to base 428 using hinges 436a,b so that if base 428, or at least a portion of base 428, moves (e.g., rotates), hub 412 may be moved in conjunction with base 428.

With continued reference to FIG. 4, in one or more embodiments, hub 412 may include one or more recesses 448. Recess 448 may include a cavity or depression in an underside surface of hub 412 and/or propeller that faces base 428. Recess 448 may at least partially receive hinge 436 such that at least a portion of hinge 436, such as curved corner, is disposed within recess 448. In some embodiments, recess 448 may contact hinge 436, such as, for example, a rounded edge of hinge 436. Recess 448 may include a plurality of recesses, such as a recess 448a, b that each hinge 436a,b, respectively, may be disposed at least partially within. In some embodiments, a surface of hinge 436, such as a curved surface, may form a fulcrum against recess 448. In some embodiments, hinge 436 may be spaced from recess 448, and hinge 436 and recess 448 may be separated by a gap. In one or more embodiments, hub 412 may include a track 452 that forms a groove within surface of hub 412 that is facing base 428. Track 452 may provide space between hub 412 and base 428, where at least a portion of base 428 may be received by track 452. Thus, track 452 allows for propeller 416 to rotate and/or teeter without impediment from base 428. A shape of track 452 may be complementary to a shape of base 428. For example, and without limitation, shapes of track 452 may include a dome, half toroid, and the like.

With continued reference to FIG. 4, in one or more embodiments, passive flap 424 may include one or more centering springs 456. Centering spring 456 (also referred to herein as a "spring") may provide resistance in teetering movement of propeller 416. For example, and without limitation spring 456 may be configured to prevent or reduce teetering of propulsor 416. In some embodiments, centering spring 456 may have a spring constant large enough to prevent propulsor 416 from teetering about longitudinal axis B when the propulsor 416 rotates at a rate of approximately 40 Hertz or less. Centering spring may include a plurality of springs, where at least a first centering spring 456a is on a first side of longitudinal axis B and at least a second centering spring 456b is on a second side of longitudinal axis B. In one or more embodiments, centering spring 456 may be attached to base 428 at a proximal end of spring 456 and centering spring 456 may be attached to hub 412 at a distal end of spring 456. Though spring 456 is shown as a helical spring, as understood by one of skill in the art, spring 456 may be various other types of springs and/or any combination thereof. For example, and without limitation, spring 456 may include a compression spring, extension spring, torsion spring, constant force spring, constant rate spring, progressive rate spring, dual rate spring, linear spring, laminated or leaf spring, coil or helical spring, conical spring, flat spring, machined spring, molded spring, disc or Belleville spring (e.g., single or stacked), wave springs, and the like. Spring 456 may be positioned at various orientations. For example, and without limitation, a longitudinal axis of spring 456 may be angled relative to a connecting surface of base 428 and/or hub 412. In another example, and without limitation, the longitudinal axis of spring 456 may be orthogonal to a connecting surface of base 428 and/or hub 412. In one or more embodiments, assembly 400 may include a second motor and a second propeller driven by the second motor. The second propeller may include a second hub, a second plurality of blades extending from the hub, where the second hub is configured to rotate about a second rotational axis, and a second passive flap connected to the second hub. The second passive flap may include a second base rotatably affixed to the electric vertical takeoff and landing aircraft and configured to rotate about the second rotational axis, and a second hinge connecting the base and the hub of the propeller and configured to allow the propeller to pivot about a pivot point relative to the second base.

Figure 5A:
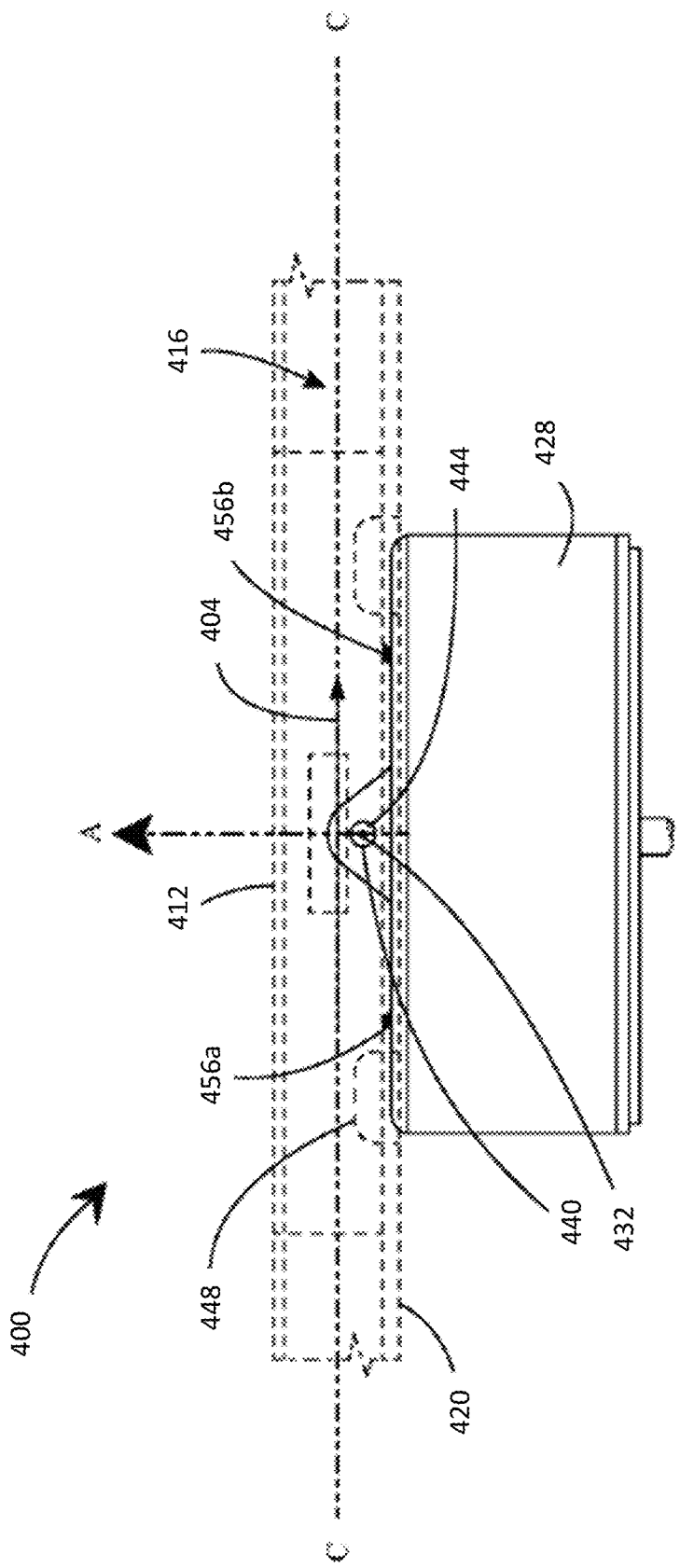

With continued reference to FIG. 4, assembly 400 may include a locking mechanism (not shown) configured to lock passive flap 424, thereby preventing propeller 416 from teetering about longitudinal axis B. When locking mechanism is engaged, propulsor plane is fixed at an orientation orthogonal to rotational axis A. Locking mechanism may be configured to engage and/or disengage during flight of aircraft 404. For example, and without limitation, locking mechanism may be disengaged when aircraft 404 is performing a vertical takeoff and/or a vertical landing and engaged when the aircraft 404 is in fixed-wing flight. In some embodiments, locking mechanism may include a plurality of springs, where each spring is attached to hub 412 at a first end of the spring and attached to base 428 at a second end of the spring. In some embodiments, locking mechanism may include a spring on either side of longitudinal axis B. Locking mechanism may include a plurality of springs on either side of longitudinal axis B. Springs may have a spring constant large enough to prevent teetering of propeller 416 when propeller 416 rotates ten or fewer revolutions per second. For instance, and without limitation, springs may each have an initial tension that provides an internal force large enough to prevent extension of spring unless a substantial load or external force is applied. For example, and without limitation, springs may have a spring constant that prevents propulsor 416 from teetering on passive flap 424 except during forces caused by a rotation of propulsor 416 during operation of aircraft 404 in edgewise flight. In some embodiments, locking mechanism may include spring 456, where spring 456 may have a spring constant large enough to prevent propulsor 416 from teetering about longitudinal axis B when the propulsor 416 is rotating at a lower speed, such as less than 30 Hertz. In some embodiments, locking mechanism may be engaged or disengaged by an actuator. Actuator may be controlled by a controller, such as a computing device, as discussed further in FIG. 1. Controller may be communicatively connected to actuator and/or locking mechanism. In various embodiments, actuator may be configured to retract to essentially stiffen spring, which may engage locking mechanism. Actuator may be configured to extend to essentially loosen spring, which may disengage locking mechanism. Controller may adjust a position of actuator and alter a maximum rotational speed of propeller 416 in which locking mechanism is engaged and prevents propeller 416 from teetering about longitudinal axis B by an undesirable amount or completely. Controller may be communicatively connected to locking mechanism. Controller may be configured to engage and/or disengage locking mechanism. For example, controller may disengage locking mechanism to unlock passive flap 424 when aircraft 404 performs a vertical takeoff and engage the locking mechanism, thereby locking passive flap 424, when the aircraft 404 is in fixed-wing flight. Transition between flight modes of an electric aircraft may be consistent with disclosure of U.S. patent application Ser. No. 17/563,398 filed on Dec. 28, 2021 and titled "AN ELECTRIC AIRCRAFT LIFT MOTOR WITH AIR COOLING," and of U.S. patent application Ser. No. 17/825,371 filed on May 26, 2022 and titled "AN APPARATUS FOR GUIDING A TRANSITION BETWEEN FLIGHT MODES OF AN ELECTRIC AIRCRAFT," all of which is incorporated by reference herein in its entirety Referring now to FIGS. 5A and 5B, an exemplary movement of flapping assembly 400 is illustrated. As shown in FIG. 5A, propeller 416 may have a rotational axis A that is in an initial position. In some embodiments, initial position of axis A may be predetermined by a manufacturer or user of aircraft 404. In some embodiments, in initial position, propeller 416 may share a rotational axis with base 428 when propeller is not pivoting about axis B. For example, and without limitation, propeller 416 may share a rotational axis with a shaft of base 428, gearbox, or motor that facilitates rotation of propeller 416. When propeller 416 is not pivoting, springs 456 may both be in a resting and/or initial position. For example, and without limitation, in a resting position, each spring 456*a, b* may be of a relatively equal length relative to the other spring 456*b,a*.

As shown in FIG. 5B, rotational axis of propeller 416 may move to a second position, as indicated by rotational axis A', as propeller 416 teeters and/or tilts relative to aircraft 404. In an exemplary embodiment, propeller 416 may not share a rotational axis with base 428 when propeller 466 is pivoting about axis B. For instance, and without limitation, rotational axis A' of propeller 416 is not parallel to a-rotational axis A of base 428. When propeller 416 is pivoting, springs 456 may be in a displaced position. For example, and without limitation, in a displaced position, a length of each spring 456*a, b* may vary relative to the other spring 456*b, a*. A displaced position of spring 456 may include a position that places spring 456 in tension or compression. In a non-limiting embodiment, during teetering of propeller 416, first spring 456*a* may compress while second spring 456*b* may simultaneously extend, which allows propeller 416 to tilt relative to base 428, resulting in deflections of propeller 416 to reduce strain experienced by hub 412 and/or assembly 400.

Figure 6A:
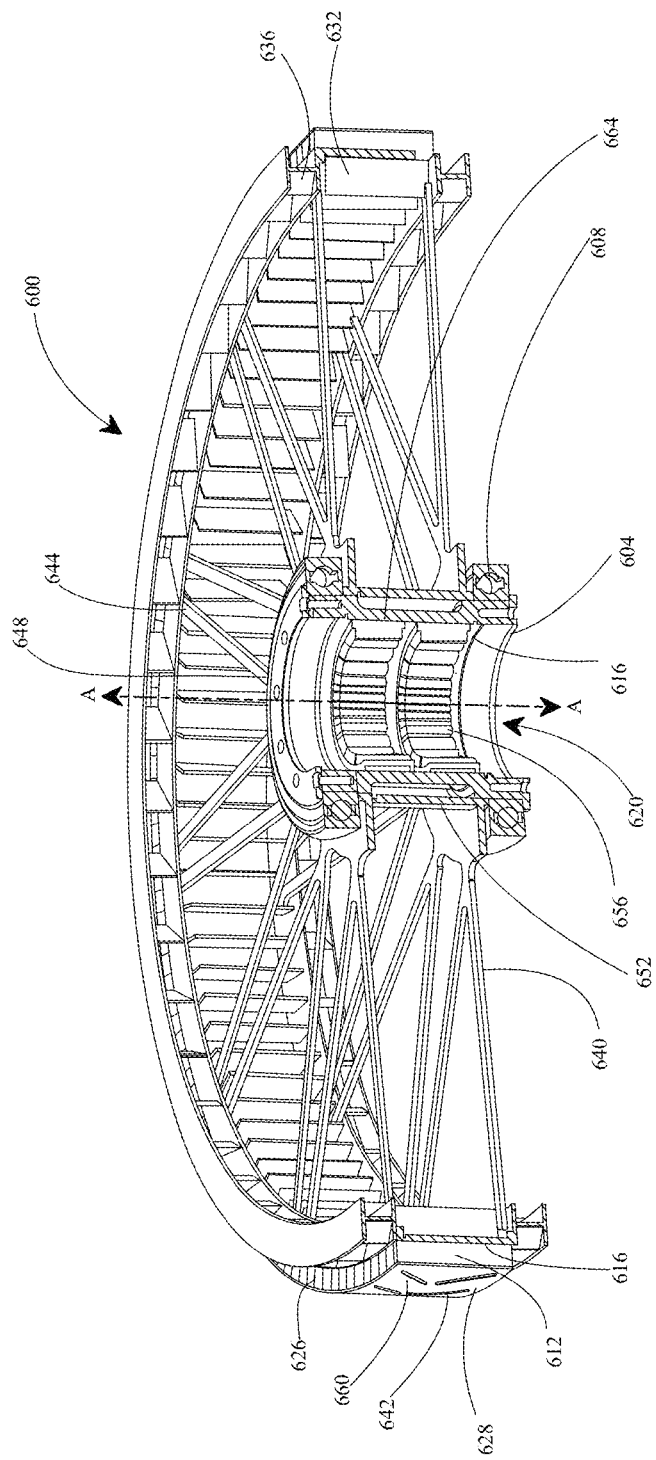
FIGS. 6A-B are illustrations showing cross-sectional views of an exemplary embodiment of a rotor for an electric aircraft motor in one or more aspects of the present disclosure.
Figure 6B:
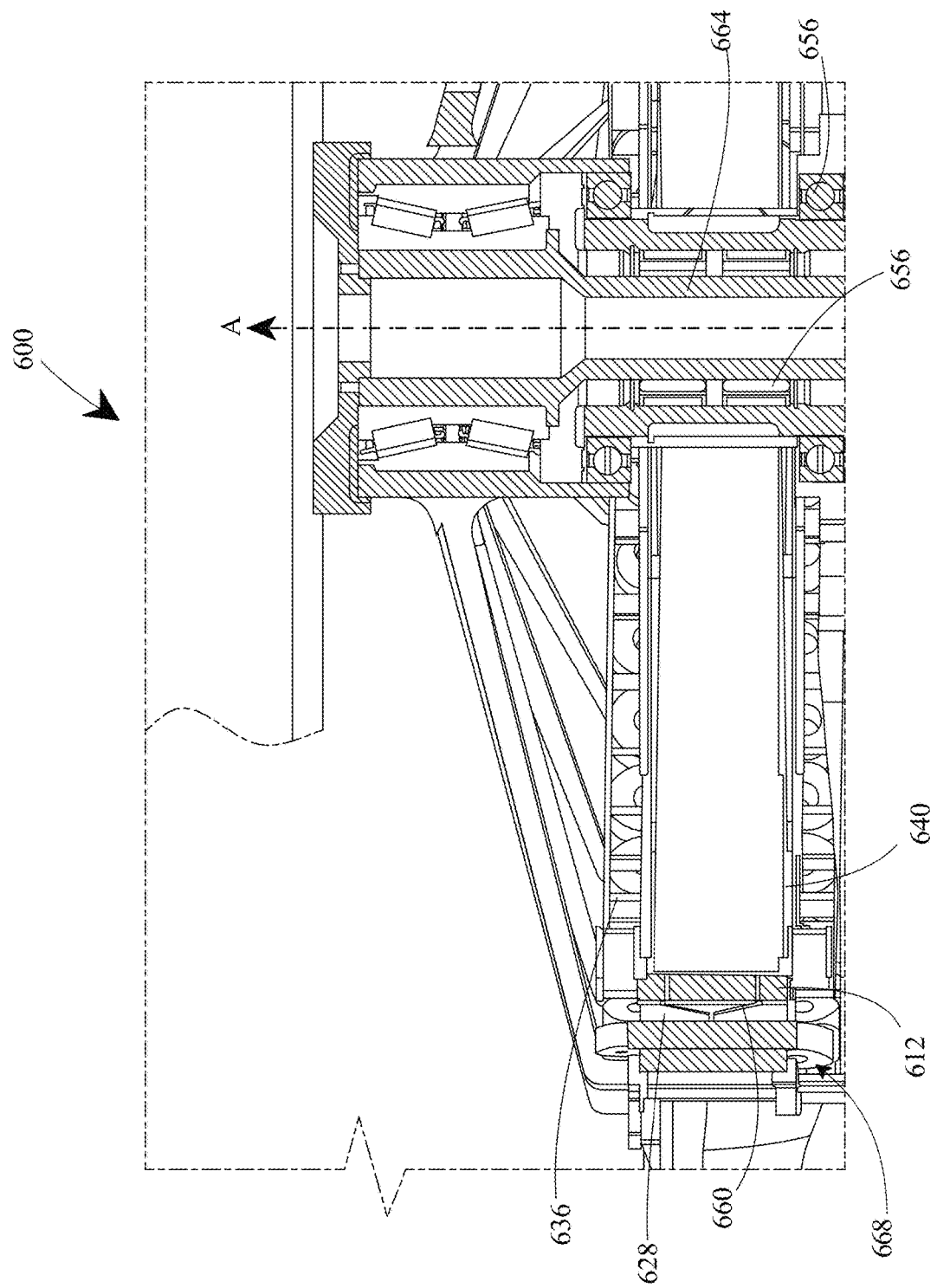

Referring now to FIGS. 6A and 6B, cross-sectional views of an exemplary embodiment of a rotor 600 of a motor of an electric aircraft are shown in accordance with one or more embodiments of the present disclosure. In one or more embodiments, rotor 600 includes a hub 608. Hub 608 may be a tubular structure. Hub 608 may be consistent with any hub as discussed herein. In one or more embodiments, inner surface 616 may define a lumen 620. Lumen 620 may be a longitudinal cavity that receives a rotor shaft 664. Shaft 664 may be disposed within lumen 620 of hub 608 so that rotor 600 may rotate and simultaneously rotate shaft 664 which in turn rotates a propulsor.

With continued reference to FIGS. 6A and 6B, and in one or more embodiments, hub 608 may comprise an inner hub 604 and an outer hub 652. In one or more embodiments, outer hub 652 may be attached to a proximal end 648 of spokes 640 of rotor 600, as discussed further below. In one or more embodiments, inner hub 604 may be secured to outer hub 652 using a locking mechanism. A locking mechanism may be configured to removably attach sprag 656 to hub 608. A locking mechanism may include a bolted joint, dowels, key, spline, and the like. In one or more embodiments, the inner hub may include a sprag clutch 656, as discussed in more detail below.

With continued reference to FIGS. 6A and 6B, and in one or more embodiments, rotor 600 includes a sprag 656. Sprag 656 may be disposed within inner hub 604. For example, and without limitation, sprag 656 may be attached to an inner surface 616 of inner hub 604. Sprag 656 may engage a rotor shaft (not shown) which allow for the rotational movement of rotor to be translated into a mechanical movement of, for example, a propulsor. Sprag 656 may include a sprag clutch. In one or more embodiments, sprag 656 may have a cage design, so that the sprags are less likely to lay down due to centrifugal force experienced when rotor is spinning. In one or more embodiments, sprag clutch 656 may include a maximum eccentricity of 90 microns.

With continued reference to FIGS. 6A and 6B, rotor 600 includes a hoop 626 concentrically positioned about hub 608. Hoop 626 may share a central axis A with hub 608. In one or more embodiments, hoop 626 may include magnets 612, which are positioned along an outer circumference of hoop 626 and attached to an outer surface of hoop 626. As used herein, a "magnet" is a material or object that produces a magnetic field. As used herein, a "hoop" is a cylindrical component. In one or more embodiments, a current may flow through a plurality of windings of a stator 668 that then results in the generation of electrically induced magnetic fields that interact with magnets 612 to rotate rotor 600 about central axis A. During operation, rotor 600 may rotate axially about central axis A while stator 112-668 remains still; thus, rotor 600 is rotatable relative to stator 668.

With continued reference to FIGS. 6A and 6B, and in one or more embodiments, magnets 612 of hoop 626 may be permanent magnets fixed to outer surface 660. Magnets 612 may be arranged concentrically to a central axis A of rotor 600. Thus, magnets 612 may be arranged in a ring along the outer circumference of hoop 626, which is defined by outer surface 660 of hoop 626. Magnets 612 may be arranged in a single ring or may be arranged in a plurality of rings along outer surface 660. Each magnet 612 may be positioned adjacent to another magnet 612 along convex outer surface so that stator 668 is continuously interacting with a magnet to produce a rotation of rotor 600. In one or more embodiments, hub and hoop may be made from various materials, such as, for example, steel. In an embodiment, rings and/or layers of rings of magnets 612 may be formed by using adhesive between each of the magnets 612. The adhesive may include epoxy which may be heat cure, UV cure, or the like. The ring of magnets may be formed by stacking layers of magnets on top of one another and using adhesive to adhere adjacent magnetic elements. The magnets may be rare earth magnets, including without limitation Neodymium magnets. Magnets and hoop may be consistent with any magnet or hoop as discussed herein.

With continued reference to FIGS. 6A and 6B, and in one or more embodiments, magnets 612 may include a magnet array. In non-limiting embodiments, a magnet array may include a Halbach array. A Halbach array is a special arrangement of permanent magnets that augments the magnetic field on one side of the array while canceling the field to near zero on the other side of the array. In general, the Halbach array is achieved by having a spatially rotating pattern of magnetization where the poles of successive magnets are not necessarily aligned and differ from one to the next. Orientations of magnetic poles may be repeated in patterns or in successive rows, columns, and arrangements. An array, for the purpose of this disclosure is a set, arrangement, or sequence of items, in this case permanent magnets. The rotating pattern of permanent magnets can be continued indefinitely and have the same effect, and may be arranged in rows, columns, or radially, in a non-limiting illustrative embodiment. One of ordinary skill in the art would appreciate that the area that the Halbach array augments the magnetic field of may be configurable or adjustable.

With continued reference to FIGS. 6A and 6B, and in one or more embodiments, hoop 626 may include cooling features, such as, for example, an integrated radial fan 636 or an integrated axial fan 632. A radial fan may comprise cooling fins positioned on an upper surface of hoop 626 and provide cooling to a stator 668 when rotor 600 is rotating about central axis A. An axial fan may include fins positioned along an inner surface of hoop 626 and provide cooling to motor. Radial fan and/or axial fans may increase air flow in rotor 600 and cause convection cooling. Radial and axial fans may be consistent with motor cooling fans provided in the disclosure U.S. application Ser. No. 17/563, 498, titled "AN ELECTRIC AIRCRAFT LIFT MOTOR WITH AIR COOLING", which is incorporated in this disclosure in its entirety. In one or more embodiments, hoop 626 may include various types of materials, such as for example, titanium, steel, and the like.

With continued reference to FIGS. 6A and 6B, and in one or more embodiments, a retention band 628 surrounds magnets 612. Retention band 628 may be present around the outer surface of magnets 612. The outer surface of magnets 612 may be the surface opposite the surface in contact with hoop 626. Retention band 628 may be a sleeve of a solid material or an aggregation of individual materials that run along the outer surface of magnets 612. Retention band 628 may be made from various materials, such as stainless steel, titanium, carbon, carbon-composite, and the like. Retention band 628 and magnets 612 may have the same or similar coefficients of thermal expansion. As a result, retention band 628 and/or magnets 612 may expand or shrink at similar rates, allowing for uniform stress around the magnets 612. A similar coefficient of thermal expansion may allow for no point forces to form between the retention band 626-628 and magnets 612. As used herein, a "retention band" is a component for maintaining a position of the component it is surrounding. For example, a retention band may be configured to maintain a position of magnets 612 by providing inward forces around the magnets 612. For example, retention band 628 may provide stability for rotor 600 and prevent magnets 612 from lifting from outer surface 660 of hoop 626 due to centrifugal forces. Retention band 628 may include slits of various shapes and patterns to provide venting for temperature management purposes. For, example, slits 642 allow for air to pass through retention band 628, allowing air to circulate through rotor 600 when rotor 600 is spinning about central axis A.

With continued reference to FIGS. 6A and 6B, retention band 628 may be configured to reduce eddy currents. As used herein, "eddy currents" are loops of electrical current induced by a changing magnetic field. These voltages may cause small circulating currents to flow, which may be eddy currents. Eddy currents may serve no useful purpose in a motor and result in wasted power. A retention band 628 composed of a poor conductor, such as titanium, steel, plastics, rubber, and the like, may be used to reduce eddy currents. A poor conductor may be a material with a low conductivity. A low conductivity may be less than 3E6 S/m at 20° C. Additionally, the slits of retention band 628 may reduce eddy currents by breakup the area that the currents may circulate in.

With continued reference to FIGS. 6A and 6B, and in one or more embodiments, rotor 600 may include a plurality of spokes 640, that radiate from hub 608 to connect hub 608 and hoop 626. Spokes 640 may extend radially outward from hub 608 to hoop 626. Spokes 640 may be positioned in various arrangements to provide structural support to rotor 600. In one or more embodiments, spokes 640 may be made from various materials, such as steel, titanium and the like. In some embodiments, hoop 626 and spokes 640 may be separate components that may be assembly together. In other embodiments, hoop 626 and spokes 640 may be a monolithic structure. For example, in some cases spokes may include a single element, such as without limitation a disc. Disc may be solid or may include holes. In one or more embodiments, a distal end 644 of each spoke may terminate at and/or be attached to hoop 626, and a proximal end 648 of each spoke 640 may be attached to hub 608.

Referring now to FIG. 7, an exemplary embodiment of an electric aircraft 700 with a propulsor 704 is illustrated in accordance with one or more embodiments of the present disclosure. As used in this disclosure an "aircraft" is any vehicle that may fly by gaining support from the air. As a non-limiting example, aircraft may include airplanes, helicopters, commercial and/or recreational aircrafts, instrument flight aircrafts, drones, electric aircrafts, airliners, rotorcrafts, vertical takeoff and landing aircrafts, jets, airships, blimps, gliders, paramotors, and the like. Aircraft 700 may include an electrically powered aircraft. In embodiments, electrically powered aircraft may be an electric vertical takeoff and landing (eVTOL) aircraft. Electric aircraft may be capable of rotor-based cruising flight, rotor-based takeoff, rotor-based landing, fixed-wing cruising flight, airplane-style takeoff, airplane-style landing, and/or any combination thereof. Electric aircraft may include one or more manned and/or unmanned aircrafts. Electric aircraft may include one or more all-electric short takeoff and landing (eSTOL) aircrafts. For example, and without limitation, eVTOL aircrafts may accelerate plane to a flight speed on takeoff and decelerate plane after landing. In an embodiment, and without limitation, electric aircraft may be configured with an electric propulsion assembly. Electric propulsion assembly may include any electric propulsion assembly as described in U.S. Nonprovisional application Ser. No. 16/603,225, filed on Dec. 4, 2019, and entitled "AN INTEGRATED ELECTRIC PROPULSION ASSEMBLY," the entirety of which is incorporated herein by reference.

With continued reference to FIG. 7, and as used in this disclosure, a "vertical take-off and landing (eVTOL) aircraft" is an aircraft that can hover, take off, and land vertically. In some embodiments, the eVTOL aircraft may use an energy source of a plurality of energy sources to power aircraft. To optimize the power and energy necessary to propel aircraft 700, eVTOL may be capable of rotor-based cruising flight, rotor-based takeoff, rotor-based landing, fixed-wing cruising flight, airplane-style takeoff, airplane style landing, and/or any combination thereof. Rotor-based flight, as described herein, is where the aircraft generates lift and propulsion by way of one or more powered rotors or blades coupled with an engine, such as a "quad-copter," multi-rotor helicopter, or other vehicle that maintains its lift primarily using downward thrusting propulsors. "Fixed-wing flight", as described herein, is where an aircraft is capable of flight using wings and/or foils that generate lift caused by the aircraft's forward airspeed and the shape of the wings and/or foils, such as airplane-style flight.

With continued reference to FIG. 7, and in one or more embodiments, aircraft 700 may include motor, which may be mounted on a structural feature of an aircraft. Design of motor may enable it to be installed external to the structural member (such as a boom, nacelle, or fuselage) for easy maintenance access and to minimize accessibility requirements for the structure. This may improve structural efficiency by requiring fewer large holes in the mounting area. This design may include two main holes in the top and bottom of the mounting area to access bearing cartridge. Further, a structural feature may include a component of aircraft 700. For example, and without limitation structural feature may be any portion of a vehicle incorporating motor, including any vehicle as described below. As a further non-limiting example, a structural feature may include without limitation a wing, a spar, an outrigger, a fuselage, or any portion thereof; persons skilled in the art, upon reviewing the entirety of this disclosure, will be aware of many possible features that may function as at least a structural feature. At least a structural feature may be constructed of any suitable material or combination of materials, including without limitation metal such as aluminum, titanium, steel, or the like, polymer materials or composites, fiberglass, carbon fiber, wood, or any other suitable material. As a non-limiting example, at least a structural feature may be constructed from additively manufactured polymer material with a carbon fiber exterior; aluminum parts or other elements may be enclosed for structural strength, or for purposes of supporting, for instance, vibration, torque or shear stresses imposed by at least propulsor 704. Persons skilled in the art, upon reviewing the entirety of this disclosure, will be aware of various materials, combinations of materials, and/or constructions techniques.

With continued reference to FIG. 7, aircraft 700 may include a propulsor 704. For the purposes of this disclosure, a "propulsor" is a component or device used to propel a craft by exerting force on a fluid medium, which may include a gaseous medium such as air or a liquid medium such as water. Propulsor may include any device or component that consumes electrical power on demand to propel an electric aircraft in a direction or other vehicle while on ground or in-flight. For example, and without limitation, propulsor may include a rotor, propeller, paddle wheel, and the like thereof. In an embodiment, propulsor may include a plurality of blades. As used in this disclosure a "blade" is a propeller that converts rotary motion from an engine or other power source into a swirling slipstream. In an embodiment, blade may convert rotary motion to push the propeller forwards or backwards. In an embodiment, propulsor may include a rotating power-driven hub, to which are attached several radial airfoil-section blades such that the whole assembly rotates about a longitudinal axis. In one or more embodiments, a rotor may be used in a motor of a lift propulsor, which is further described in this disclosure with reference to FIG. 7. For the purposes of this disclosure, a "lift propulsor" is a propulsor that produces lift. In one or more exemplary embodiments, propulsor 704 may include a vertical propulsor or a forward propulsor. A forward propulsor may include a propulsor configured to propel aircraft 700 in a forward direction. A vertical propulsor may include a propulsor configured to propel aircraft 700 in an upward direction. One of ordinary skill in the art would understand upward to comprise the imaginary axis protruding from the earth at a normal angle, configured to be normal to any tangent plane to a point on a sphere (i.e. skyward). In an embodiment, vertical propulsor can be a propulsor that generates a substantially downward thrust, tending to propel an aircraft in an opposite, vertical direction and provides thrust for maneuvers. Such maneuvers can include, without limitation, vertical take-off, vertical landing, hovering, and/or rotor-based flight such as "quadcopter" or similar styles of flight.

With continued reference to FIG. 7, and in an embodiment, propulsor 704 may include a propeller, a blade, or the like. The function of a propeller is to convert rotary motion from an engine or other power source into a swirling slipstream which pushes the propeller forwards or backwards. The propulsor may include a rotating power-driven hub, to which are attached several radial airfoil-section blades such that the whole assembly rotates about a longitudinal axis. The blade pitch of a propeller may, for example, be fixed, manually variable to a few set positions, automatically variable (e.g. a "constant-speed" type), or any combination thereof. In an exemplary embodiment, propellers for an aircraft may be designed to be fixed to their hub at an angle similar to the thread on a screw makes an angle to the shaft; this angle may be referred to as a pitch or pitch angle which will determine the speed of the forward movement as the blade rotates.

With continued reference to FIG. 7, and in an embodiment, a propulsor can include a thrust element which may be integrated into the propulsor. The thrust element may include, without limitation, a device using moving or rotating foils, such as one or more rotors, an airscrew or propeller, a set of airscrews or propellers such as contra-rotating propellers, a moving or flapping wing, or the like. Further, a thrust element, for example, can include without limitation a marine propeller or screw, an impeller, a turbine, a pump-jet, a paddle or paddle-based device, or the like.

With continued reference to FIG. 7, a propulsor may include a pusher component. As used in this disclosure a "pusher component" is a component that pushes and/or thrusts an aircraft through a medium. As a non-limiting example, pusher component may include a pusher propeller, a paddle wheel, a pusher motor, a pusher propulsor, and the like. Pusher component may be configured to produce a forward thrust. As used in this disclosure a "forward thrust" is a thrust that forces aircraft through a medium in a horizontal direction, wherein a horizontal direction is a direction parallel to the longitudinal axis. For example, forward thrust may include a force of 1145 N to force aircraft to in a horizontal direction along the longitudinal axis. As a further non-limiting example, pusher component may twist and/or rotate to pull air behind it and, at the same time, push aircraft 700 forward with an equal amount of force. In an embodiment, and without limitation, the more air forced behind aircraft, the greater the thrust force with which aircraft 700 is pushed horizontally will be. In another embodiment, and without limitation, forward thrust may force aircraft 700 through the medium of relative air. Additionally or alternatively, plurality of propulsor may include one or more puller components. As used in this disclosure a "puller component" is a component that pulls and/or tows an aircraft through a medium. As a non-limiting example, puller component may include a flight component such as a puller propeller, a puller motor, a tractor propeller, a puller propulsor, and the like. Additionally, or alternatively, puller component may include a plurality of puller flight components.

With continued reference to FIG. 7, and in one or more embodiments, propulsor 704 includes a motor. The motor may include, without limitation, any electric motor, where an electric motor is a device that converts electrical energy into mechanical energy, for instance by causing a shaft to rotate. A motor may be driven by direct current (DC) electric power; for instance, a motor may include a brushed DC motor or the like. A motor may be driven by electric power having varying or reversing voltage levels, such as alternating current (AC) power as produced by an alternating current generator and/or inverter, or otherwise varying power, such as produced by a switching power source. A motor may include, without limitation, a brushless DC electric motor, a permanent magnet synchronous motor, a switched reluctance motor, and/or an induction motor; persons skilled in the art, upon reviewing the entirety of this disclosure, will be aware of various alternative or additional forms and/or configurations that a motor may take or exemplify as consistent with this disclosure. In addition to inverter and/or switching power source, a circuit driving motor may include electronic speed controllers (not shown) or other components for regulating motor speed, rotation direction, torque, and the like.

With continued reference to FIG. 7, propulsor 704 may include two or more blades 708. In an embodiment, a propulsor 704 may include an advancing blade and a retreating blade. An advancing blade moves towards a nose 712 of an aircraft and a retreating blade moves towards a tail 716 of an aircraft. Blades 708 may be solid blades. As used herein, a "solid blade" is a blade such that is substantially rigid and not susceptible to bending during flight. Blade pitch on solid blades may not be individually adjustable, therefore cyclic controls may only control the blade pitch as a whole. Specifically, the advancing blade and the retreating blade may be considered a solid blade together and may not be individually adjusted and may be adjusted as a whole. As used herein, "blade pitch" is the angle of a blade. Cyclic controls are discussed in further detail in FIG. 2.

With continued reference to FIG. 7, aircraft 700 may include a fuselage 720. In one or more embodiments, and as used in this disclosure, a "fuselage" is a main body of an aircraft. In one or more embodiments, fuselage 720 may include the entirety of aircraft except for a cockpit, nose, wings, empennage, nacelles, flight components, such as any and all control surfaces and propulsors. Fuselage 720 may contain a payload of aircraft. In one or more embodiments, airframe may form fuselage 720. For example, and without limitation, one or more structural elements of airframe may be used to form fuselage 720. For the purposes of this disclosure, "structural elements" include elements that physically support a shape and structure of an aircraft. Structural elements may take a plurality of forms, alone or in combination with other types. In one or more embodiments, a structural element may include a carbon fiber composite structure, as previously mentioned. The carbon fiber composite structure is configured to include high stiffness, high tensile strength, low weight to strength ratio, high chemical resistance, high temperature tolerance, and low thermal expansion. In one or more embodiments, a carbon fiber composite may include one or more carbon fiber structures comprising a plastic resin and/or graphite. For example, a carbon fiber composite may be formed as a function of a binding carbon fiber to a thermoset resin, such as an epoxy, and/or a thermoplastic polymer, such as polyester, vinyl ester, nylon, and the like thereof. Structural element may vary depending on a construction type of aircraft. For example, and without limitation, structural element may vary if forming the portion of aircraft that is fuselage 720. Fuselage 720 may include a truss structure. A truss structure may be used with a lightweight aircraft and include welded steel tube trusses. A "truss," as used in this disclosure, is an assembly of beams that create a rigid structure, often in combinations of triangles to create three-dimensional shapes. A truss structure may alternatively comprise wood construction in place of steel tubes, or a combination thereof. In embodiments, structural elements may include steel tubes and/or wood beams.

Figure 8:
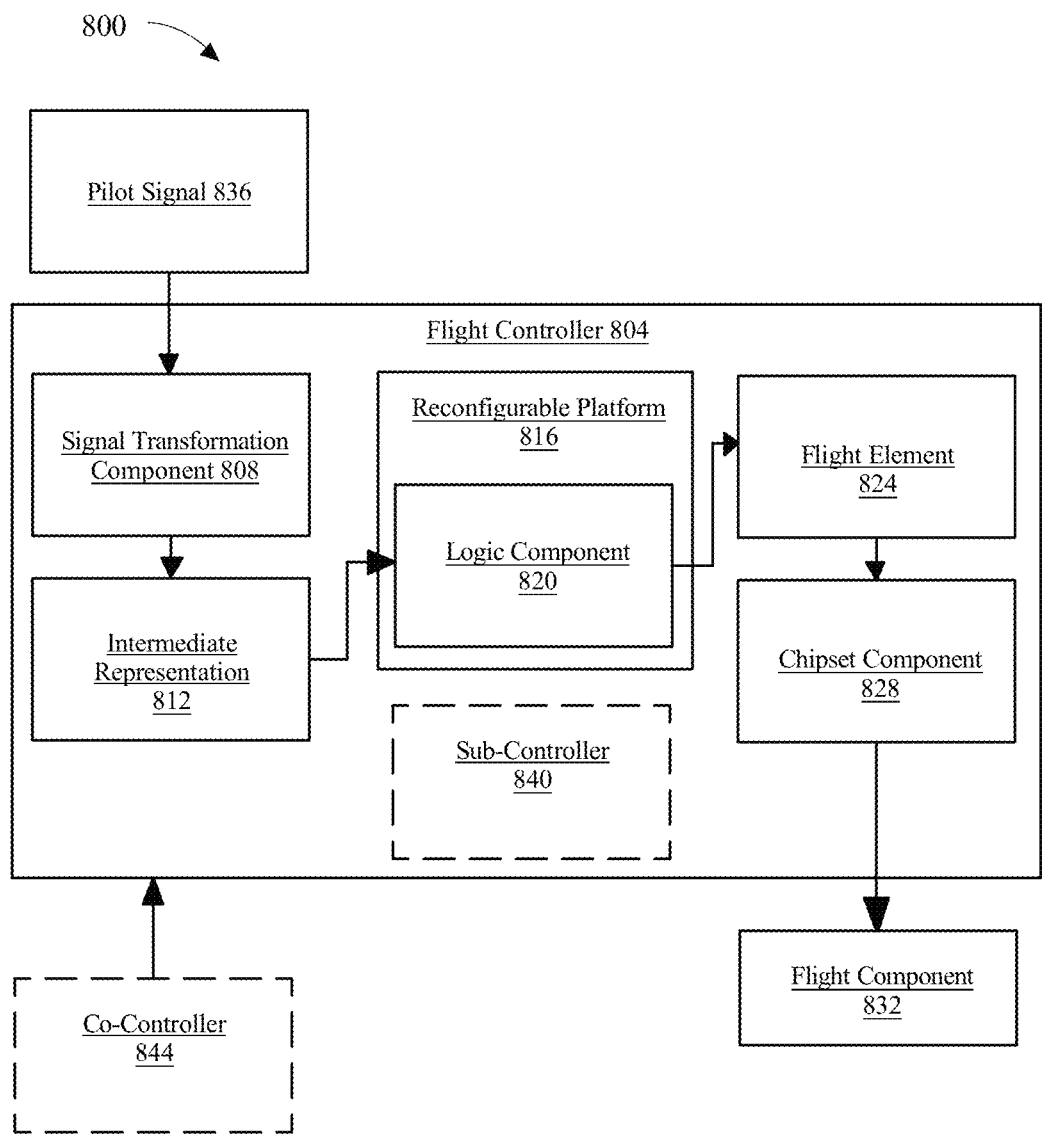
FIG. 8 is a block diagram of an exemplary embodiment of a flight controller.

Now referring to FIG. 8, an exemplary embodiment 800 of a flight controller 804 is illustrated. As used in this disclosure a "flight controller" is a computing device of a plurality of computing devices dedicated to data storage, security, distribution of traffic for load balancing, and flight instruction. Flight controller 804 may include and/or communicate with any computing device as described in this disclosure, including without limitation a microcontroller, microprocessor, digital signal processor (DSP) and/or system on a chip (SoC) as described in this disclosure. Further, flight controller 804 may include a single computing device operating independently, or may include two or more computing device operating in concert, in parallel, sequentially or the like; two or more computing devices may be included together in a single computing device or in two or more computing devices. In embodiments, flight controller 804 may be installed in an aircraft, may control the aircraft remotely, and/or may include an element installed in the aircraft and a remote element in communication therewith.

In an embodiment, and with continued reference to FIG. 8, flight controller 804 may include a signal transformation component 808. As used in this disclosure a "signal transformation component" is a component that transforms and/or converts a first signal to a second signal, wherein a signal may include one or more digital and/or analog signals. For example, and without limitation, signal transformation component 808 may be configured to perform one or more operations such as preprocessing, lexical analysis, parsing, semantic analysis, and the like thereof. In an embodiment, and without limitation, signal transformation component 808 may include one or more analog-to-digital convertors that transform a first signal of an analog signal to a second signal of a digital signal. For example, and without limitation, an analog-to-digital converter may convert an analog input signal to a 10-bit binary digital representation of that signal. In another embodiment, signal transformation component 808 may include transforming one or more low-level languages such as, but not limited to, machine languages and/or assembly languages. For example, and without limitation, signal transformation component 808 may include transforming a binary language signal to an assembly language signal. In an embodiment, and without limitation, signal transformation component 808 may include transforming one or more high-level languages and/or formal languages such as but not limited to alphabets, strings, and/or languages. For example, and without limitation, high-level languages may include one or more system languages, scripting languages, domain-specific languages, visual languages, esoteric languages, and the like thereof. As a further non-limiting example, high-level languages may include one or more algebraic formula languages, business data languages, string and list languages, object-oriented languages, and the like thereof.

With continued reference to FIG. 8, signal transformation component 808 may be configured to optimize an intermediate representation 812. As used in this disclosure an "intermediate representation" is a data structure and/or code that represents the input signal. Signal transformation component 808 may optimize intermediate representation as a function of a data-flow analysis, dependence analysis, alias analysis, pointer analysis, escape analysis, and the like thereof. In an embodiment, and without limitation, signal transformation component 808 may optimize intermediate representation 812 as a function of one or more inline expansions, dead code eliminations, constant propagation, loop transformations, and/or automatic parallelization functions. In another embodiment, signal transformation component 808 may optimize intermediate representation as a function of a machine dependent optimization such as a peephole optimization, wherein a peephole optimization may rewrite short sequences of code into more efficient sequences of code. Signal transformation component 808 may optimize intermediate representation to generate an output language, wherein an "output language," as used herein, is the native machine language of flight controller 804. For example, and without limitation, native machine language may include one or more binary and/or numerical languages.

In an embodiment, and without limitation, signal transformation component 808 may include transform one or more inputs and outputs as a function of an error correction code. An error correction code, also known as error correcting code (ECC), is an encoding of a message or lot of data using redundant information, permitting recovery of corrupted data. An ECC may include a block code, in which information is encoded on fixed-size packets and/or blocks of data elements such as symbols of predetermined size, bits, or the like. Reed-Solomon coding, in which message symbols within a symbol set having q symbols are encoded as coefficients of a polynomial of degree less than or equal to a natural number k, over a finite field F with q elements; strings so encoded have a minimum hamming distance of k+1, and permit correction of (q−k−1)/2 erroneous symbols. Block code may alternatively or additionally be implemented using Golay coding, also known as binary Golay coding, Bose-Chaudhuri, Hocquenghuem (BCH) coding, multidimensional parity-check coding, and/or Hamming codes. An ECC may alternatively or additionally be based on a convolutional code.

In an embodiment, and with continued reference to FIG. 8, flight controller 804 may include a reconfigurable hardware platform 816. A "reconfigurable hardware platform," as used herein, is a component and/or unit of hardware that may be reprogrammed, such that, for instance, a data path between elements such as logic gates or other digital circuit elements may be modified to change an algorithm, state, logical sequence, or the like of the component and/or unit. This may be accomplished with such flexible high-speed computing fabrics as field-programmable gate arrays (FPGAs), which may include a grid of interconnected logic gates, connections between which may be severed and/or restored to program in modified logic. Reconfigurable hardware platform 816 may be reconfigured to enact any algorithm and/or algorithm selection process received from another computing device and/or created using machine-learning processes.

With continued reference to FIG. 8, reconfigurable hardware platform 816 may include a logic component 820. As used in this disclosure a "logic component" is a component that executes instructions on output language. For example, and without limitation, logic component may perform basic arithmetic, logic, controlling, input/output operations, and the like thereof. Logic component 820 may include any suitable processor, such as without limitation a component incorporating logical circuitry for performing arithmetic and logical operations, such as an arithmetic and logic unit (ALU), which may be regulated with a state machine and directed by operational inputs from memory and/or sensors; logic component 820 may be organized according to Von Neumann and/or Harvard architecture as a non-limiting example. Logic component 820 may include, incorporate, and/or be incorporated in, without limitation, a microcontroller, microprocessor, digital signal processor (DSP), Field Programmable Gate Array (FPGA), Complex Programmable Logic Device (CPLD), Graphical Processing Unit (GPU), general purpose GPU, Tensor Processing Unit (TPU), analog or mixed signal processor, Trusted Platform Module (TPM), a floating point unit (FPU), and/or system on a chip (SoC). In an embodiment, logic component 820 may include one or more integrated circuit microprocessors, which may contain one or more central processing units, central processors, and/or main processors, on a single metal-oxide-semiconductor chip. Logic component 820 may be configured to execute a sequence of stored instructions to be performed on the output language and/or intermediate representation 812. Logic component 820 may be configured to fetch and/or retrieve the instruction from a memory cache, wherein a "memory cache," as used in this disclosure, is a stored instruction set on flight controller 804. Logic component 820 may be configured to decode the instruction retrieved from the memory cache to opcodes and/or operands. Logic component 820 may be configured to execute the instruction on intermediate representation 812 and/or output language. For example, and without limitation, logic component 820 may be configured to execute an addition operation on intermediate representation 812 and/or output language.

In an embodiment, and without limitation, logic component 820 may be configured to calculate a flight element 824. As used in this disclosure a "flight element" is an element of datum denoting a relative status of aircraft. For example, and without limitation, flight element 824 may denote one or more torques, thrusts, airspeed velocities, forces, altitudes, groundspeed velocities, directions during flight, directions facing, forces, orientations, and the like thereof. For example, and without limitation, flight element 824 may denote that aircraft is cruising at an altitude and/or with a sufficient magnitude of forward thrust. As a further non-limiting example, flight status may denote that is building thrust and/or groundspeed velocity in preparation for a takeoff. As a further non-limiting example, flight element 824 may denote that aircraft is following a flight path accurately and/or sufficiently.

With continued reference to FIG. 8, flight controller 804 may include a chipset component 828. As used in this disclosure a "chipset component" is a component that manages data flow. In an embodiment, and without limitation, chipset component 828 may include a northbridge data flow path, wherein the northbridge dataflow path may manage data flow from logic component 820 to a high-speed device and/or component, such as a RAM, graphics controller, and the like thereof. In another embodiment, and without limitation, chipset component 828 may include a southbridge data flow path, wherein the southbridge dataflow path may manage data flow from logic component 820 to lower-speed peripheral buses, such as a peripheral component interconnect (PCI), industry standard architecture (ICA), and the like thereof. In an embodiment, and without limitation, southbridge data flow path may include managing data flow between peripheral connections such as ethernet, USB, audio devices, and the like thereof. Additionally or alternatively, chipset component 828 may manage data flow between logic component 820, memory cache, and a flight component 832. As used in this disclosure a "flight component" is a portion of an aircraft that can be moved or adjusted to affect one or more flight elements. For example, flight component 732 may include a component used to affect the aircrafts' roll and pitch which may comprise one or more ailerons. As a further example, flight component 832 may include a rudder to control yaw of an aircraft. In an embodiment, chipset component 828 may be configured to communicate with a plurality of flight components as a function of flight element 824. For example, and without limitation, chipset component 828 may transmit to an aircraft rotor to reduce torque of a first lift propulsor and increase the forward thrust produced by a pusher component to perform a flight maneuver.

In an embodiment, and with continued reference to FIG. 8, flight controller 804 may be configured generate an autonomous function. As used in this disclosure an "autonomous function" is a mode and/or function of flight controller 804 that controls aircraft automatically. For example, and without limitation, autonomous function may perform one or more aircraft maneuvers, take offs, landings, altitude adjustments, flight leveling adjustments, turns, climbs, and/or descents. As a further non-limiting example, autonomous function may adjust one or more airspeed velocities, thrusts, torques, and/or groundspeed velocities. As a further non-limiting example, autonomous function may perform one or more flight path corrections and/or flight path modifications as a function of flight element 824. In an embodiment, autonomous function may include one or more modes of autonomy such as, but not limited to, autonomous mode, semi-autonomous mode, and/or non-autonomous mode. As used in this disclosure "autonomous mode" is a mode that automatically adjusts and/or controls aircraft and/or the maneuvers of aircraft in its entirety. For example, autonomous mode may denote that flight controller 804 will adjust the aircraft. As used in this disclosure a "semi-autonomous mode" is a mode that automatically adjusts and/or controls a portion and/or section of aircraft. For example, and without limitation, semi-autonomous mode may denote that a pilot will control the propulsors, wherein flight controller 804 will control the ailerons and/or rudders. As used in this disclosure "non-autonomous mode" is a mode that denotes a pilot will control aircraft and/or maneuvers of aircraft in its entirety.

In an embodiment, and with continued reference to FIG. 8, flight controller 804 may generate autonomous function as a function of an autonomous machine-learning model. As used in this disclosure an "autonomous machine-learning model" is a machine-learning model to produce an autonomous function output given flight element 824 and a pilot signal 836 as inputs; this is in contrast to a non-machine learning software program where the commands to be executed are determined in advance by a user and written in a programming language. As used in this disclosure a "pilot signal" is an element of datum representing one or more functions a pilot is controlling and/or adjusting. For example, pilot signal 836 may denote that a pilot is controlling and/or maneuvering ailerons, wherein the pilot is not in control of the rudders and/or propulsors. In an embodiment, pilot signal 836 may include an implicit signal and/or an explicit signal. For example, and without limitation, pilot signal 836 may include an explicit signal, wherein the pilot explicitly states there is a lack of control and/or desire for autonomous function. As a further non-limiting example, pilot signal 836 may include an explicit signal directing flight controller 804 to control and/or maintain a portion of aircraft, a portion of the flight plan, the entire aircraft, and/or the entire flight plan. As a further non-limiting example, pilot signal 836 may include an implicit signal, wherein flight controller 804 detects a lack of control such as by a malfunction, torque alteration, flight path deviation, and the like thereof. In an embodiment, and without limitation, pilot signal 836 may include one or more explicit signals to reduce torque, and/or one or more implicit signals that torque may be reduced due to reduction of airspeed velocity. In an embodiment, and without limitation, pilot signal 836 may include one or more local and/or global signals. For example, and without limitation, pilot signal 836 may include a local signal that is transmitted by a pilot and/or crew member. As a further non-limiting example, pilot signal 836 may include a global signal that is transmitted by air traffic control and/or one or more remote users that are in communication with the pilot of aircraft. In an embodiment, pilot signal 836 may be received as a function of a tri-state bus and/or multiplexor that denotes an explicit pilot signal should be transmitted prior to any implicit or global pilot signal.

With continued reference to FIG. 8, autonomous machine-learning model may include one or more autonomous machine-learning processes such as supervised, unsupervised, or reinforcement machine-learning processes that flight controller 804 and/or a remote device may or may not use in the generation of autonomous function. As used in this disclosure "remote device" is an external device to flight controller 804. Additionally or alternatively, autonomous machine-learning model may include one or more autonomous machine-learning processes that a field-programmable gate array (FPGA) may or may not use in the generation of autonomous function. Autonomous machine-learning process may include, without limitation machine learning processes such as simple linear regression, multiple linear regression, polynomial regression, support vector regression, ridge regression, lasso regression, elasticnet regression, decision tree regression, random forest regression, logistic regression, logistic classification, K-nearest neighbors, support vector machines, kernel support vector machines, naïve bayes, decision tree classification, random forest classification, K-means clustering, hierarchical clustering, dimensionality reduction, principal component analysis, linear discriminant analysis, kernel principal component analysis, Q-learning, State Action Reward State Action (SARSA), Deep-Q network, Markov decision processes, Deep Deterministic Policy Gradient (DDPG), or the like thereof.

In an embodiment, and with continued reference to FIG. 8, autonomous machine learning model may be trained as a function of autonomous training data, wherein autonomous training data may correlate a flight element, pilot signal, and/or simulation data to an autonomous function. For example, and without limitation, a flight element of an airspeed velocity, a pilot signal of limited and/or no control of propulsors, and a simulation data of required airspeed velocity to reach the destination may result in an autonomous function that includes a semi-autonomous mode to increase thrust of the propulsors. Autonomous training data may be received as a function of user-entered valuations of flight elements, pilot signals, simulation data, and/or autonomous functions. Flight controller 804 may receive autonomous training data by receiving correlations of flight element, pilot signal, and/or simulation data to an autonomous function that were previously received and/or determined during a previous iteration of generation of autonomous function. Autonomous training data may be received by one or more remote devices and/or FPGAs that at least correlate a flight element, pilot signal, and/or simulation data to an autonomous function. Autonomous training data may be received in the form of one or more user-entered correlations of a flight element, pilot signal, and/or simulation data to an autonomous function.

With continued reference to FIG. 8, flight controller 804 may receive autonomous machine-learning model from a remote device and/or FPGA that utilizes one or more autonomous machine learning processes, wherein a remote device and an FPGA is described above in detail. For example, and without limitation, a remote device may include a computing device, external device, processor, FPGA, microprocessor and the like thereof. Remote device and/or FPGA may perform the autonomous machine-learning process using autonomous training data to generate autonomous function and transmit the output to flight controller 804. Remote device and/or FPGA may transmit a signal, bit, datum, or parameter to flight controller 804 that at least relates to autonomous function. Additionally or alternatively, the remote device and/or FPGA may provide an updated machine-learning model. For example, and without limitation, an updated machine-learning model may be comprised of a firmware update, a software update, an autonomous machine-learning process correction, and the like thereof. As a non-limiting example a software update may incorporate a new simulation data that relates to a modified flight element. Additionally or alternatively, the updated machine learning model may be transmitted to the remote device and/or FPGA, wherein the remote device and/or FPGA may replace the autonomous machine-learning model with the updated machine-learning model and generate the autonomous function as a function of the flight element, pilot signal, and/or simulation data using the updated machine-learning model. The updated machine-learning model may be transmitted by the remote device and/or FPGA and received by flight controller 804 as a software update, firmware update, or corrected autonomous machine-learning model. For example, and without limitation autonomous machine learning model may utilize a neural net machine-learning process, wherein the updated machine-learning model may incorporate a gradient boosting machine-learning process.

With continued reference to FIG. 8, flight controller 804 may include, be included in, and/or communicate with a mobile device such as a mobile telephone or smartphone. Further, flight controller may communicate with one or more additional devices as described below in further detail via a network interface device. The network interface device may be utilized for commutatively connecting a flight controller to one or more of a variety of networks, and one or more devices. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. The network may include any network topology and can may employ a wired and/or a wireless mode of communication.

In an embodiment, and with continued reference to FIG. 8, flight controller 804 may include, but is not limited to, for example, a cluster of flight controllers in a first location and a second flight controller or cluster of flight controllers in a second location. Flight controller 804 may include one or more flight controllers dedicated to data storage, security, distribution of traffic for load balancing, and the like. Flight controller 804 may be configured to distribute one or more computing tasks as described below across a plurality of flight controllers, which may operate in parallel, in series, redundantly, or in any other manner used for distribution of tasks or memory between computing devices. For example, and without limitation, flight controller 804 may implement a control algorithm to distribute and/or command the plurality of flight controllers. As used in this disclosure a "control algorithm" is a finite sequence of well-defined computer implementable instructions that may determine the flight component of the plurality of flight components to be adjusted. For example, and without limitation, control algorithm may include one or more algorithms that reduce and/or prevent aviation asymmetry. As a further non-limiting example, control algorithms may include one or more models generated as a function of a software including, but not limited to Simulink by MathWorks, Natick, Massachusetts, USA. In an embodiment, and without limitation, control algorithm may be configured to generate an auto-code, wherein an "auto-code," is used herein, is a code and/or algorithm that is generated as a function of the one or more models and/or software's. In another embodiment, control algorithm may be configured to produce a segmented control algorithm. As used in this disclosure a "segmented control algorithm" is control algorithm that has been separated and/or parsed into discrete sections. For example, and without limitation, segmented control algorithm may parse control algorithm into two or more segments, wherein each segment of control algorithm may be performed by one or more flight controllers operating on distinct flight components.

In an embodiment, and with continued reference to FIG. 8, control algorithm may be configured to determine a segmentation boundary as a function of segmented control algorithm. As used in this disclosure a "segmentation boundary" is a limit and/or delineation associated with the segments of the segmented control algorithm. For example, and without limitation, segmentation boundary may denote that a segment in the control algorithm has a first starting section and/or a first ending section. As a further non-limiting example, segmentation boundary may include one or more boundaries associated with an ability of flight component 832. In an embodiment, control algorithm may be configured to create an optimized signal communication as a function of segmentation boundary. For example, and without limitation, optimized signal communication may include identifying the discrete timing required to transmit and/or receive the one or more segmentation boundaries. In an embodiment, and without limitation, creating optimized signal communication further comprises separating a plurality of signal codes across the plurality of flight controllers. For example, and without limitation the plurality of flight controllers may include one or more formal networks, wherein formal networks transmit data along an authority chain and/or are limited to task-related communications. As a further non-limiting example, communication network may include informal networks, wherein informal networks transmit data in any direction. In an embodiment, and without limitation, the plurality of flight controllers may include a chain path, wherein a "chain path," as used herein, is a linear communication path comprising a hierarchy that data may flow through. In an embodiment, and without limitation, the plurality of flight controllers may include an all-channel path, wherein an "all-channel path," as used herein, is a communication path that is not restricted to a particular direction. For example, and without limitation, data may be transmitted upward, downward, laterally, and the like thereof. In an embodiment, and without limitation, the plurality of flight controllers may include one or more neural networks that assign a weighted value to a transmitted datum. For example, and without limitation, a weighted value may be assigned as a function of one or more signals denoting that a flight component is malfunctioning and/or in a failure state.

With continued reference to FIG. 8, the plurality of flight controllers may include a master bus controller. As used in this disclosure a "master bus controller" is one or more devices and/or components that are connected to a bus to initiate a direct memory access transaction, wherein a bus is one or more terminals in a bus architecture. Master bus controller may communicate using synchronous and/or asynchronous bus control protocols. In an embodiment, master bus controller may include flight controller 804. In another embodiment, master bus controller may include one or more universal asynchronous receiver-transmitters (UART). For example, and without limitation, master bus controller may include one or more bus architectures that allow a bus to initiate a direct memory access transaction from one or more buses in the bus architectures. As a further non-limiting example, master bus controller may include one or more peripheral devices and/or components to communicate with another peripheral device and/or component and/or the master bus controller. In an embodiment, master bus controller may be configured to perform bus arbitration. As used in this disclosure "bus arbitration" is method and/or scheme to prevent multiple buses from attempting to communicate with and/or connect to master bus controller. For example and without limitation, bus arbitration may include one or more schemes such as a small computer interface system, wherein a small computer interface system is a set of standards for physical connecting and transferring data between peripheral devices and master bus controller by defining commands, protocols, electrical, optical, and/or logical interfaces. In an embodiment, master bus controller may receive intermediate representation 812 and/or output language from logic component 820, wherein output language may include one or more analog-to-digital conversions, low bit rate transmissions, message encryptions, digital signals, binary signals, logic signals, analog signals, and the like thereof described above in detail.

With continued reference to FIG. 8, master bus controller may communicate with a slave bus. As used in this disclosure a "slave bus" is one or more peripheral devices and/or components that initiate a bus transfer. For example, and without limitation, slave bus may receive one or more controls and/or asymmetric communications from master bus controller, wherein slave bus transfers data stored to master bus controller. In an embodiment, and without limitation, slave bus may include one or more internal buses, such as but not limited to a/an internal data bus, memory bus, system bus, front-side bus, and the like thereof. In another embodiment, and without limitation, slave bus may include one or more external buses such as external flight controllers, external computers, remote devices, printers, aircraft computer systems, flight control systems, and the like thereof.

In an embodiment, and with continued reference to FIG. 8, control algorithm may optimize signal communication as a function of determining one or more discrete timings. For example, and without limitation master bus controller may synchronize timing of the segmented control algorithm by injecting high priority timing signals on a bus of the master bus control. As used in this disclosure a "high priority timing signal" is information denoting that the information is important. For example, and without limitation, high priority timing signal may denote that a section of control algorithm is of high priority and should be analyzed and/or transmitted prior to any other sections being analyzed and/or transmitted. In an embodiment, high priority timing signal may include one or more priority packets. As used in this disclosure a "priority packet" is a formatted unit of data that is communicated between the plurality of flight controllers. For example, and without limitation, priority packet may denote that a section of control algorithm should be used and/or is of greater priority than other sections.

With continued reference to FIG. 8, flight controller 804 may also be implemented using a "shared nothing" architecture in which data is cached at the worker, in an embodiment, this may enable scalability of aircraft and/or computing device. Flight controller 804 may include a distributer flight controller. As used in this disclosure a "distributer flight controller" is a component that adjusts and/or controls a plurality of flight components as a function of a plurality of flight controllers. For example, distributer flight controller may include a flight controller that communicates with a plurality of additional flight controllers and/or clusters of flight controllers. In an embodiment, distributed flight control may include one or more neural networks. For example, neural network also known as an artificial neural network, is a network of "nodes," or data structures having one or more inputs, one or more outputs, and a function determining outputs based on inputs. Such nodes may be organized in a network, such as without limitation a convolutional neural network, including an input layer of nodes, one or more intermediate layers, and an output layer of nodes. Connections between nodes may be created via the process of "training" the network, in which elements from a training dataset are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning.

With continued reference to FIG. 8, a node may include, without limitation a plurality of inputs $x_i$ that may receive numerical values from inputs to a neural network containing the node and/or from other nodes. Node may perform a weighted sum of inputs using weights $w_i$ that are multiplied by respective inputs $x_i$. Additionally or alternatively, a bias b may be added to the weighted sum of the inputs such that an offset is added to each unit in the neural network layer that is independent of the input to the layer. The weighted sum may then be input into a function $\varphi$, which may generate one or more outputs y. Weight $w_i$ applied to an input $x_i$ may indicate whether the input is "excitatory," indicating that it has strong influence on the one or more outputs y, for instance by the corresponding weight having a large numerical value, and/or a "inhibitory," indicating it has a weak effect influence on the one more inputs y, for instance by the corresponding weight having a small numerical value. The values of weights $w_i$ may be determined by training a neural network using training data, which may be performed using any suitable process as described above. In an embodiment, and without limitation, a neural network may receive semantic units as inputs and output vectors representing such semantic units according to weights $w_i$ that are derived using machine-learning processes as described in this disclosure.

With continued reference to FIG. 8, flight controller may include a sub-controller 840. As used in this disclosure a "sub-controller" is a controller and/or component that is part of a distributed controller as described above; for instance, flight controller 804 may be and/or include a distributed flight controller made up of one or more sub-controllers. For example, and without limitation, sub-controller 840 may include any controllers and/or components thereof that are similar to distributed flight controller and/or flight controller as described above. Sub-controller 840 may include any component of any flight controller as described above. Sub-controller 840 may be implemented in any manner suitable for implementation of a flight controller as described above. As a further non-limiting example, sub-controller 840 may include one or more processors, logic components and/or computing devices capable of receiving, processing, and/or transmitting data across the distributed flight controller as described above. As a further non-limiting example, sub-controller 840 may include a controller that receives a signal from a first flight controller and/or first distributed flight controller component and transmits the signal to a plurality of additional sub-controllers and/or flight components.

With continued reference to FIG. 8, flight controller may include a co-controller 844. As used in this disclosure a "co-controller" is a controller and/or component that joins flight controller 804 as components and/or nodes of a distributer flight controller as described above. For example, and without limitation, co-controller 844 may include one or more controllers and/or components that are similar to flight controller 804. As a further non-limiting example, co-controller 844 may include any controller and/or component that joins flight controller 804 to distributer flight controller. As a further non-limiting example, co-controller 844 may include one or more processors, logic components and/or computing devices capable of receiving, processing, and/or transmitting data to and/or from flight controller 804 to distributed flight control system. Co-controller 844 may include any component of any flight controller as described above. Co-controller 844 may be implemented in any manner suitable for implementation of a flight controller as described above.

In an embodiment, and with continued reference to FIG. 8, flight controller 804 may be designed and/or configured to perform any method, method step, or sequence of method steps in any embodiment described in this disclosure, in any order and with any degree of repetition. For instance, flight controller 804 may be configured to perform a single step or sequence repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. Flight controller may perform any step or sequence of steps as described in this disclosure in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

Figure 9:
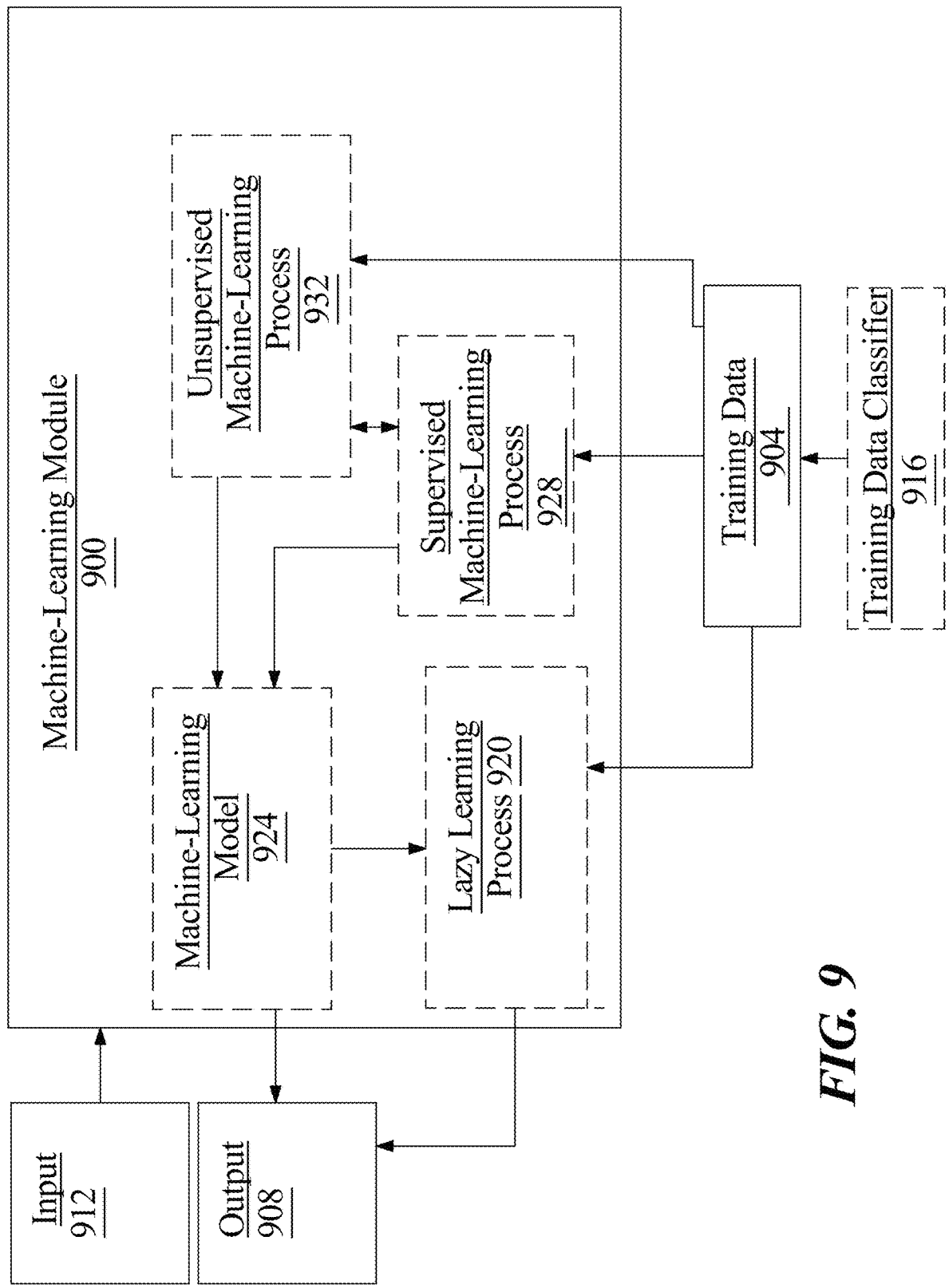
FIG. 9 is a block diagram of an exemplary embodiment of a machine-learning module.

Referring now to FIG. 9, an exemplary embodiment of a machine-learning module 900 that may perform one or more machine-learning processes as described in this disclosure is illustrated. Machine-learning module may perform determinations, classification, and/or analysis steps, methods, processes, or the like as described in this disclosure using machine learning processes. A "machine learning process," as used in this disclosure, is a process that automatedly uses training data 904 to generate an algorithm that will be performed by a computing device/module to produce outputs 908 given data provided as inputs 912; this is in contrast to a non-machine learning software program where the commands to be executed are determined in advance by a user and written in a programming language.

Still referring to FIG. 9, "training data," as used herein, is data containing correlations that a machine-learning process may use to model relationships between two or more categories of data elements. For instance, and without limitation, training data 904 may include a plurality of data entries, each entry representing a set of data elements that were recorded, received, and/or generated together; data elements may be correlated by shared existence in a given data entry, by proximity in a given data entry, or the like. Multiple data entries in training data 904 may evince one or more trends in correlations between categories of data elements; for instance, and without limitation, a higher value of a first data element belonging to a first category of data element may tend to correlate to a higher value of a second data element belonging to a second category of data element, indicating a possible proportional or other mathematical relationship linking values belonging to the two categories. Multiple categories of data elements may be related in training data 904 according to various correlations; correlations may indicate causative and/or predictive links between categories of data elements, which may be modeled as relationships such as mathematical relationships by machine-learning processes as described in further detail below. Training data 904 may be formatted and/or organized by categories of data elements, for instance by associating data elements with one or more descriptors corresponding to categories of data elements. As a non-limiting example, training data 904 may include data entered in standardized forms by persons or processes, such that entry of a given data element in a given field in a form may be mapped to one or more descriptors of categories. Elements in training data 904 may be linked to descriptors of categories by tags, tokens, or other data elements; for instance, and without limitation, training data 904 may be provided in fixed-length formats, formats linking positions of data to categories such as comma-separated value (CSV) formats and/or self-describing formats such as extensible markup language (XML), JavaScript Object Notation (JSON), or the like, enabling processes or devices to detect categories of data.

Alternatively or additionally, and continuing to refer to FIG. 9, training data 904 may include one or more elements that are not categorized; that is, training data 904 may not be formatted or contain descriptors for some elements of data. Machine-learning algorithms and/or other processes may sort training data 904 according to one or more categorizations using, for instance, natural language processing algorithms, tokenization, detection of correlated values in raw data and the like; categories may be generated using correlation and/or other processing algorithms. As a non-limiting example, in a corpus of text, phrases making up a number "n" of compound words, such as nouns modified by other nouns, may be identified according to a statistically significant prevalence of n-grams containing such words in a particular order; such an n-gram may be categorized as an element of language such as a "word" to be tracked similarly to single words, generating a new category as a result of statistical analysis. Similarly, in a data entry including some textual data, a person's name may be identified by reference to a list, dictionary, or other compendium of terms, permitting ad-hoc categorization by machine-learning algorithms, and/or automated association of data in the data entry with descriptors or into a given format. The ability to categorize data entries automatedly may enable the same training data 904 to be made applicable for two or more distinct machine-learning algorithms as described in further detail below. Training data 904 used by machine-learning module 900 may correlate any input data as described in this disclosure to any output data as described in this disclosure. As a non-limiting illustrative example. training data 904 may include an input as airspeed datum and an output correlated to the input as a deflection command.

Further referring to FIG. 9, training data may be filtered, sorted, and/or selected using one or more supervised and/or unsupervised machine-learning processes and/or models as described in further detail below; such models may include without limitation a training data classifier 916. Training data classifier 916 may include a "classifier," which as used in this disclosure is a machine-learning model as defined below, such as a mathematical model, neural net, or program generated by a machine learning algorithm known as a "classification algorithm," as described in further detail below, that sorts inputs into categories or bins of data, outputting the categories or bins of data and/or labels associated therewith. A classifier may be configured to output at least a datum that labels or otherwise identifies a set of data that are clustered together, found to be close under a distance metric as described below, or the like. Machine-learning module 900 may generate a classifier using a classification algorithm, defined as a processes whereby a computing device and/or any module and/or component operating thereon derives a classifier from training data 904. Classification may be performed using, without limitation, linear classifiers such as without limitation logistic regression and/or naive Bayes classifiers, nearest neighbor classifiers such as k-nearest neighbors classifiers, support vector machines, least squares support vector machines, fisher's linear discriminant, quadratic classifiers, decision trees, boosted trees, random forest classifiers, learning vector quantization, and/or neural network-based classifiers.

Still referring to FIG. 9, machine-learning module 900 may be configured to perform a lazy-learning process 920 and/or protocol, which may alternatively be referred to as a "lazy loading" or "call-when-needed" process and/or protocol, may be a process whereby machine learning is conducted upon receipt of an input to be converted to an output, by combining the input and training set to derive the algorithm to be used to produce the output on demand. For instance, an initial set of simulations may be performed to cover an initial heuristic and/or "first guess" at an output and/or relationship. As a non-limiting example, an initial heuristic may include a ranking of associations between inputs and elements of training data 904. Heuristic may include selecting some number of highest-ranking associations and/or training data 904 elements. Lazy learning may implement any suitable lazy learning algorithm, including without limitation a K-nearest neighbors algorithm, a lazy naïve Bayes algorithm, or the like; persons skilled in the art, upon reviewing the entirety of this disclosure, will be aware of various lazy-learning algorithms that may be applied to generate outputs as described in this disclosure, including without limitation lazy learning applications of machine-learning algorithms as described in further detail below.

Alternatively or additionally, and with continued reference to FIG. 9, machine-learning processes as described in this disclosure may be used to generate machine-learning models 924. A "machine-learning model," as used in this disclosure, is a mathematical and/or algorithmic representation of a relationship between inputs and outputs, as generated using any machine-learning process including without limitation any process as described above, and stored in memory; an input is submitted to a machine-learning model 924 once created, which generates an output based on the relationship that was derived. For instance, and without limitation, a linear regression model, generated using a linear regression algorithm, may compute a linear combination of input data using coefficients derived during machine-learning processes to calculate an output datum. As a further non-limiting example, a machine-learning model 924 may be generated by creating an artificial neural network, such as a convolutional neural network comprising an input layer of nodes, one or more intermediate layers, and an output layer of nodes. Connections between nodes may be created via the process of "training" the network, in which elements from a training data 904 set are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning.

Still referring to FIG. 9, machine-learning algorithms may include at least a supervised machine-learning process 928. At least a supervised machine-learning process 928, as defined herein, include algorithms that receive a training set relating a number of inputs to a number of outputs, and seek to find one or more mathematical relations relating inputs to outputs, where each of the one or more mathematical relations is optimal according to some criterion specified to the algorithm using some scoring function. The scoring function may, for instance, seek to maximize the probability that a given input and/or combination of elements inputs is associated with a given output to minimize the probability that a given input is not associated with a given output. Scoring function may be expressed as a risk function representing an "expected loss" of an algorithm relating inputs to outputs, where loss is computed as an error function representing a degree to which a prediction generated by the relation is incorrect when compared to a given input-output pair provided in training data 904. Persons skilled in the art, upon reviewing the entirety of this disclosure, will be aware of various possible variations of at least a supervised machine-learning process 928 that may be used to determine relation between inputs and outputs. Supervised machine-learning processes may include classification algorithms as defined above.

Further referring to FIG. 9, machine learning processes may include at least an unsupervised machine-learning processes 932. An unsupervised machine-learning process, as used herein, is a process that derives inferences in datasets without regard to labels; as a result, an unsupervised machine-learning process may be free to discover any structure, relationship, and/or correlation provided in the data. Unsupervised processes may not require a response variable; unsupervised processes may be used to find interesting patterns and/or inferences between variables, to determine a degree of correlation between two or more variables, or the like.

Still referring to FIG. 9, machine-learning module 900 may be designed and configured to create a machine-learning model 924 using techniques for development of linear regression models. Linear regression models may include ordinary least squares regression, which aims to minimize the square of the difference between predicted outcomes and actual outcomes according to an appropriate norm for measuring such a difference (e.g. a vector-space distance norm); coefficients of the resulting linear equation may be modified to improve minimization. Linear regression models may include ridge regression methods, where the function to be minimized includes the least-squares function plus term multiplying the square of each coefficient by a scalar amount to penalize large coefficients. Linear regression models may include least absolute shrinkage and selection operator (LASSO) models, in which ridge regression is combined with multiplying the least-squares term by a factor of 1 divided by double the number of samples. Linear regression models may include a multi-task lasso model wherein the norm applied in the least-squares term of the lasso model is the Frobenius norm amounting to the square root of the sum of squares of all terms. Linear regression models may include the elastic net model, a multi-task elastic net model, a least angle regression model, a LARS lasso model, an orthogonal matching pursuit model, a Bayesian regression model, a logistic regression model, a stochastic gradient descent model, a perceptron model, a passive aggressive algorithm, a robustness regression model, a Huber regression model, or any other suitable model that may occur to persons skilled in the art upon reviewing the entirety of this disclosure. Linear regression models may be generalized in an embodiment to polynomial regression models, whereby a polynomial equation (e.g. a quadratic, cubic or higher-order equation) providing a best predicted output/actual output fit is sought; similar methods to those described above may be applied to minimize error functions, as will be apparent to persons skilled in the art upon reviewing the entirety of this disclosure.

Continuing to refer to FIG. 9, machine-learning algorithms may include, without limitation, linear discriminant analysis. Machine-learning algorithm may include quadratic discriminant analysis. Machine-learning algorithms may include kernel ridge regression. Machine-learning algorithms may include support vector machines, including without limitation support vector classification-based regression processes. Machine-learning algorithms may include stochastic gradient descent algorithms, including classification and regression algorithms based on stochastic gradient descent. Machine-learning algorithms may include nearest neighbors algorithms. Machine-learning algorithms may include various forms of latent space regularization such as variational regularization. Machine-learning algorithms may include Gaussian processes such as Gaussian Process Regression. Machine-learning algorithms may include cross-decomposition algorithms, including partial least squares and/or canonical correlation analysis. Machine-learning algorithms may include naïve Bayes methods. Machine-learning algorithms may include algorithms based on decision trees, such as decision tree classification or regression algorithms. Machine-learning algorithms may include ensemble methods such as bagging meta-estimator, forest of randomized trees, AdaBoost, gradient tree boosting, and/or voting classifier methods. Machine-learning algorithms may include neural net algorithms, including convolutional neural net processes.

Figure 10:
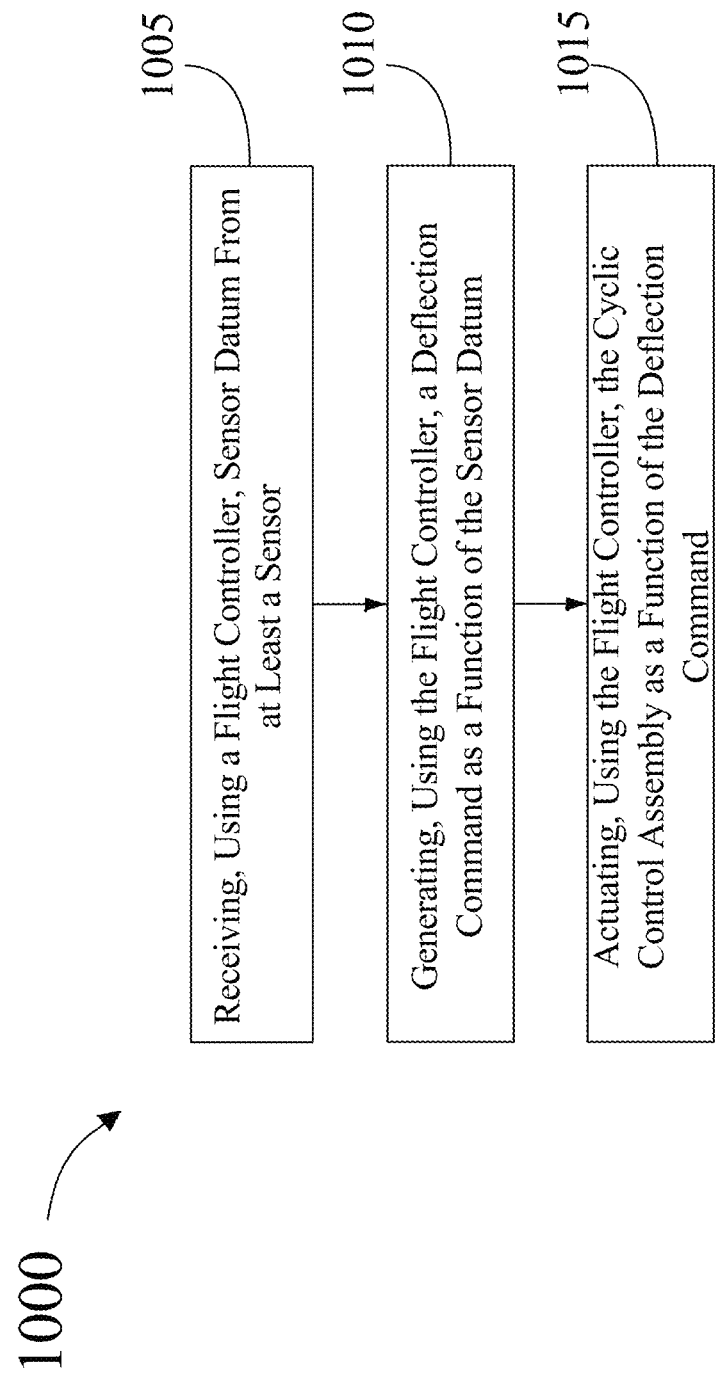
FIG. 10 is a flow diagram of an exemplary method for controlling a propulsor assembly of an electric aircraft.

Referring now to FIG. 10, a flow diagram of an exemplary method 1000 for controlling a propulsor assembly of an electric aircraft. The method 1000 includes a step 1005 of receiving, using a flight controller, sensor datum from at least a sensor, wherein the at least a sensor is communicatively connected to an electric aircraft, wherein the electric aircraft comprises an electric motor comprising a stator and a rotor and a propulsor, wherein the propulsor comprises a propeller comprising a blade. In some embodiments, the propulsor may include a monolithic propulsor. In some embodiments, the propulsor may include a lift propulsor. In some embodiments, the at least a sensor comprises an airspeed sensor. In some embodiments, method 1000 may further include detecting, using the airspeed sensor, the sensor datum, wherein the sensor datum may include airspeed datum and transmitting, using the airspeed sensor, the airspeed datum to the flight controller. The method 1000 includes a step 1010 of generating, using the flight controller, a deflection command as a function of the sensor datum. The method 1000 includes a step 1015 of actuating, using the flight controller, a cyclic control assembly as a function of the deflection command wherein the cyclic control assembly comprises an actuator and a push rod. In some embodiments, the step 1015 of actuating the cyclic control assembly may further include increasing a deflection angle of the blade of the propulsor and decreasing the deflection angle of the blade of the propulsor. In some embodiments, the cyclic control assembly may further include a swashplate mechanically connected to the push rod. In some embodiments, method 1000 may further include receiving, using the flight controller, a pilot input from a pilot control. In some embodiments, method 1000 may further include actuating, using the controller, cyclic control assembly as a function of the pilot input. These may be implemented as disclosed with reference to FIGS. 1-9

It is to be noted that any one or more of the aspects and embodiments described herein may be conveniently implemented using one or more machines (e.g., one or more computing devices that are utilized as a user computing device for an electronic document, one or more server devices, such as a document server, etc.) programmed according to the teachings of the present specification, as will be apparent to those of ordinary skill in the computer art. Appropriate software coding can readily be prepared by skilled programmers based on the teachings of the present disclosure, as will be apparent to those of ordinary skill in the software art. Aspects and implementations discussed above employing software and/or software modules may also include appropriate hardware for assisting in the implementation of the machine executable instructions of the software and/or software module.

Such software may be a computer program product that employs a machine-readable storage medium. A machine-readable storage medium may be any medium that is capable of storing and/or encoding a sequence of instructions for execution by a machine (e.g., a computing device) and that causes the machine to perform any one of the methodologies and/or embodiments described herein. Examples of a machine-readable storage medium include, but are not limited to, a magnetic disk, an optical disc (e.g., CD, CD-R, DVD, DVD-R, etc.), a magneto-optical disk, a read-only memory "ROM" device, a random access memory "RAM" device, a magnetic card, an optical card, a solid-state memory device, an EPROM, an EEPROM, and any combinations thereof. A machine-readable medium, as used herein, is intended to include a single medium as well as a collection of physically separate media, such as, for example, a collection of compact discs or one or more hard disk drives in combination with a computer memory. As used herein, a machine-readable storage medium does not include transitory forms of signal transmission.

Such software may also include information (e.g., data) carried as a data signal on a data carrier, such as a carrier wave. For example, machine-executable information may be included as a data-carrying signal embodied in a data carrier in which the signal encodes a sequence of instruction, or portion thereof, for execution by a machine (e.g., a computing device) and any related information (e.g., data structures and data) that causes the machine to perform any one of the methodologies and/or embodiments described herein.

Examples of a computing device include, but are not limited to, an electronic book reading device, a computer workstation, a terminal computer, a server computer, a handheld device (e.g., a tablet computer, a smartphone, etc.), a web appliance, a network router, a network switch, a network bridge, any machine capable of executing a sequence of instructions that specify an action to be taken by that machine, and any combinations thereof. In one example, a computing device may include and/or be included in a kiosk.

Figure 11:
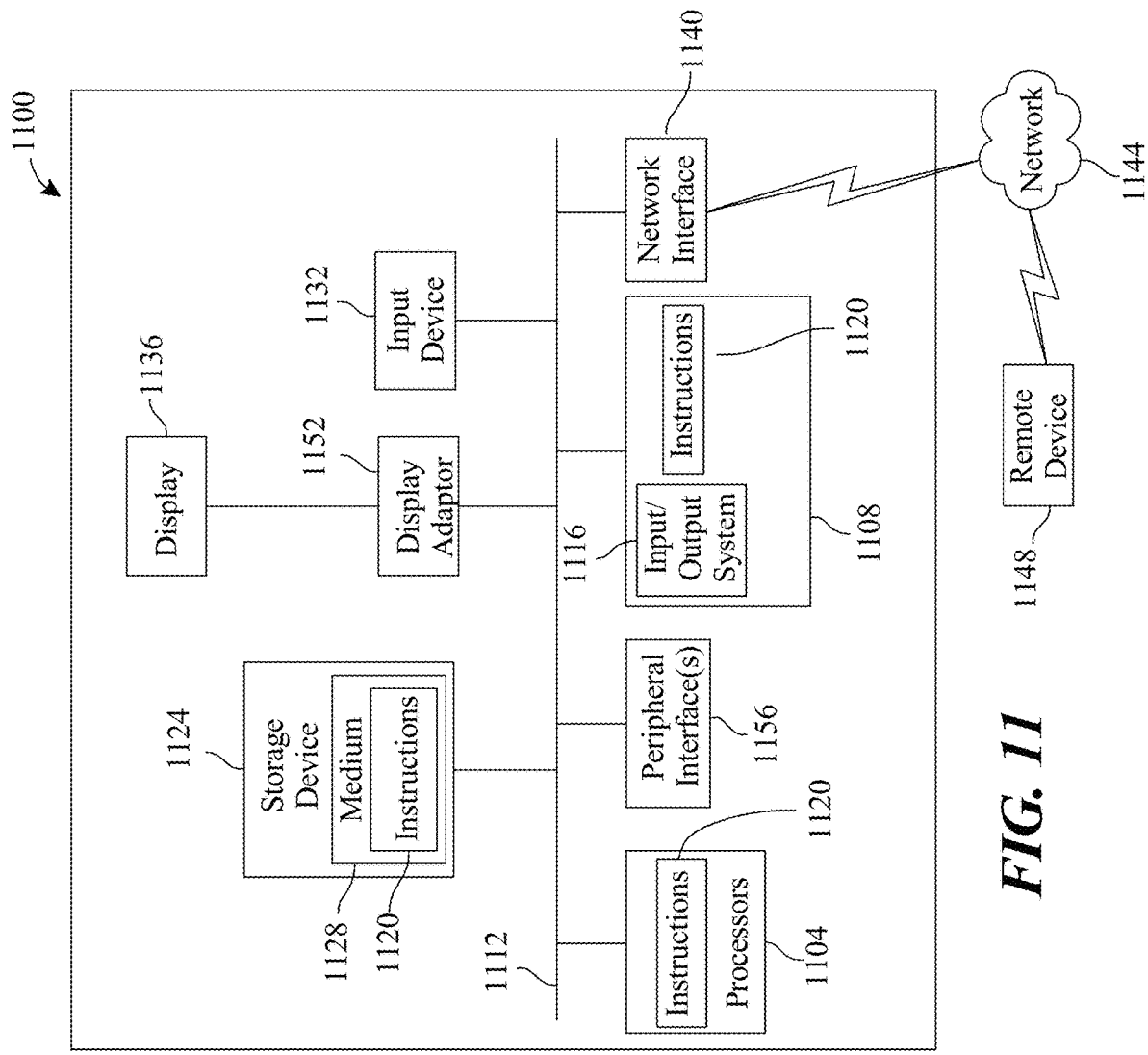
FIG. 11 is a block diagram of a computing system that can be used to implement any one or more of the methodologies disclosed herein and any one or more portions thereof.

FIG. 11 shows a diagrammatic representation of one embodiment of a computing device in the exemplary form of a computer system 1100 within which a set of instructions for causing a control system to perform any one or more of the aspects and/or methodologies of the present disclosure may be executed. It is also contemplated that multiple computing devices may be utilized to implement a specially configured set of instructions for causing one or more of the devices to perform any one or more of the aspects and/or methodologies of the present disclosure. Computer system 1100 includes a processor 1104 and a memory 1108 that communicate with each other, and with other components, via a bus 1112. Bus 1112 may include any of several types of bus structures including, but not limited to, a memory bus, a memory controller, a peripheral bus, a local bus, and any combinations thereof, using any of a variety of bus architectures.

Processor 1104 may include any suitable processor, such as without limitation a processor incorporating logical circuitry for performing arithmetic and logical operations, such as an arithmetic and logic unit (ALU), which may be regulated with a state machine and directed by operational inputs from memory and/or sensors; processor 1104 may be organized according to Von Neumann and/or Harvard architecture as a non-limiting example. Processor 1104 may include, incorporate, and/or be incorporated in, without limitation, a microcontroller, microprocessor, digital signal processor (DSP), Field Programmable Gate Array (FPGA), Complex Programmable Logic Device (CPLD), Graphical Processing Unit (GPU), general purpose GPU, Tensor Processing Unit (TPU), analog or mixed signal processor, Trusted Platform Module (TPM), a floating point unit (FPU), and/or system on a chip (SoC).

Memory 1108 may include various components (e.g., machine-readable media) including, but not limited to, a random-access memory component, a read only component, and any combinations thereof. In one example, a basic input/output system 1116 (BIOS), including basic routines that help to transfer information between elements within computer system 1100, such as during start-up, may be stored in memory 1108. Memory 1108 may also include (e.g., stored on one or more machine-readable media) instructions (e.g., software) 1120 embodying any one or more of the aspects and/or methodologies of the present disclosure. In another example, memory 1108 may further include any number of program modules including, but not limited to, an operating system, one or more application programs, other program modules, program data, and any combinations thereof.

Computer system 1100 may also include a storage device 1124. Examples of a storage device (e.g., storage device 1124) include, but are not limited to, a hard disk drive, a magnetic disk drive, an optical disc drive in combination with an optical medium, a solid-state memory device, and any combinations thereof. Storage device 1124 may be connected to bus 1112 by an appropriate interface (not shown). Example interfaces include, but are not limited to, SCSI, advanced technology attachment (ATA), serial ATA, universal serial bus (USB), IEEE 1394 (FIREWIRE), and any combinations thereof. In one example, storage device 1124 (or one or more components thereof) may be removably interfaced with computer system 1100 (e.g., via an external port connector (not shown)). Particularly, storage device 1124 and an associated machine-readable medium 1128 may provide nonvolatile and/or volatile storage of machine-readable instructions, data structures, program modules, and/or other data for computer system 1100. In one example, software 1120 may reside, completely or partially, within machine-readable medium 1128. In another example, software 1120 may reside, completely or partially, within processor 1104.

Computer system 1100 may also include an input device 1132. In one example, a user of computer system 1100 may enter commands and/or other information into computer system 1100 via input device 1132. Examples of an input device 1132 include, but are not limited to, an alpha-numeric input device (e.g., a keyboard), a pointing device, a joystick, a gamepad, an audio input device (e.g., a microphone, a voice response system, etc.), a cursor control device (e.g., a mouse), a touchpad, an optical scanner, a video capture device (e.g., a still camera, a video camera), a touchscreen, and any combinations thereof. Input device 1132 may be interfaced to bus 1112 via any of a variety of interfaces (not shown) including, but not limited to, a serial interface, a parallel interface, a game port, a USB interface, a FIREWIRE interface, a direct interface to bus 1112, and any combinations thereof. Input device 1132 may include a touch screen interface that may be a part of or separate from display 1136, discussed further below. Input device 1132 may be utilized as a user selection device for selecting one or more graphical representations in a graphical interface as described above.

A user may also input commands and/or other information to computer system 1100 via storage device 1124 (e.g., a removable disk drive, a flash drive, etc.) and/or network interface device 1140. A network interface device, such as network interface device 1140, may be utilized for connecting computer system 1100 to one or more of a variety of networks, such as network 1144, and one or more remote devices 1148 connected thereto. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network, such as network 1144, may employ a wired and/or a wireless mode of communication. In general, any network topology may be used. Information (e.g., data, software 1120, etc.) may be communicated to and/or from computer system 1100 via network interface device 1140.

Computer system 1100 may further include a video display adapter 1152 for communicating a displayable image to a display device, such as display device 1136. Examples of a display device include, but are not limited to, a liquid crystal display (LCD), a cathode ray tube (CRT), a plasma display, a light emitting diode (LED) display, and any combinations thereof. Display adapter 1152 and display device 1136 may be utilized in combination with processor 1104 to provide graphical representations of aspects of the present disclosure. In addition to a display device, computer system 1100 may include one or more other peripheral output devices including, but not limited to, an audio speaker, a printer, and any combinations thereof. Such peripheral output devices may be connected to bus 1112 via a peripheral interface 1156. Examples of a peripheral interface include, but are not limited to, a serial port, a USB connection, a FIREWIRE connection, a parallel connection, and any combinations thereof.

The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments, what has been described herein is merely illustrative of the application of the principles of the present invention. Additionally, although particular methods herein may be illustrated and/or described as being performed in a specific order, the ordering is highly variable within ordinary skill to achieve methods, systems, and software according to the present disclosure. Accordingly, this description is meant to be taken only by way of example, and not to otherwise limit the scope of this invention.

Exemplary embodiments have been disclosed above and illustrated in the accompanying drawings. It will be understood by those skilled in the art that various changes, omissions and additions may be made to that which is specifically disclosed herein without departing from the spirit and scope of the present invention.

What is claimed is:

1. A system, comprising:
an electric motor, the electric motor including a rotor and a stator;
a propulsor driven by the electric motor and configured to propel an electric aircraft, wherein the propulsor comprises a monolithic propeller including a hub, and blades extending outward from the hub, the hub and the blades being formed as a single element;
a cyclic control assembly configured to deflect the monolithic propeller, the cyclic control assembly including:
an actuator; and
a push rod mechanically connected to the actuator and the propulsor;
a flight controller configured to:
receive a sensor datum from at least one sensor communicatively connected to the flight controller;
generate a deflection command in response to the sensor datum; and
actuate the cyclic control assembly in response to the deflection command; and
a flap mechanism, the flap mechanism comprising:
a first teeter bearing at a first side portion of the hub of the monolithic propeller; and
a second teeter bearing at a second side portion of the hub of the monolithic propeller,
wherein the first teeter bearing and the second teeter bearing allow for a flapping of a first outer end portion and a second outer end portion of the monolithic propeller relative to the hub of the monolithic propeller.

2. The system of claim 1, wherein the system is installed in an electric vertical takeoff and landing aircraft.

3. The system of claim 1, wherein the flight controller is configured to generate the deflection command based on a deflection angle associated with the sensor datum in a lookup table accessible to the flight controller.

4. The system of claim 1, further comprising:
a first hinge received in an inner recess formed in the hub;
a second hinge received in the inner recess formed in the hub, diametrically across the hub from the first hinge; and
a rod extending between the first hinge and the second hinge, defining a teeter axis about which the first outer end portion and the second outer end portion of the monolithic propeller pivot.

5. The system of claim 1, wherein the at least one sensor includes an airspeed sensor.

6. The system of claim 5, wherein the airspeed sensor is configured to:
detect the sensor datum, wherein the sensor datum includes an airspeed datum; and
transmit the airspeed datum to the flight controller.

7. The system of claim 1, wherein the flight controller is further configured to receive a pilot input from a pilot control.

8. The system of claim 7, wherein the flight controller is further configured to actuate the cyclic control assembly in response to the pilot input.

9. The system of claim 1, wherein the flight controller is configured to actuate the cyclic control assembly to at least one of:
increase a deflection angle of the monolithic propeller of the propulsor; or
decrease the deflection angle of the monolithic propeller of the propulsor.

10. The system of claim 1, wherein the propulsor is a lift propulsor, and wherein the flight controller is configured to control power output by each of a plurality of lift propulsors of an aircraft to control an attitude of the aircraft.

11. The system of claim 1, wherein the cyclic control assembly includes:
a swashplate coupled between the actuator and the push rod, the swashplate including:
an inner swashplate coupled to the actuator; and
an outer swashplate that rotates with the rotor, and relative to the inner swashplate.

12. The system of claim 4, wherein the cyclic control assembly includes:
a swashplate rocker coupled between the actuator and a first end portion of the push rod, the swashplate rocker being rotatable about an intermediate portion thereof, with the outer swashplate coupled to the swashplate rocker; and
a propulsor rocker coupled between a second end portion of the push rod and a propulsor link coupling the propulsor rocker to the propulsor, the propulsor rocker being rotatable about an intermediate portion thereof.

13. The system of claim 12, wherein, in response to a first deflection command:
the flight controller controls the actuator to move a first end portion of the swashplate rocker in a first direction;
in response to movement of the first end portion of the swashplate rocker in the first direction:
the swashplate rocker rotates about a swashplate rocker pivot point at the intermediate portion thereof, and
a second end portion of the swashplate rocker and the first end portion of the push rod coupled thereto, and the second end portion of the push rod and a first end portion of the propulsor rocker coupled thereto, move in a second direction;
in response to movement of the first end portion of the propulsor rocker in the second direction:
the propulsor rocker rotates about a propulsor rocker pivot point at the intermediate portion thereof, and
a second end portion of the propulsor rocker and the propulsor link coupled thereto move in the first direction; and
in response to movement of the propulsor link in the first direction, the monolithic propeller is deflected in the first direction.

14. A method for controlling a propulsor assembly of an electric aircraft, wherein the method comprises:
receiving, by a flight controller, sensor datum from at least one sensor communicatively connected to the flight controller;
generating, by the flight controller, a deflection command in response to receiving the sensor datum;
actuating, by the flight controller, a cyclic control assembly in response to the deflection command, including controlling an actuator to move a push rod of the cyclic control assembly to deflect a monolithic propeller of at least one propulsor of the electric aircraft, the monolithic propeller being defined by a hub and a plurality of blades extending outward from the hub, the hub and the plurality of blades being formed as a single element; and
allowing passive flapping of a first outer end portion and a second outer end portion of the monolithic propeller relative to the hub via a flap mechanism, the flap mechanism comprising:
a first teeter bearing at a first side portion of the hub of the monolithic propeller; and
a second teeter bearing at a second side portion of the hub of the monolithic propellert.

15. The method of claim 14, wherein receiving the sensor datum from the at least one sensor includes receiving the sensor datum from an airspeed sensor.

16. The method of claim 15, further comprising:
detecting, by the airspeed sensor, the sensor datum including airspeed datum; and
transmitting, by the airspeed sensor, the airspeed datum to the flight controller.

17. The method of claim 14, further comprising:
receiving, by the flight controller, a pilot input from a pilot control.

18. The method of claim 17, further comprising:
actuating, by the flight controller, the cyclic control assembly in response to the pilot input.

19. The method of claim 14, wherein actuating the cyclic control assembly includes:
increasing a deflection angle of the monolithic propeller of the at least one propulsor; and
decreasing the deflection angle of the monolithic propeller of the at least one propulsor.

20. The method of claim 15, wherein the at least one propulsor comprises a plurality of lift propulsors.

21. The method of claim 14, wherein actuating the cyclic control assembly includes:
controlling the actuator to move the push rod via a swashplate coupled to the push rod;
moving a propulsor rocker coupled between the push rod and the at least one propulsor in response to movement of the push rod; and
deflecting the monolithic propeller of the at least one propulsor in response to movement of the propulsor rocker.

* * * * *